(12) United States Patent
Shishikura et al.

(10) Patent No.: US 6,976,879 B2
(45) Date of Patent: Dec. 20, 2005

(54) CARD CONNECTOR

(75) Inventors: Seiji Shishikura, Chiba (JP); Minoru Igarashi, Inzai (JP); Yoshinori Egawa, Yokohama (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 10/721,424

(22) Filed: Nov. 26, 2003

(65) Prior Publication Data

US 2004/0110423 A1 Jun. 10, 2004

(30) Foreign Application Priority Data

Nov. 28, 2002 (JP) .......................... 2002-346002
Nov. 14, 2003 (JP) .......................... 2003-385753

(51) Int. Cl.[7] ............................................. H01R 24/00
(52) U.S. Cl. ..................................................... 439/630
(58) Field of Search .......................... 439/630, 137–141

(56) References Cited

U.S. PATENT DOCUMENTS

| | | | | |
|---|---|---|---|---|
| 4,404,464 A | * | 9/1983 | Moreno ...................... 235/438 |
| 4,421,372 A | * | 12/1983 | Golden ....................... 439/296 |
| 4,722,693 A | * | 2/1988 | Rose .......................... 439/137 |
| 5,035,633 A | * | 7/1991 | Kobayashi et al. ......... 439/140 |
| 5,179,504 A | * | 1/1993 | Kitahara ..................... 361/684 |
| 5,300,763 A | | 4/1994 | Ito et al. |
| 5,563,397 A | | 10/1996 | Fujimoto et al. |
| 6,056,573 A | * | 5/2000 | Nishioka .................... 439/326 |
| 6,109,940 A | * | 8/2000 | Chad et al. ................. 439/141 |
| 6,123,557 A | * | 9/2000 | Wang et al. ................ 439/137 |
| 6,129,572 A | * | 10/2000 | Feldman et al. ............ 439/328 |
| 6,203,378 B1 | * | 3/2001 | Shobara et al. ............ 439/638 |
| 6,345,760 B1 | * | 2/2002 | Eason et al. ............... 235/380 |
| 6,361,369 B1 | * | 3/2002 | Kondo et al. ............... 439/630 |
| 6,399,906 B1 | * | 6/2002 | Sato et al. ............... 200/61.59 |
| 6,402,529 B2 | * | 6/2002 | Saito et al. ................... 437/74 |
| 6,457,647 B1 | * | 10/2002 | Kurihashi et al. .......... 235/486 |
| 6,524,137 B1 | * | 2/2003 | Liu et al. .................... 439/638 |
| 6,601,766 B2 | * | 8/2003 | Nakagawa et al. ......... 235/451 |
| 6,612,492 B1 | * | 9/2003 | Yen ............................ 235/451 |
| 6,716,066 B1 | * | 4/2004 | Kuo ............................ 439/630 |
| 6,783,399 B2 | * | 8/2004 | Joung ......................... 439/630 |
| 2003/0095386 A1 | * | 5/2003 | Le et al. ..................... 361/737 |
| 2003/0157839 A1 | * | 8/2003 | Yamaguchi et al. ........ 439/630 |
| 2004/0026507 A1 | * | 2/2004 | Nagata et al. .............. 235/449 |
| 2004/0106326 A1 | * | 6/2004 | Hsieh ......................... 439/630 |

FOREIGN PATENT DOCUMENTS

| | | |
|---|---|---|
| DE | 4139482 A1 | 6/1993 |
| EP | 0696008 A2 | 2/1996 |
| EP | 1 146 474 A1 | 10/2001 |
| EP | 1324256 A1 | 7/2003 |
| GB | 1 487 001 | 9/1977 |
| JP | 2003-317858 | 11/2003 |

OTHER PUBLICATIONS

Official Action of Japanese Patent Office for Application No. 2003–385753, mailed Jun. 14, 2005.

* cited by examiner

*Primary Examiner*—Ross Gushi
*Assistant Examiner*—Larisa Tsukerman
(74) *Attorney, Agent, or Firm*—Finnegan, Henderson, Farabow, Garrett & Dunner, LLP

(57) ABSTRACT

A card connector of the present invention includes: a housing; a card insertion opening formed by opening at least one end of the housing; and a plurality of contacts arranged in the housing; wherein switching mechanism constructed of at least actuator members and a shutter member is provided in the housing. This construction allows a plurality of kinds of cards of different sizes in thickness and width to be used on one and the same card connector without requiring the cards to have any additional member, by performing a switching operation on such members as shutter, actuators and latch arms. This construction can make a distinction between appropriate and inappropriate cards for use on the card connector by permitting the insertion of appropriate cards and blocking the insertion of inappropriate cards.

14 Claims, 47 Drawing Sheets

CARD CONNECTOR

This application claims priority from Japanese Patent Application Nos. 2002-346002 filed Nov. 28, 2002 and 2003-385753 filed Nov. 14, 2003, which are incorporated hereinto by reference.

BACKGROUND OF THE INVENTION

1. Field of the Invention

The present invention relates to a card connector for electronic devices, such as mobile phones, telephones, PDAs (personal digital assistants), portable audio devices, game machines, cameras and information terminal devices, and more particularly to a card connector capable of accepting a plurality of kinds of cards of different sizes in thickness, width and length.

2. Description of the Related Art

In electronic devices, such as mobile phones telephones, PDAs, portable audio devices, game machines, cameras and information terminal devices, there has been, in recent years, widespread use of IC cards, PC cards, SD cards and SIM cards, all with a built-in IC component called an IC chip incorporating CPU and memory. As a result, market demand is growing for card connectors for use with small memory cards, such as IC cards, PC cards, SD cards and SIM cards. Particularly, there is an increasing need for a card connector that is low in height and small in size, has sufficient strength to withstand card insertion/withdrawal operations, and can easily release an inserted card and also accept a plurality of kinds of cards of different sizes.

With conventional card connectors, however, if a plurality of kinds of cards of different sizes in thickness and width, such as IC cards, PC cards, SD cards and SIM cards, are to be used on the same card connector, some provisions must be made in these cards. These conventional card connectors typically include, in a card insertion unit, a card insertion opening that matches the size of a particular kind of card. In such card connectors, because of a requirement of a connector size reduction and a limited availability of a space for installing an internal printed circuit board, the card connectors are faced with an increasing demand for a capability that allows two or more kinds of cards of different sizes to be used on one and the same card connector.

Such conventional card connectors have, for example, a connector housing formed with a pair of guide grooves and side walls, as disclosed in European Patent Application Laid-open No. 1146474 A1. The pair of guide grooves supports both side edges of an upper body portion of a thick first card and both side ends of a body portion of a thin second card and guides the first and second cards as they are inserted, withdrawn and moved. The side walls define a space for accommodating a lower body portion of the first card below a space formed between the pair of guide grooves. With the above construction, however, it is essential that the cards of different kinds be provided with some means to enable them to be used on the same card connector.

SUMMARY OF THE INVENTION

Therefore, an object of the present invention is to solve the aforementioned problems experienced with prior art. More specifically, it is an object of the present invention to provide a card connector that accepts a plurality of kinds of cards of different thicknesses and widths without requiring the cards to have any additional means, by performing a switching operation, using members such as a shutter, actuators and latch arms. Another object of the present invention is to provide a card connector constructed to distinguish between appropriate and inappropriate cards for use in the card connector by permitting the insertion of appropriate cards and blocking the insertion of inappropriate cards.

To achieve the above objective, the present invention provides a card connector comprising: a housing; a card insertion opening formed by opening at least one end of the housing; and a plurality of contacts arranged in the housing; wherein switching mechanism constructed of at least actuator members and a shutter member is provided in the housing. This construction allows a plurality of kinds of cards of different cross-sectional dimensions to be used commonly on one and the same card connector without requiring the cards to have any additional means and without any trouble. This construction can distinguish appropriate cards for use on the card connector from others. Further, the card connector itself can be manufactured to have a flat, thin, boxlike housing and thus can be suitably applied to information terminal devices, such as mobile phones and karaoke microphones, and a variety of electronic devices.

The above and other objects, effects, features and advantages of the present invention will become more apparent from the following description of embodiments thereof taken in conjunction with the accompanying drawings.

DETAILED DESCRIPTION OF PREFERRED EMBODIMENTS (Embodiment 1)

Figure 1:
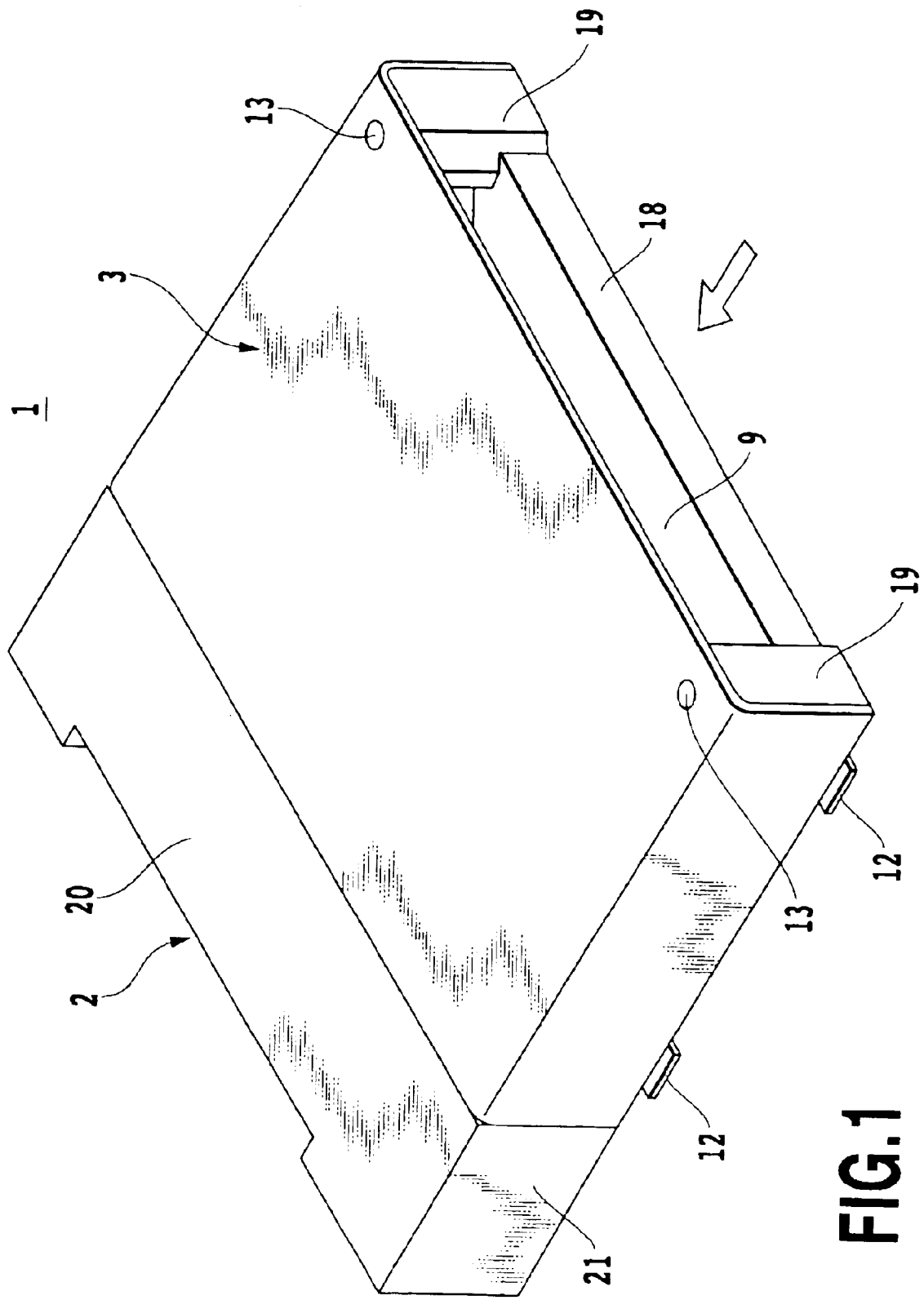
FIG. 1 is an overall perspective view showing a card connector of Embodiment 1 of the present invention as seen from a card insertion opening side.
Figure 2:
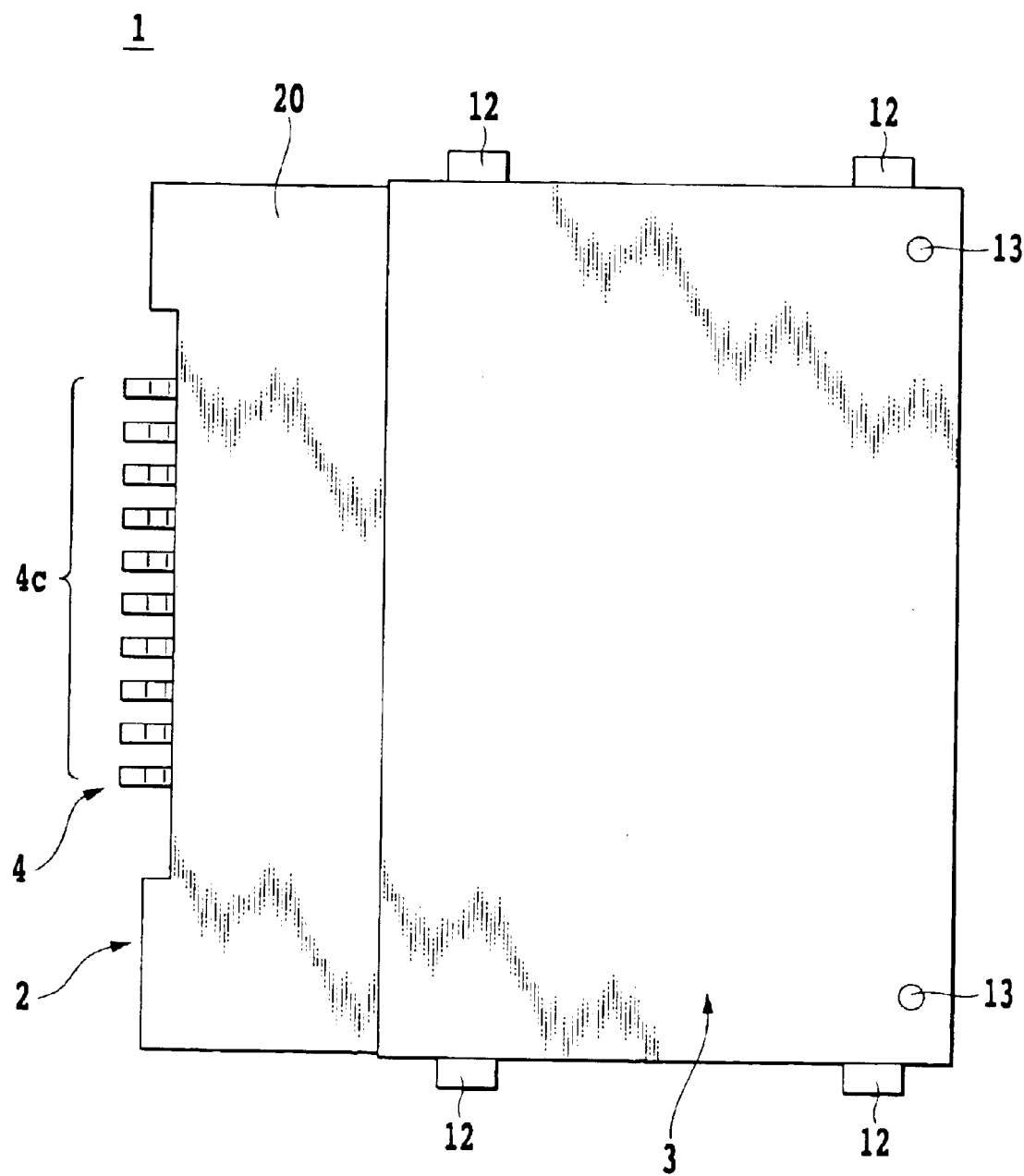
FIG. 2 is a plan view showing the card connector of FIG. 1 according to the present invention.
Figure 3:
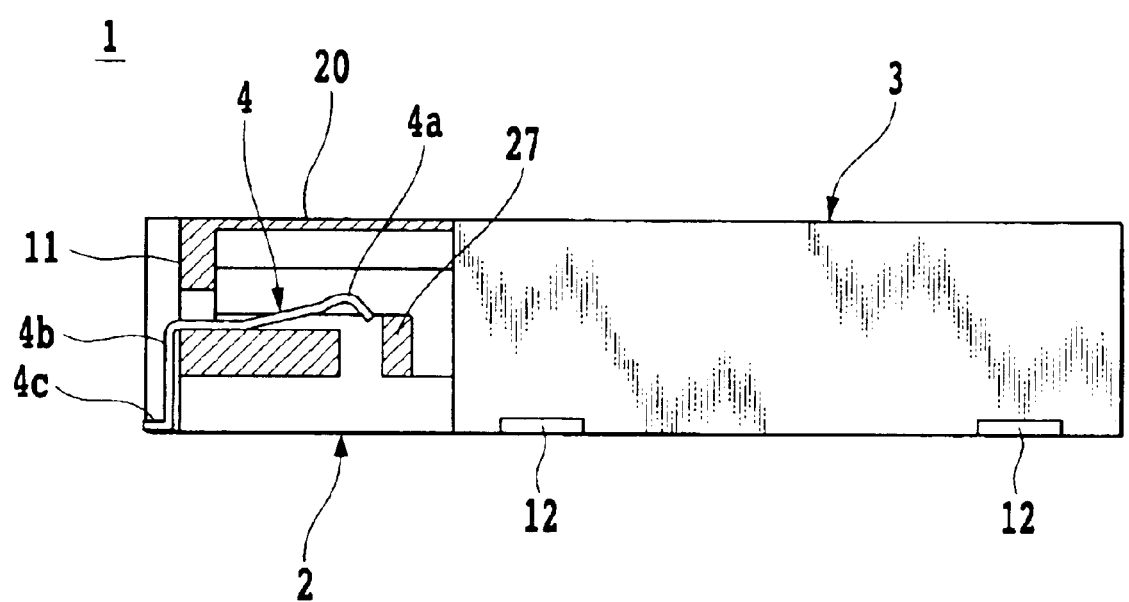
FIG. 3 is a partly cutaway side view showing the card connector of FIG. 1 according to the present invention.
Figure 4:
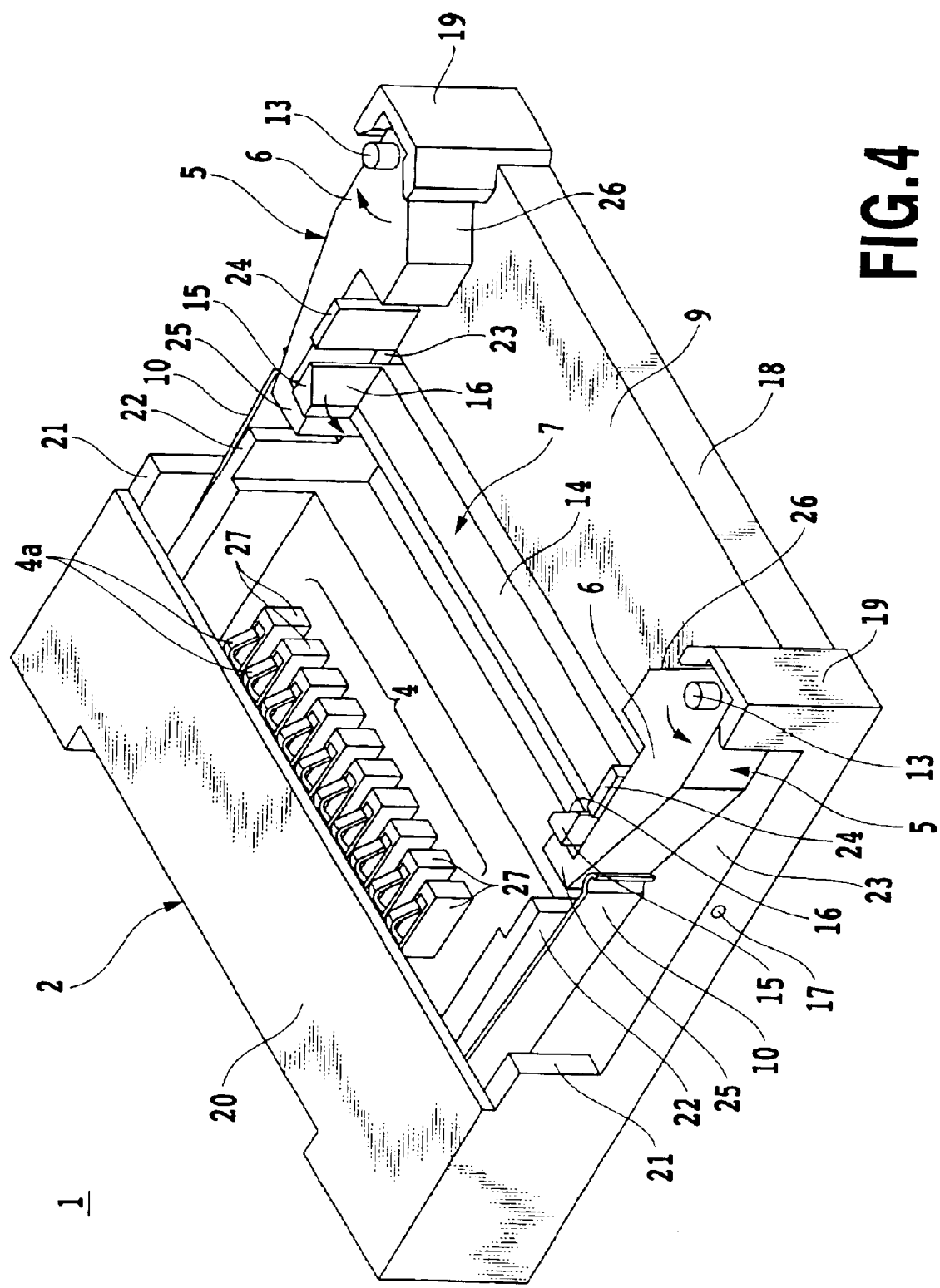
FIG. 4 is a perspective view showing the card connector of FIG. 1 according to the present invention, with a cover member removed.
Figure 5:
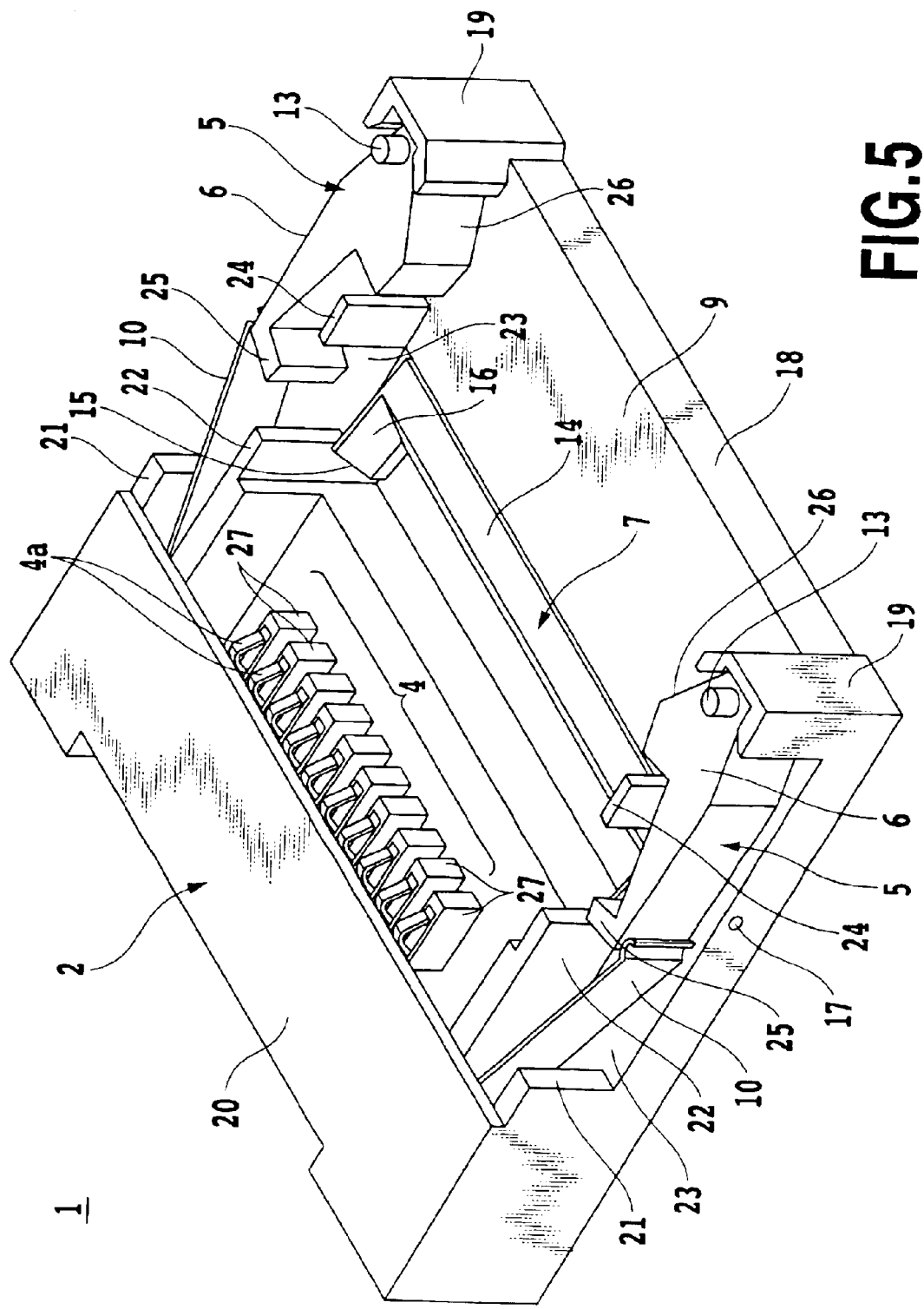
FIG. 5 is a perspective view showing the card connector of FIG. 4 according to the present invention, with movable members opened outward allowing a shutter member to fall backward.
Figure 6:
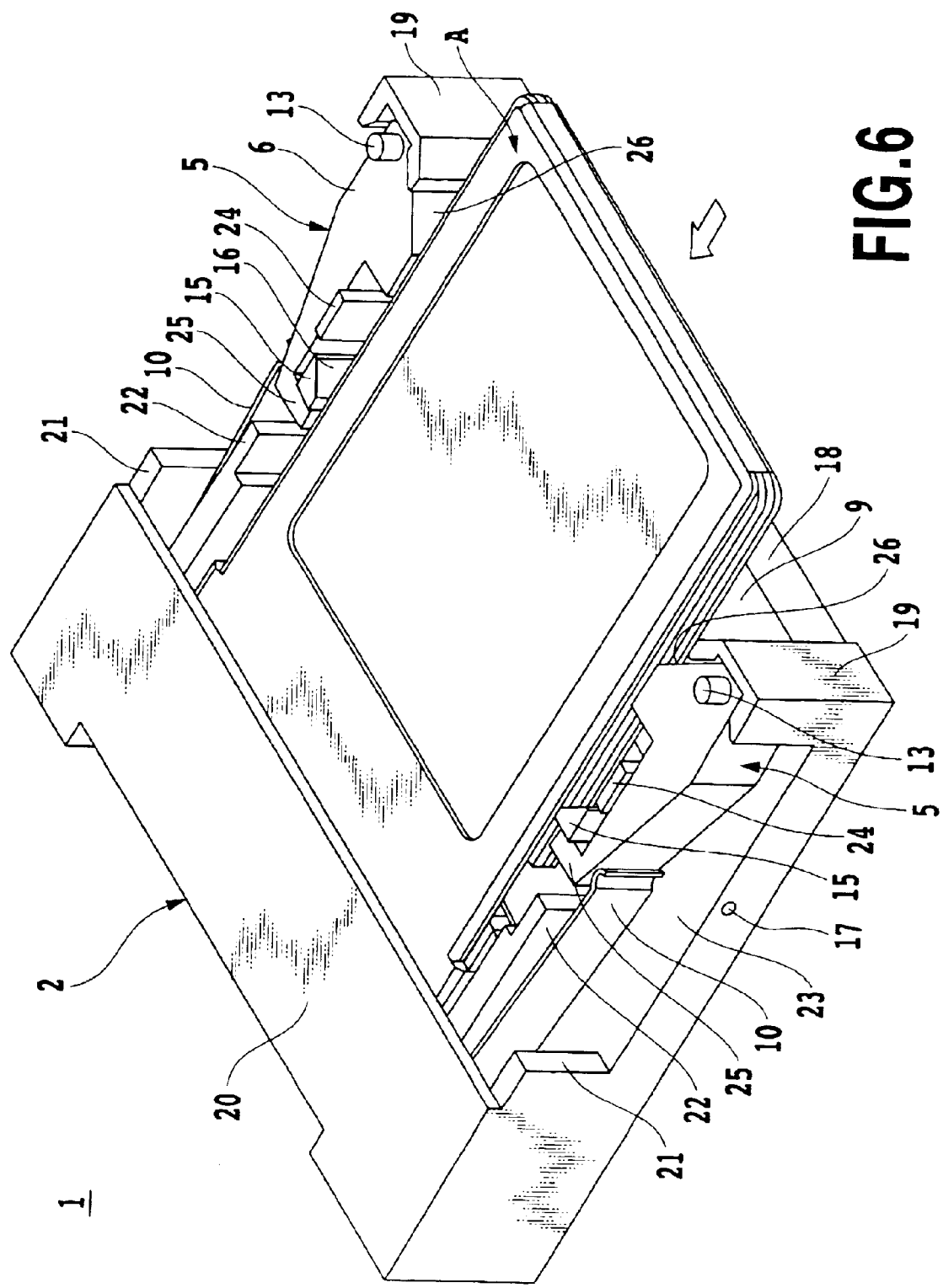
FIG. 6 is a perspective view showing the card connector of FIG. 4 according to the present invention when a small card is inserted.
Figure 7:
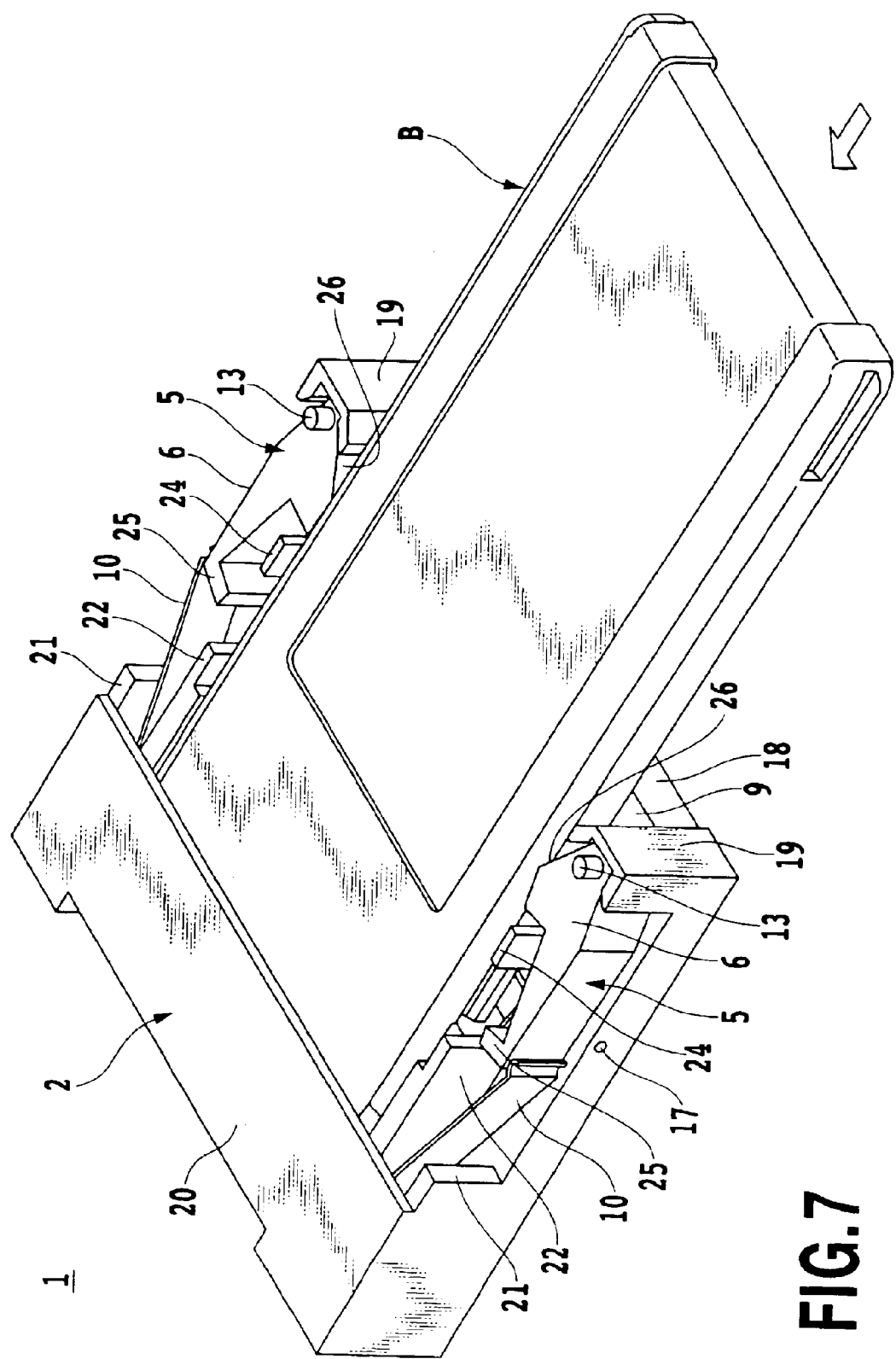
FIG. 7 is a perspective view showing the card connector of FIG. 4 according to the present invention when a large card is inserted.

FIGS. 1 to 7 illustrate a card connector as Embodiment 1 of the present invention, FIG. 1 representing an overall perspective view of the card connector of the present invention as seen from a card insertion opening side, FIG. 2 representing a plan view of the same, FIG. 3 representing a partly cutaway side view, FIG. 4 representing a similar perspective view of the card connector of FIG. 1 with the cover member removed, FIG. 5 representing a similar perspective view of the card connector of FIG. 4 with movable members opened outward, FIG. 6 representing a perspective view of the card connector of FIG. 4 when a small card is inserted, FIG. 7 representing a perspective view of the card connector of FIG. 4 when a large card is inserted.

As shown in FIGS. 1 to 7, the card connector 1 in Embodiment 1 of the present invention can be used commonly for a thin, short, small card A and a thick, long, large card B. These cards A, B used in the present invention are referred to simply as a "small card" and a "large card."

As shown in FIG. 1, the card connector 1 according to the present invention has a connector body 2, a cover member 3, a plurality of contacts 4, and switching mechanisms 5. The switching mechanisms 5 of the card connector 1 of the present invention comprise actuator members 6, a shutter member 7 and leaf springs 10 elastically biasing the actuator members 6. In use, this card connector 1 is mounted, for example, on an information terminal device.

The card connector 1 of the present invention has a flat box-shaped housing defined by the connector body 2 and the cover member 3 that is used in combination with the connector body 2. The card connector 1 is open on one-end side to form a card insertion opening 9.

Further, the card connector 1 of the present invention is closed on the other-end side by an end wall 11, along which are arrayed a plurality of contacts 4. These contacts 4 each have a terminal portion 4c extending rearward for connection with terminals of external information terminal devices and equipment. The contacts 4 are placed on individually separate support portions 27. This construction facilitates a prevention of an inverted card insertion because contact pads of each card are arranged independent of each other.

Further, the card connector 1 of the present invention is mounted, as by soldering or screws, to a target device or equipment such as a printed circuit board of an information terminal device through mounting flange portions 12 on both sides of the cover member 3.

On both sides of the card insertion opening 9 of the card connector 1, a pair of actuator members 6, shaped like a latch arm, of the switching mechanisms 5 are arranged to face each other with the card insertion opening 9 interposed therebetween. Between these actuator members 6 is installed a shutter member 7 as a closing member. The actuator members 6 and the shutter member 7 of the switching mechanisms 5 perform a switching operation according to a difference in size, such as thickness, width or length, between a small card A and a large card B. The actuator members 6 and the shutter member 7 of the switching mechanisms 5 and other components form movable members in this embodiment.

In such a card connector 1 of the present invention, the connector body 2 is formed of an insulating material, such as synthetic resin, and is combined with the cover member 3 formed of a thin metal plate to construct a hollow, flat, box-shaped housing. The cover member 3 may also be formed of a synthetic resin material. A small card A or large card B is inserted from the card insertion opening 9 of the card connector 1. A plurality of contacts 4 are arranged in line in the card connector 1 so that they can make contact with pad portions, such as contact pads, arrayed on an underside of a front end portion of the small card A or large card B.

Each of the contacts 4 has formed at a free inner end thereof a contact portion 4a which is curved up in a semicircular shape and functions as a contact piece. These contact portions 4a are positioned so as to be able to make elastic contact with the pad portions of the small card A or large card B inserted from the card insertion opening 9. The contacts 4 are mounted on the support portions 27 arranged at a rear part of a base portion 18 of the connector body 2. Further, the contacts 4, as shown in FIG. 3, have their intermediate leg portions 4b bent almost at right angles and integrally secured to the end wall 11. The other ends of the contacts 4 are formed with terminal portions 4c for connection with external devices.

The card connector 1 of this embodiment of the present invention may use "Memory Stick Duo" (registered trademark) as a small card A and "Memory stick" (registered trademark) as a large card B. The present invention, however, is not limited to the use of these cards or memory sticks but can also be applied satisfactorily to other memory cards, such as SD cards, IC cards and SIM cards.

In the card connector 1 of the present invention, as shown in the figures, the actuator members 6 of the switching mechanisms 5 are provided on both sides of the card insertion opening 9 as switching members. Further, the shutter member 7 is pivotally arranged adjacent to the actuator members 6. The shutter member 7 is made from a laterally elongate, flat shutter plate 14. The shutter plate 14 of the shutter member 7 has upwardly rising protrusions 15 on both left- and right-hand sides. These protrusions 15 each have a cam surface 16. The shutter member 7 is pivotally supported on the connector body 2 by horizontally extending pins 17.

When corners of the large card B engage the cam surfaces 16 of the protrusions 15, the shutter member 7 pivots rearward about the pins 17 until the protrusions 15 lie on their back as shown in FIG. 5. In FIG. 5, the large card B pushes open the actuator members 6 to pivot outwardly about vertically erect pins 13. The card then engages and pushes the cam surfaces 16 of the protrusions 15 of the shutter member 7 to cause the shutter member 7 to pivot rearward about the pins 17. Then, the card B is further pushed over the shutter member 7 lying on its back until the pad portions at the front end part of the card B come into contact with the contacts 4. Now the card B is inserted in its place. With the shutter member 7 pivoted backward to lie on its back, a card accommodating portion of a cross section large enough to accommodate the thick large card B can be obtained.

The connector body 2 of the card connector 1 of the present invention has a nearly flat base portion 18 whose front part is open to form the card insertion opening 9, as shown in FIG. 4 and FIG. 5. At the front left and right of the base portion 18 or at its front corners, vertically upright support walls 19 are provided to define the card insertion opening 9. The connector body 2 has at its rear part a top plate 20 and outer sidewalls 21 and inner sidewalls 22 on both sides. The top plate 20 is so sized to leave the outer sidewalls 21 and inner sidewalls 22 on both sides open almost at their front halves. The cover member 3 is fitted in an open portion of the connector body 2 to form a flat, thin, box-shaped housing.

The connector body 2 has open recessed portions 23 in a front part of the base portion 18 on both sides. In each of the recessed portions 23 an erect plate 24 is provided. Further, in the recessed portions 23 the actuator members 6 are pivotally supported at one end by pins 13, with the erect plates 24 working as stoppers to block an inward movement of the actuator members 6. The actuator members 6 have their inner sides cut off to form almost right-angled latch portions 25 at their free ends, which lock the protrusions 15 of the shutter member 7. The actuator members 6 are therefore shaped like arms.

Each of the actuator members 6 has one end thereof pivotally mounted by the pins 13 on the recessed portions 23 near the card insertion opening 9 of the connector body 2, and corners of the actuator members 6 on the card insertion opening 9 side are cut off to form cam surfaces 26. When the corners on both sides of the large card B abut against the cam surfaces 26, the actuator members 6 are pushed open outwardly about vertical axes of the pins 13.

As a result, the latch portions 25 at the free ends of the actuator members 6 part from the protrusions 15 of the shutter member 7 and then the protrusions 15, when thrust by the corners of the large card B, are pushed rearward causing the shutter member 7 to fall on its back. Thus, over the flattened shutter member 7 is provided with a card accommodating portion which has a large enough cross section to allow the inserted large card B to advance therethrough. In this manner the large card B can be inserted completely into the card connector 1.

Adjacent to the shutter member 7 are provided stationary erect plates 24 that act as stoppers to block the inward movement of the actuator members 6. On both sides of the connector body 2 the outer sidewalls 21 and the inner sidewalls 22 are provided almost parallel to each other. Leaf springs 10 are provided between the outer sidewalls 21 and the inner sidewalls 22. The leaf springs 10 are secured at one end to the end wall 11 and thus supported like a cantilever. At the other end the leaf springs 10 engage outer portions of the free ends of the actuator members 6, i.e., the latch portions 25, to elastically bias the actuator members 6 inwardly.

In the card connector 1 of the present invention of the above construction, operations performed when a small card A and a large card B are inserted will be explained as follows.

First, when a small card A is used, it is inserted from the card insertion opening 9 of the card connector 1 of the present invention, as shown in FIG. 6.

The small card A may, for example, be a card called Memory Stick Duo which has small external dimensions in thickness, length and width as shown. This small card A has a width equal to a normal distance between the paired actuator members 6 in the card connector 1 of the present invention. Hence, when the small card A is inserted into the card connector 1 from the card insertion opening 9 in the direction of arrow of FIG. 1, it can be inserted in its place. This is because the small card A does not engage and move the actuator members 6 at all. Therefore, the actuator members 6 rest in a state of FIG. 4, in which the actuator members 6, pushed and pivoted inwardly about the vertically upright pins 13 by the leaf springs 10, are engaged and stopped by the erect plates 24 as stoppers.

In this state, the small card A advances between the protrusions 15 of the shutter member 7 into the card connector 1 through the card accommodation portion of a predetermined cross-sectional shape and size formed over the shutter plate 14 of the shutter member 7. Then, when a front end of the small card A abuts against the end wall 11, it is stopped at its predetermined position. In this state, the pad portions on the underside of the small card A come into contact with the contact portions 4*a* of the contacts 4 for electrical connection. Now, the small card A can be used for an intended purpose.

To withdraw the small card A, the user need only hold an end of the card and pull it forward. With this process, the small card A can be withdrawn appropriately.

Next, when a large card B is used, it is inserted from the card insertion opening 9 of the card connector 1 of the present invention, as shown in FIG. 7.

The large card B may, for example, be a card called Memory Stick which has large external dimensions in thickness, length and width as shown. This large card B has a width larger than the normal distance between the paired actuator members 6 in the card connector 1 of the present invention.

When the large card B is inserted into the card connector 1 from the card insertion opening 9, front corners of the large card B engage and push the cam surfaces 26 of the actuator members 6, causing the actuator members 6 to pivot about the pins 13 to open outwardly, so that they part outwardly from the erect plates 24 or stoppers and at the same time the latch portions 25 move outwardly away from the protrusions 15.

Then, the front corners of the large card B engage the cam surfaces 16 of the protrusions 15 of the shutter member 7, pushing the protrusions 15 rearward and causing the shutter plate 14 of the shutter member 7 to fall rearward and lie on its back, as shown in FIG. 5. In this state, the card accommodation portion over the shutter plate 14 of the flattened shutter member 7 has a sufficient height and also has a shape and dimensions that allow the insertion of the thick large card B.

Then, the large card B is inserted further inward through the card accommodation portion of a sufficient size over the shutter plate 14 of the flattened shutter member 7 until the front end of the large card B engages the end wall 11, at which time the card is stopped at a predetermined position. In this state, the pad portions on the underside of the large card B come into contact with the contact portions 4*a* of the contacts 4 for electrical connection. Now, the large card B can be used for an intended purpose.

To withdraw the large card B, the user need only hold an end of the card and pull it forward, as with the small card A. With this process, the large card B can be withdrawn appropriately.

The card connector 1 of the present invention, as described above, can accept two kinds of cards A, B, large and small, without requiring the cards to have any additional means and without any trouble. Further, with the present invention, the card connector 1 itself can be manufactured to have a flat, thin, box-shaped housing with a reduced height and therefore can be suitably used on information terminal devices, such as mobile phones and karaoke microphones, and a variety of electronic devices.

Further, the card connector 1 of the present invention has a small number of moving parts, which include only the actuator members 6 and the shutter member 7 of the switching mechanisms 5. As for a terminal arrangement, the card connector 1 of the present invention requires only one row of contacts 4, contributing to a simplified structure and a reduction in size, which in turn facilitates replacement of a variety of members.

(Embodiment 2)

Figure 8:
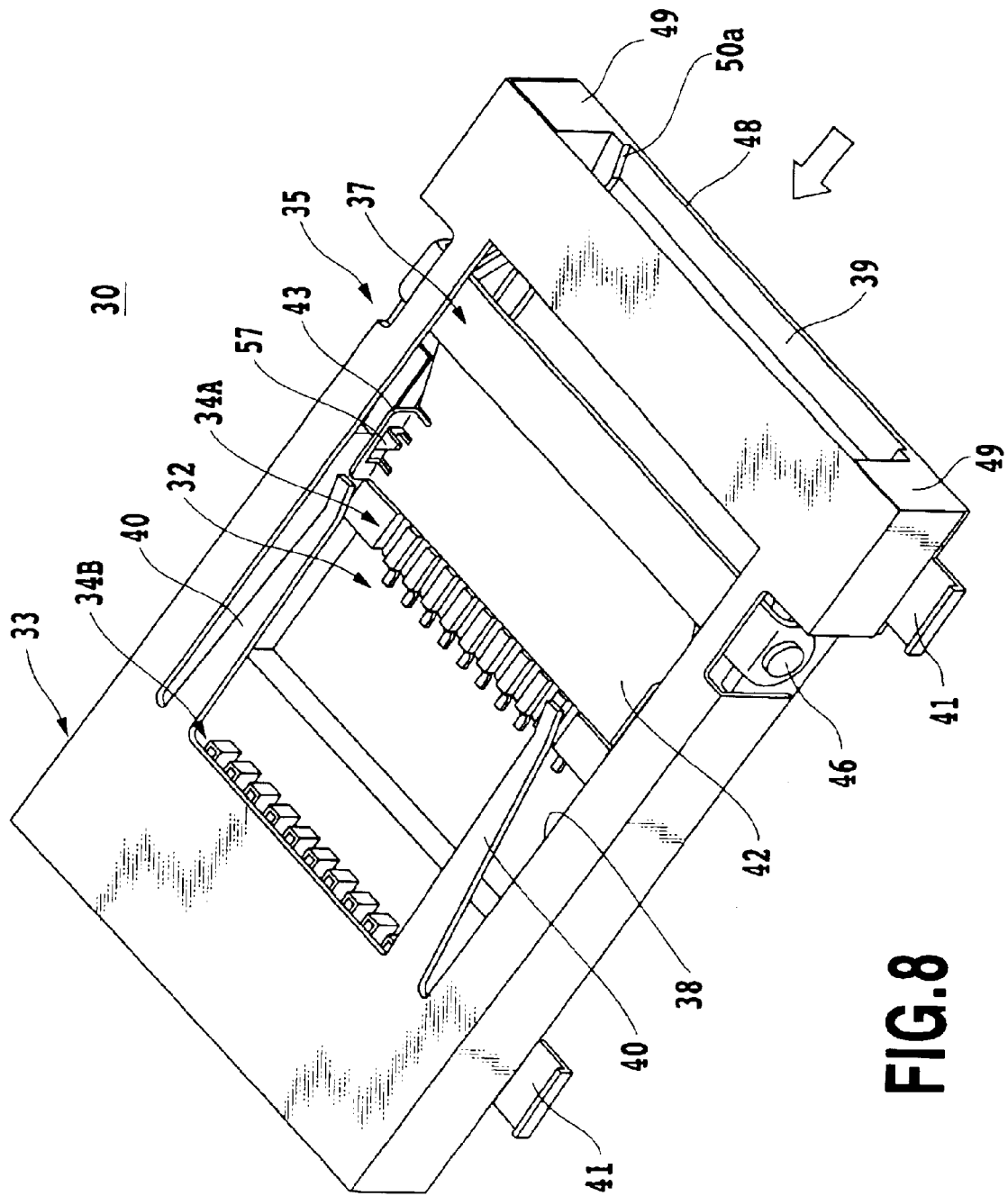
FIG. 8 is an overall perspective view showing a card connector of Embodiment 2 of the present invention as seen from a card insertion opening side.
Figure 9:
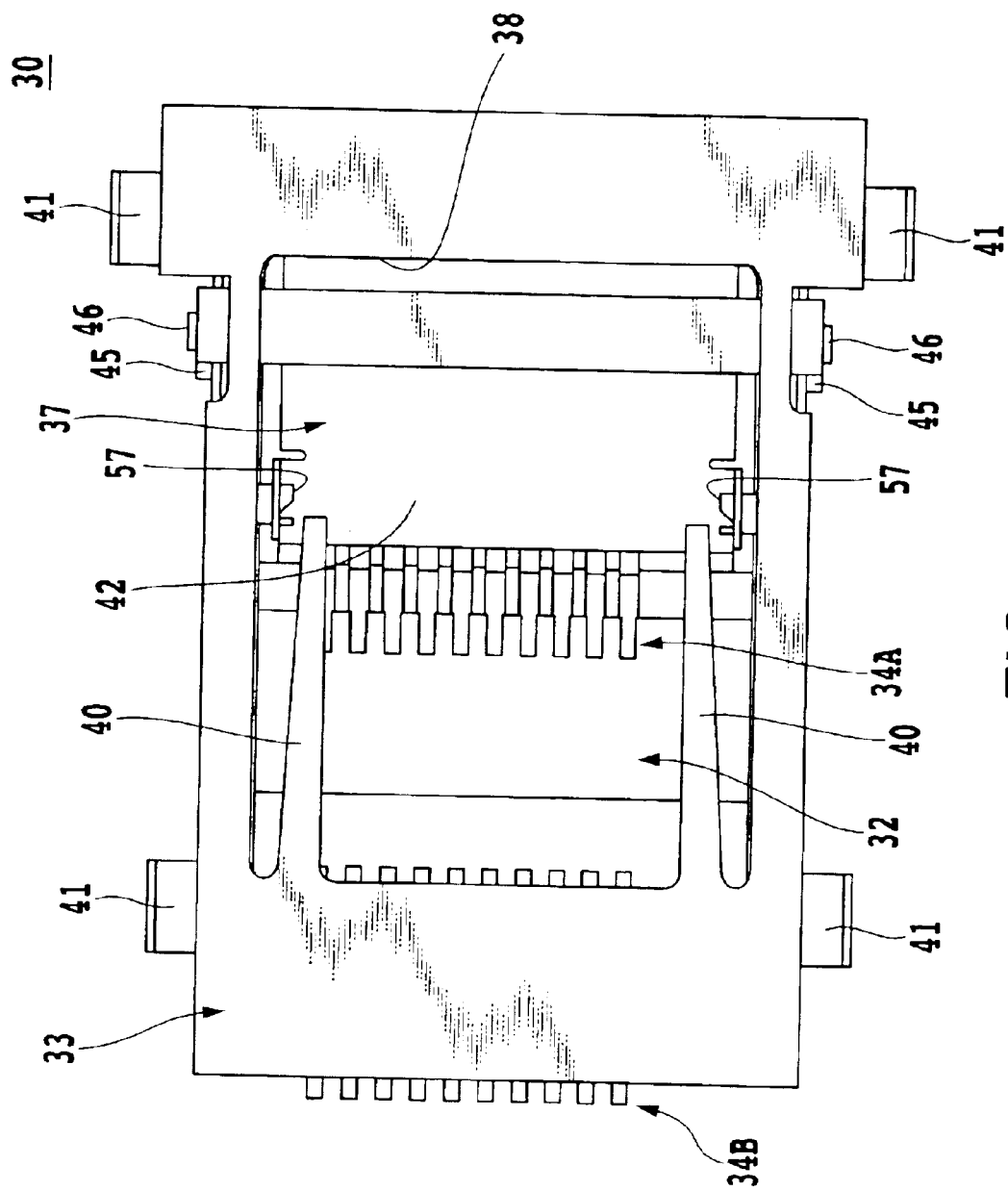
FIG. 9 is a plan view of the card connector of FIG. 8.
Figure 10:
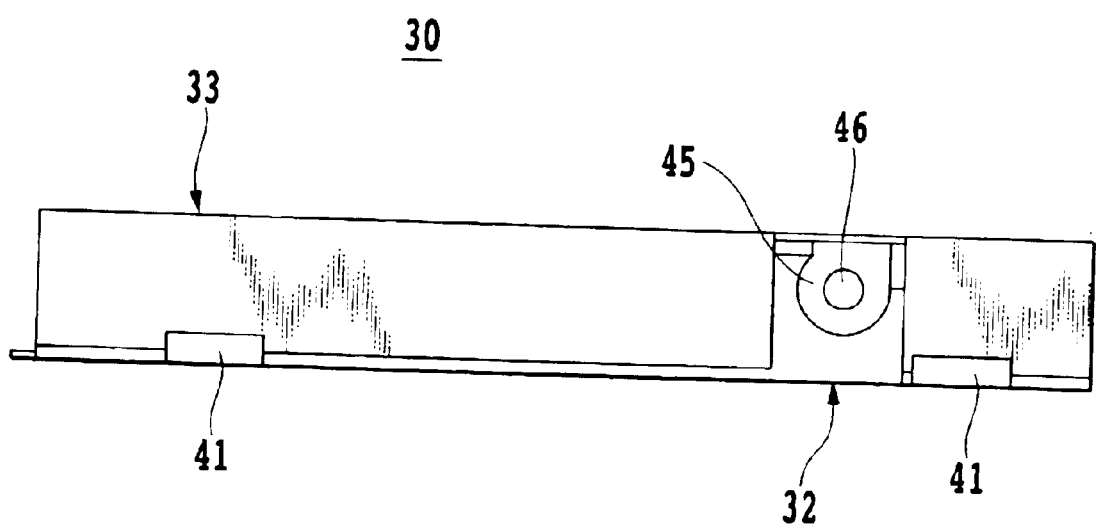
FIG. 10 is a side view of the card connector of FIG. 8.
Figure 11:
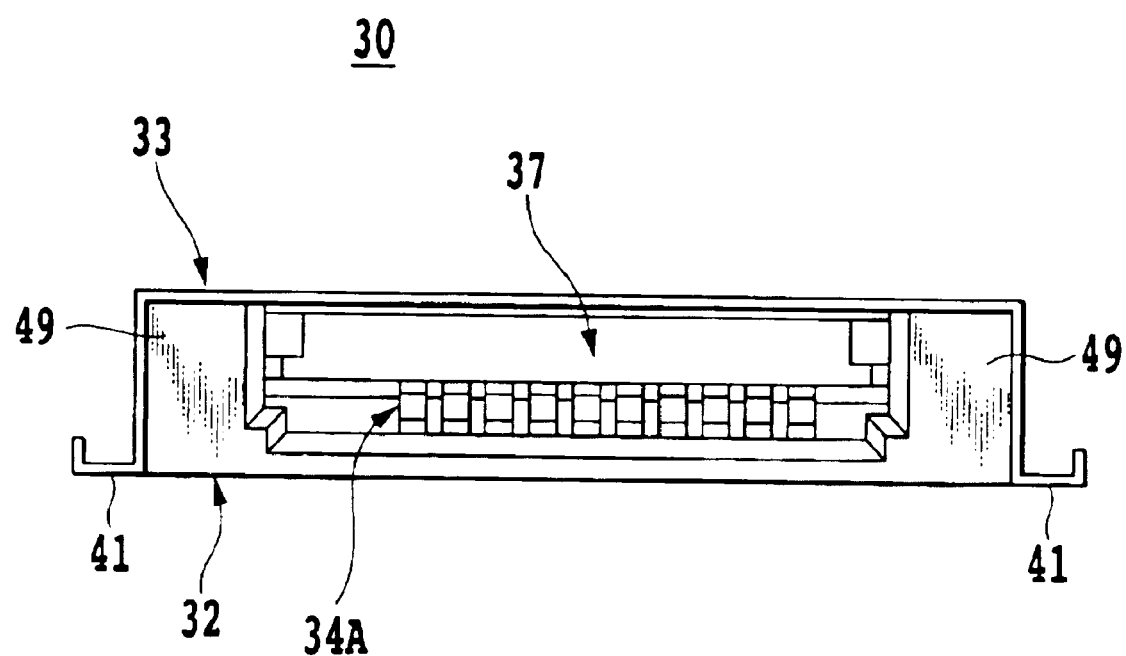
FIG. 11 is an end view of the card connector of FIG. 8 as seen from the card insertion opening.
Figure 12:
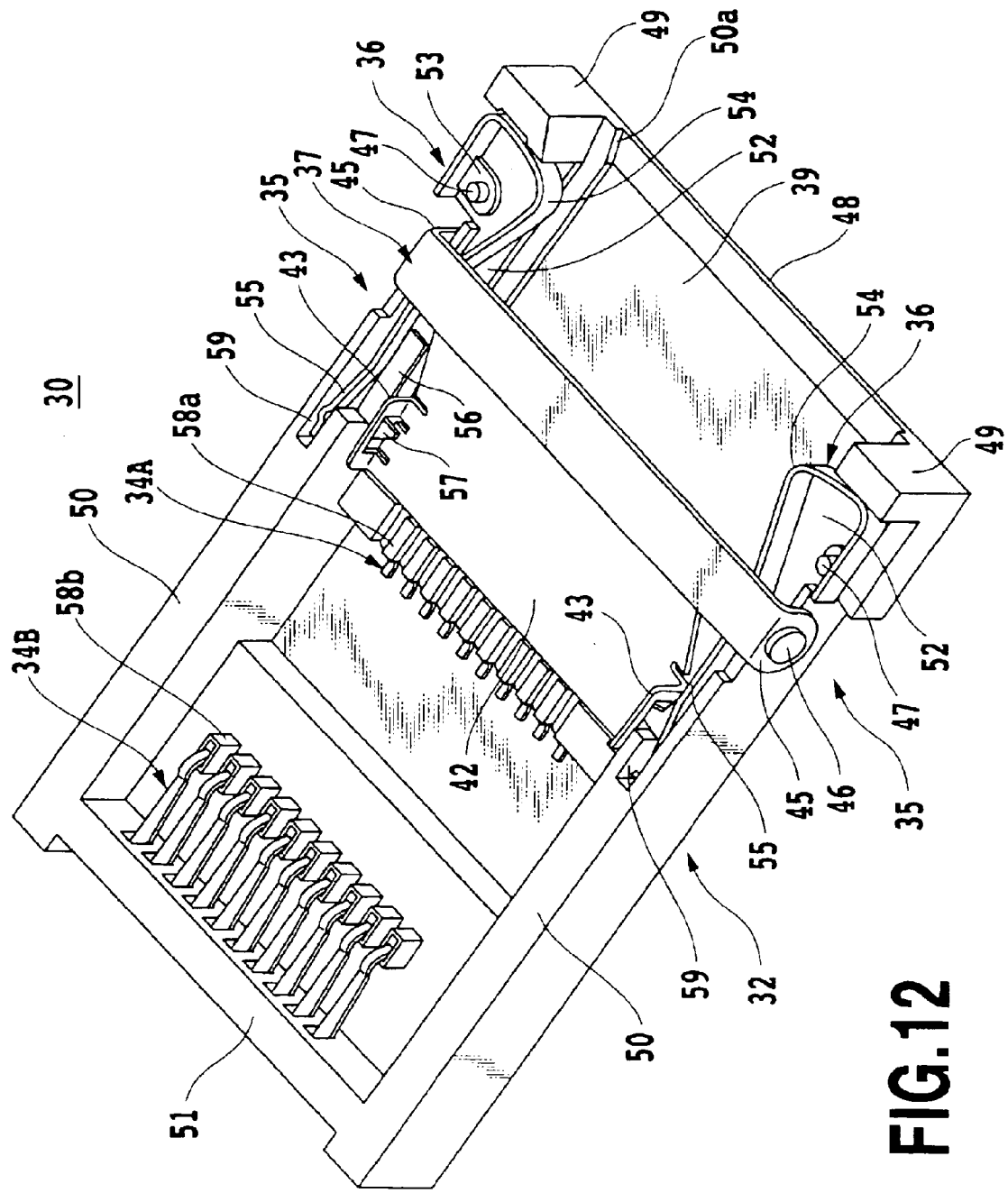
FIG. 12 is a perspective view showing the card connector of FIG. 8 according to the present invention, with a cover member removed.
Figure 13:
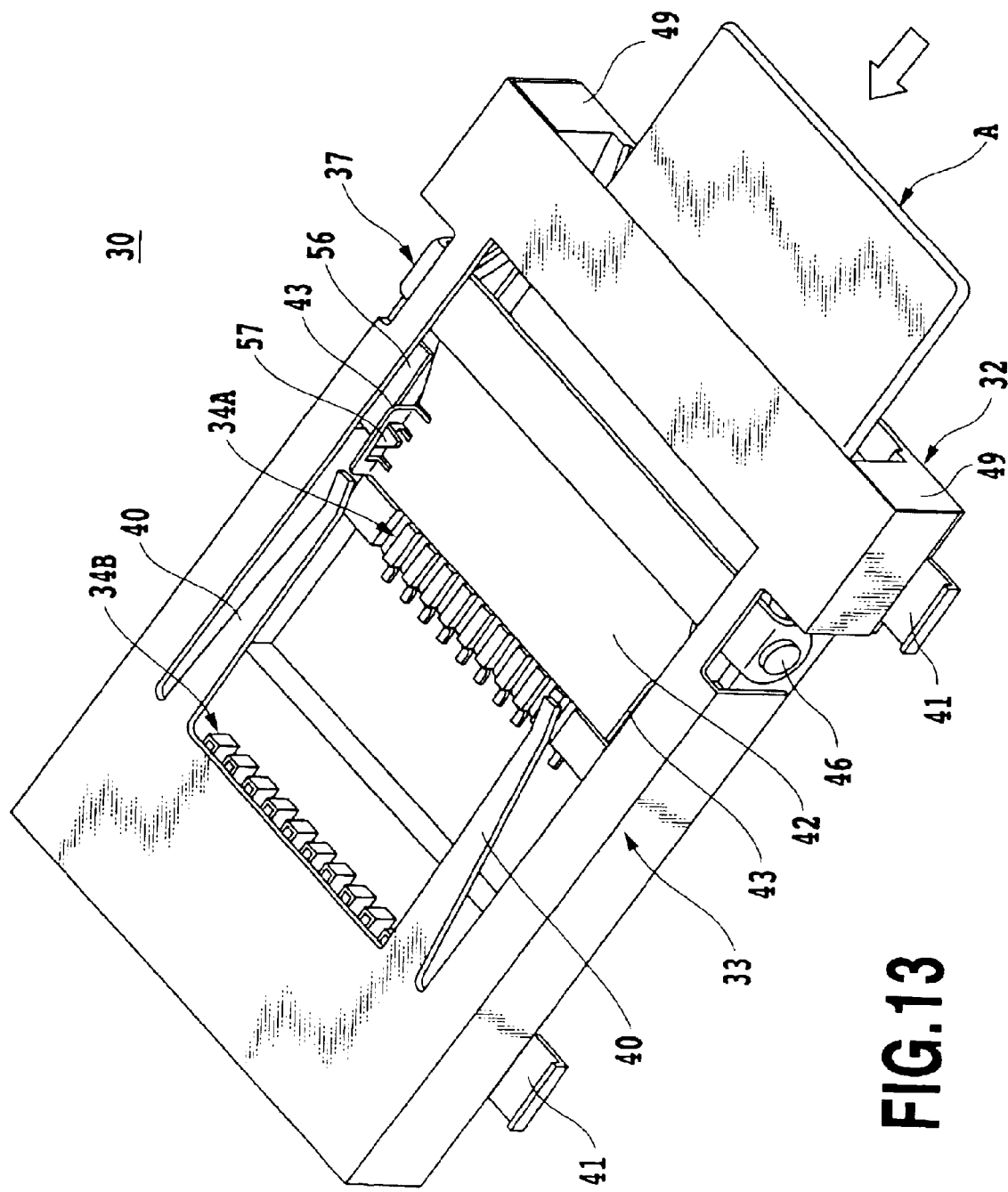
FIG. 13 is a perspective view showing the card connector of FIG. 8 according to the present invention when a small card is inserted.
Figure 14:
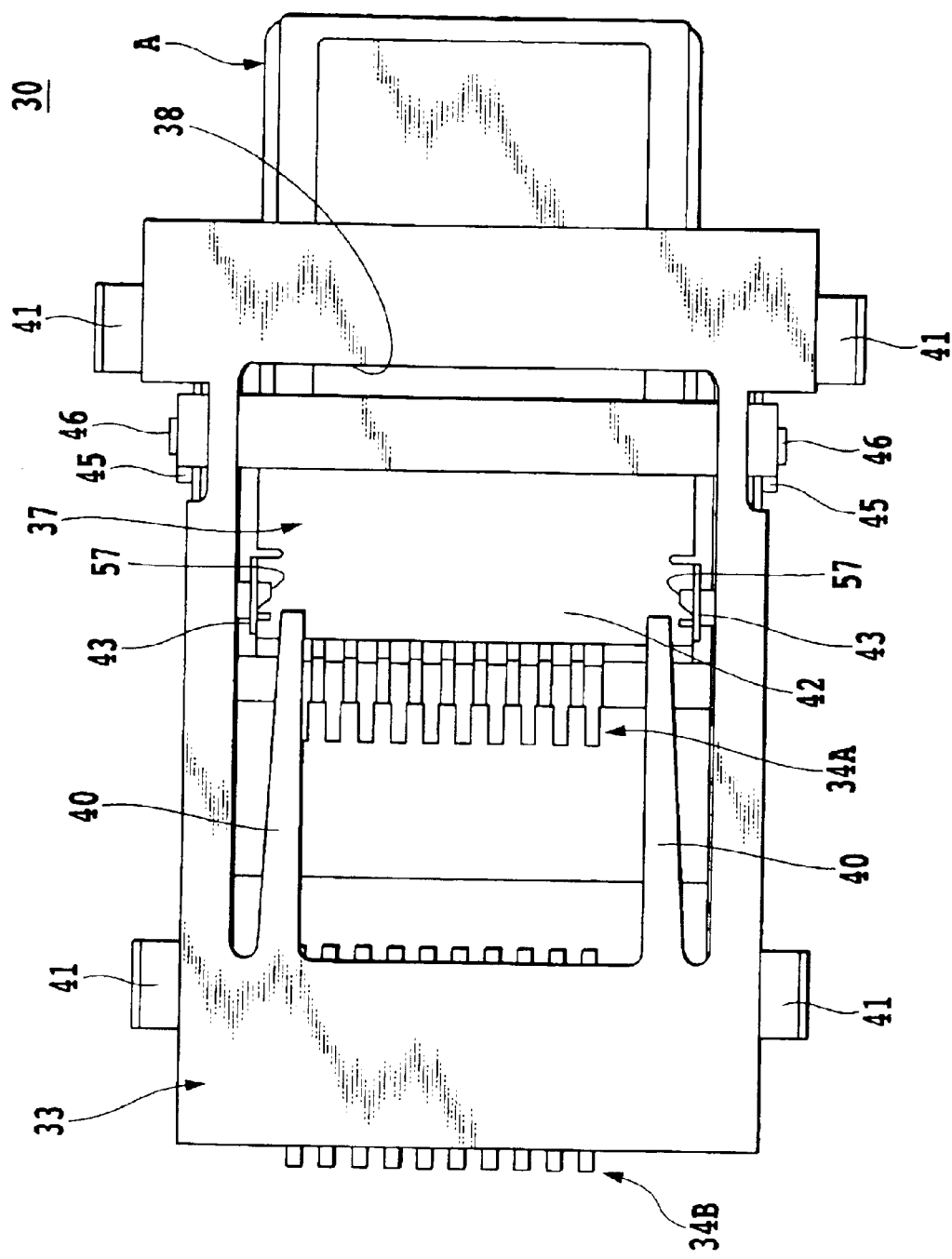
FIG. 14 is a plan view of the card connector of FIG. 13.
Figure 15:
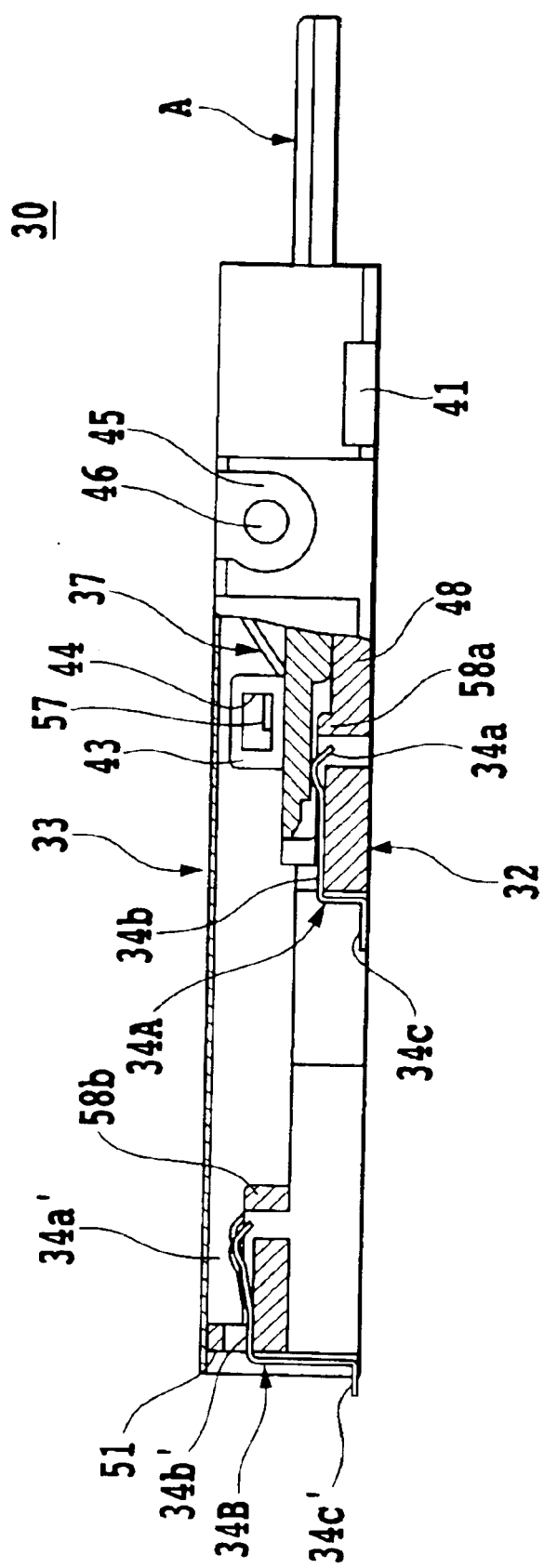
FIG. 15 is a partly cutaway side view showing the card connector of FIG. 13 according to the present invention.
Figure 16:
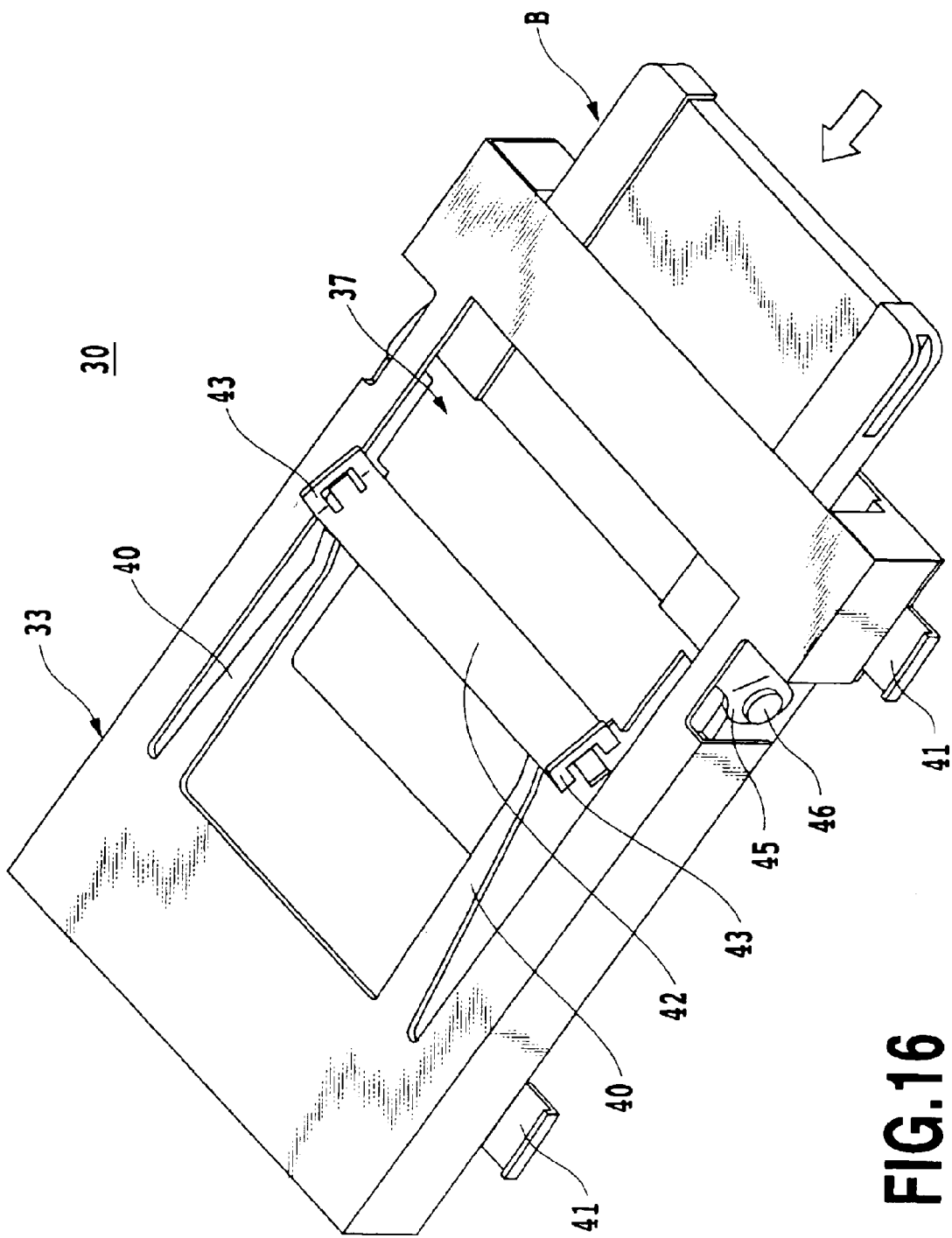
FIG. 16 is a perspective view showing the card connector of FIG. 8 according to the present invention when a large card is inserted.
Figure 17:
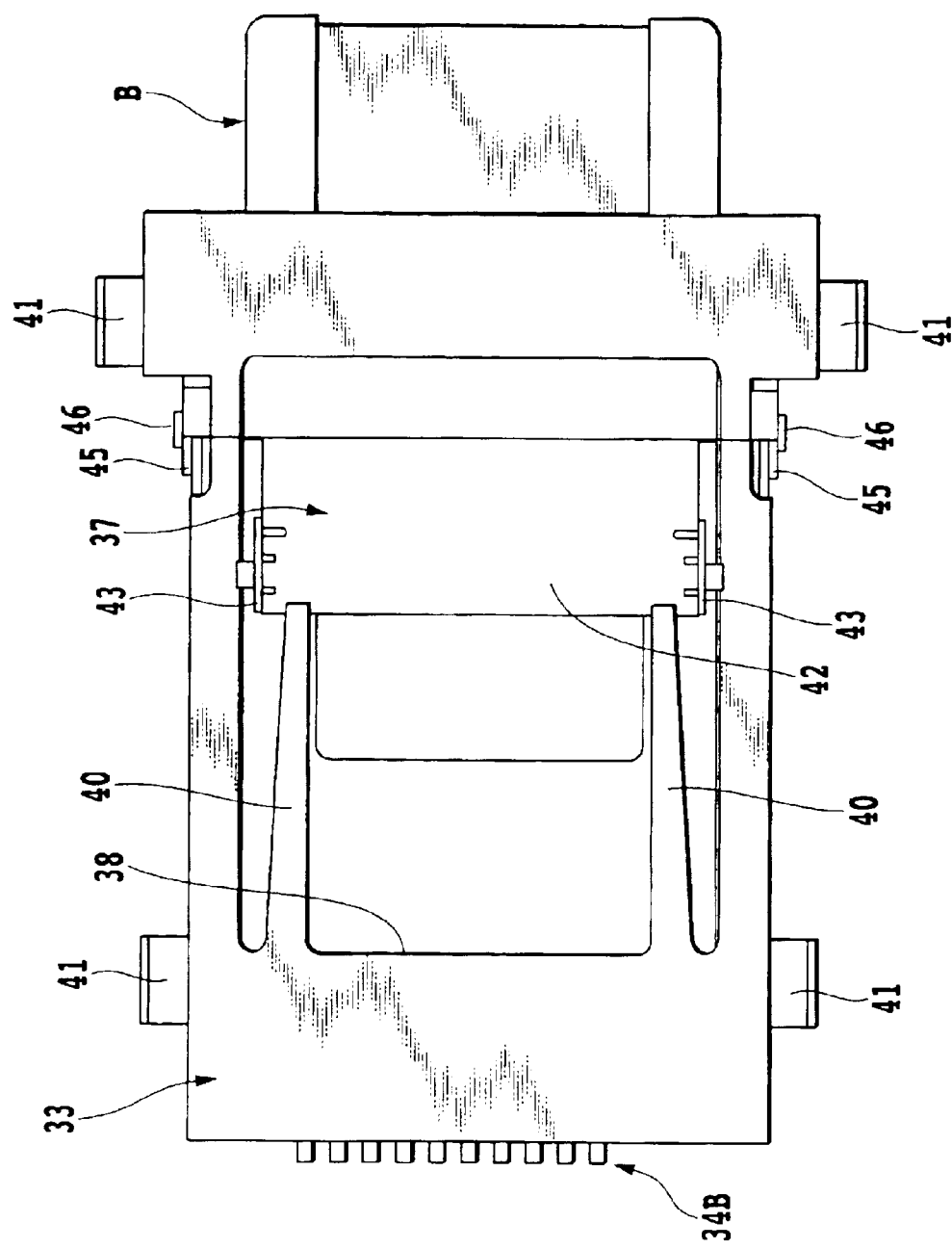
FIG. 17 is a plan view of the card connector of FIG. 16.
Figure 18:
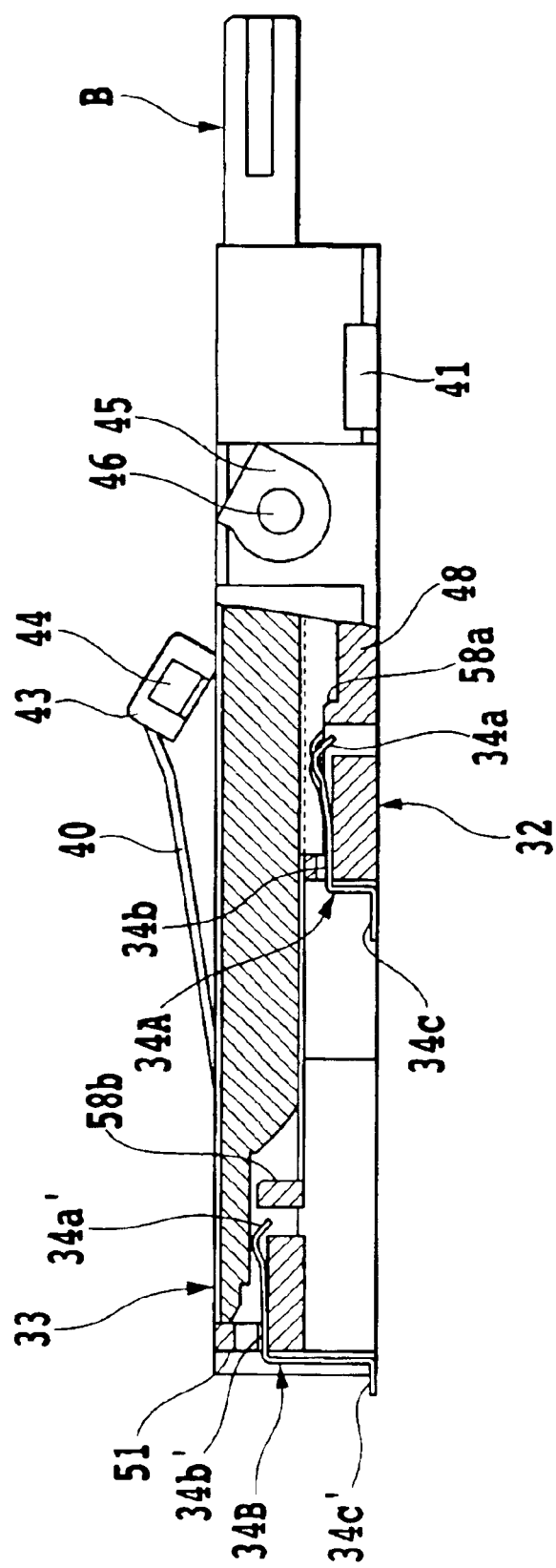
FIG. 18 is a partly cutaway side view showing the card connector of FIG. 16.

FIG. 8 to FIG. 18 illustrate a card connector as Embodiment 2 of the present invention, FIG. 8 representing an overall perspective view of the card connector of Embodiment 2 of the present invention as seen from diagonally above a card insertion opening side, FIG. 9 representing a plan view of the same, FIG. 10 representing a side view of the same, FIG. 11 representing an end view as seen from a front of the card insertion opening, FIG. 12 representing a similar perspective view of the card connector of FIG. 8 of the present invention, with a cover member removed, FIG. 13 representing a perspective view of the card connector of FIG. 8 of the present invention when a small card is inserted, FIG. 14 representing a plan view of the same, FIG. 15 representing a partly cutaway side view of the same, FIG. 16 representing a perspective view of the card connector of FIG. 8 of the present invention when a large card is inserted, FIG. 17 representing a plan view of the same, FIG. 18 representing a partly cutaway side view of the same.

As shown in these figures, a card connector 30 of Embodiment 2 of the present invention is essentially the same in construction as the card connector 1 of Embodiment 1, except that the shape of a cover member 33, actuator members 36 and a shutter member 37 of switching mechanisms 35 is partly different from that of the card connector 1 of Embodiment 1.

The card connector 30 of Embodiment 2 of the present invention includes a connector body 32, a cover member 33, a plurality of first contacts 34A arrayed in a front row for a small card, such as Memory Stick Duo (registered trademark), a plurality of second contacts 34B arrayed in a rear row for a large card, such as Memory Stick (registered trademark), and switching mechanisms 35. The switching mechanisms 35 of the card connector 30 in Embodiment 2 of the present invention comprise actuator members 36, a shutter member 37 and cantilevered shutter retainers 40 for elastically biasing the shutter member 37. In use, this card connector 30 of the present invention is mounted on information terminal devices.

The card connector 30 of the present invention has a flat box-shaped housing defined by the connector body 32 and the cover member 33 that is used in combination with the connector body 32. The card connector 30 is open on one-end side to form a card insertion opening 39. The card insertion opening 39 in the connector body 32 is suitably formed with a step so that the card insertion opening 39 can accept both a small card A and a large card B that differ in lateral width and vertical height. Further, such a step in the card insertion opening 39 can be formed either in a base portion 48 or in sidewalls 50 to prevent the small card A and large card B from being inserted upside down or rear end first. Further, on the other-end side the card connector 30 is closed by an end wall 51, along which a plurality of second contacts 34B are arrayed laterally in a rear row.

In the card connector 30 of the present invention, the first contacts 34A and the second contacts 34B have bent terminal portions 34*c*, 34*c*', respectively, for connection with terminals of other external information terminal devices and equipment and for connection with printed circuits of printed circuit boards. Further, the card connector 30 of the present invention is mounted, as by screws, to a target device or equipment such as a printed circuit board of an information terminal device through mounting flange portions 41 on both sides of the cover member 33. The cover member 33 has in its top surface an opening 38 and a pair of shutter retainers 40 in the form of cantilevered leaf springs extending forwardly from a rear edge of the opening 38.

On both sides of the card insertion opening 39 of the card connector 30 of the present invention are provided with a pair of actuator members 36, shaped like a latch arm, of the switching mechanisms 35. Between these actuator members 36 is also provided with a shutter member 37 as a closing member, which can be switched between open and closed states according to a difference in external size, such as thickness, width or length, between a small card A and a large card B.

In such a card connector 30 of the present invention, the connector body 32 is formed of an insulating material, such as synthetic resin, and is combined with the cover member 33 formed of a thin metal plate to construct a hollow, flat, box-shaped housing. The cover member 33 may also be formed of a synthetic resin material reinforced with fibers. A small card A or large card B is inserted from the card insertion opening 39 of the card connector 30 of the present invention. A plurality of first contacts 34A and a plurality of second contacts 34B are arranged in a first and a second row, respectively, in the card connector 30 so that they can make contact with pad portions arrayed on an underside of a front end portion of the inserted small card A or large card B.

The first and second contacts 34A, 34B are similarly shaped. As shown in FIG. 15 and FIG. 18, each of the first and second contacts 34A, 34B has formed at a free end thereof a contact portion 34*a*, 34*a*' which is curved up in a semicircular shape. These contact portions 34*a*, 34*a*' are positioned so as to be able to make elastic contact with the pad portions of the small card A or large card B inserted from the card insertion opening 39. Further, the first contacts 34A and the second contacts 34B are supported on support blocks 58*a* and 58*b*, respectively, that are positioned at different heights, the support blocks 58*a* being arranged independent of each other on an intermediate part of the base portion 48 of the connector body 32, the support blocks 58*b* being arranged independent of each other on the inner side of the end wall 51.

That is, the first contacts 34A in the front row mounted on the support blocks 58*a* on the base portion 48 of the connector body 32 are arranged almost flush with a surface of the base portion 48, while the second contacts 34B in the rear row mounted on the support blocks 58*b* on the inner side of the end wall 51 are situated at a slightly higher position. Therefore, the first contacts 34A and the second contacts 34B have different vertical lengths of leg portions 34*b*, 34*b*' that are bent almost at right angles and secured to the separately formed individual support blocks 58*a*, 58*b*.

Terminal portions 34*c*, 34*c*' of the first and second contacts 34A, 34B are bent almost at right angles at the leg portions 34*b*, 34*b*' along rear edges of the support blocks 58*a*, 58*b* and are situated flush with a bottom surface of the base portion 48 of the connector body 32. Further, the first contacts 34A and the second contacts 34B are mounted and secured integrally to end wall portions of the separately formed individual support blocks 58*a*, 58*b* so that the terminal portions 34*c*, 34*c*' can be connected to terminals of external devices and to circuits of printed circuit boards.

In this embodiment, too, Memory Stick Duo (registered trademark) is used as the small card A and Memory Stick (registered trademark) as the large card B. It should be noted, however, that the present invention is not limited to these cards but can also be applied properly to other similar memory cards.

The connector body 32 of the card connector 30 of Embodiment 2 of the present invention has the almost flat base portion 48 which is open at its front to form the card insertion opening 39, as shown. At the front left and right, or front corners, of the base portion 48, vertically upright support walls 49 are provided to define the card insertion opening 39. The connector body 32 has sidewalls 50 on its both sides and an end wall 51 at its rear, with the sidewalls 50 partly cut away at their front portions to form recessed portions 52. The cover member 33 is fitted to the connector body 32 of the above construction to form a flat, thin, box-shaped housing. In nearly a front half of each sidewall 50 a step 50*a* is formed to provide a guide wall for the small card A.

Further, in the open recessed portions 52 on both sides of the front part of the base portion 48, the actuator members 36 are pivotally supported by pins 47 at flange portions 53. The actuator members 36 have their leg portions 55 engaged in dents of the recessed portions 52 in the front part of the sidewalls 50 to limit an inward movement of the leg portions 55.

In the card connector 30 of the present invention as shown, the actuator members 36 of the switching mechanisms 35 are provided as switching members on both sides of the card insertion opening 39, with the shutter member 37 pivotally installed between these actuator members 36. The shutter member 37 is made from a laterally elongate, flat shutter plate 42, which is bent in cross section at a moderate angle.

Further, the shutter plate 42 of the shutter member 37 is partly bent upward at both sides of its rear part to form flange portions 43, each of which has a latch hole 44. The latch holes 44 receive latch claws 57 of the actuator members 36. The shutter member 37 has both side portions of its front part partly bent down to form flange portions 45, which are pivotally supported by pins 46 on the sidewalls 50 of the connector body 32.

The actuator members 36 of the switching mechanisms 35 are formed from an elongate bar member of a rectangular cross section which is bent almost like a letter "7" or in a deformed letter U with one short leg. The flange portion 53 is provided at the end of the shorter leg of each actuator member 36. Thus, the actuator members 36 are pivotally supported at their flange portions 53 by the pins 47 on the recessed portions 52 of the connector body 32.

A head portion of each actuator member 36 has an inner bent corner thereof work as a cam portion 54. The actuator members 36 each have a long leg portion 55, extending rearward from the cam portion 54 and provided with a plate-like latch portion 56 that protrudes inwardly. The latch portion 56 has the latch claw 57 formed on an inner side of the free end thereof which engages in the latch hole 44 of each flange portion 43 of the shutter member 37.

As described above, at one end near the card insertion opening 39, the actuator members 36 are pivotally mounted by the pins 47 on the recessed portions 52. Further, the inner corner of each actuator member 36 on the card insertion opening 39 side is formed as the cam portion 54. Therefore, when the corners on both sides of the large card B engage the cam portions 54, the actuator members 36 are pushed open outwardly about the pins 47.

This causes the latch claws 57 of the latch portions 56 of the actuator members 36 to disengage from the latch holes 44 of the shutter member 37, with the result that the shutter member 37 is released from the actuator members 36 and set free. Thus, the inserted large card B can now push up the free shutter member 37 and advance inward. In this way, the large card B is allowed to be inserted completely until the pad portions at the front end portion of the large card B come into contact with the second contacts 34B for electrical connection.

In the card connector 30 of the above construction, operations performed as a small card A and a large card B are inserted will be explained as follows.

First, the small card A is inserted from the card insertion opening 39 of the card connector 30 of the present invention, as shown in FIG. 14 to FIG. 16.

The small card A may, for example, be a card called Memory Stick Duo which has small external dimensions in thickness, length and width as shown. This small card A has a width equal to a normal distance between the paired actuator members 36 in the card connector 30. So, when the small card A is inserted into the card connector 30 from the card insertion opening 39, it can be inserted smoothly without any interference. Since the small card A does not contact the actuator members 36, the actuator members 36 are not moved at all.

Therefore, the actuator members 36 remain in a state in which the latch claws 57 of the latch portions 56 are engaged in the latch holes 44 of the shutter member 37 which are held at the lower position. At this time, the shutter retainers 40 as leaf springs are out of contact with the shutter member 37 and do not restrict the movement of the shutter member 37.

The small card A then advances between the cam portions 54 of the actuator members 36 and move below the shutter member 37 deep into the card connector 30 until the pad portions at the front end part of the small card A come into contact with the first contacts 34A arrayed in the front row, at which time the card stops at a predetermined position. In this state, the pad portions on the underside of the small card A are connected with the contact portions 34a of the first contacts 34A. Now, the small card A can be used for an intended purpose.

To withdraw the small card A, the user need only hold an end of the card and pull it forward. With this process, the small card A can be withdrawn appropriately.

Next, when a large card B is used, it is inserted from the card insertion opening 39 of the card connector 30 of the present invention, as shown in FIG. 16 to FIG. 18.

The large card B may, for example, be a card called Memory Stick which has large external dimensions in thickness, length and width as shown. This large card B has a width larger than the normal distance between the paired actuator members 36 in the card connector 30 of the present invention. Thus, when the large card B is inserted into the card connector 30 from the card insertion opening 39, front corners of the large card B engage and push the cam portions 54 of the actuator members 36, causing the actuator members 36 to pivot about the pins 47 to open outwardly, so that the leg portions 55 move outwardly disengaging the latch claws 57 of the latch portions 56 from the latch holes 44 of the flange portions 43 of the shutter member 37, releasing the shutter member 37 from the latch lock.

The subsequent insertion of the large card B pushes up the shutter plate 42 of the shutter member 37. Now, the shutter plate 42 is biased downward by the shutter retainers 40 as shown in FIG. 18. The large card B pushes up the shutter plate 42 of the shutter member 37 against the retaining force of the shutter retainers 40 and advances further inward below the shutter member 37 until the front end of the card engages the end wall 51, at which time the card is stopped at a predetermined position. In this state, the pad portions on the underside of the large card B are connected with the contact portions 34a' of the second contacts 34B. Now, the large card B can be used for an intended purpose.

To withdraw the large card B, the user need only hold an end of the card and pull it forward, as with the small card A. With this process, the large card B can be withdrawn appropriately.

The card connector 30 of the present invention, as described above, can accept two kinds of cards A, B, large and small, without requiring the cards to have any additional means and without any trouble. Further, with the present invention, the card connector 30 can be manufactured to have a flat, thin, box-shaped housing with a reduced height and therefore can be suitably used on information terminal devices, such as mobile phones and karaoke microphones, and a variety of electronic devices. Further, the card connector 30 of the present invention has a small number of moving parts, which include only the actuator members 36 and the shutter member 37 of the switching mechanisms 35. As for a terminal arrangement, the first and second contacts 34A, 34B are arrayed in rows, contributing to a simplified structure and a reduction in size, which in turn facilitates replacement of a variety of members.

(Embodiment 3)

Figure 19:
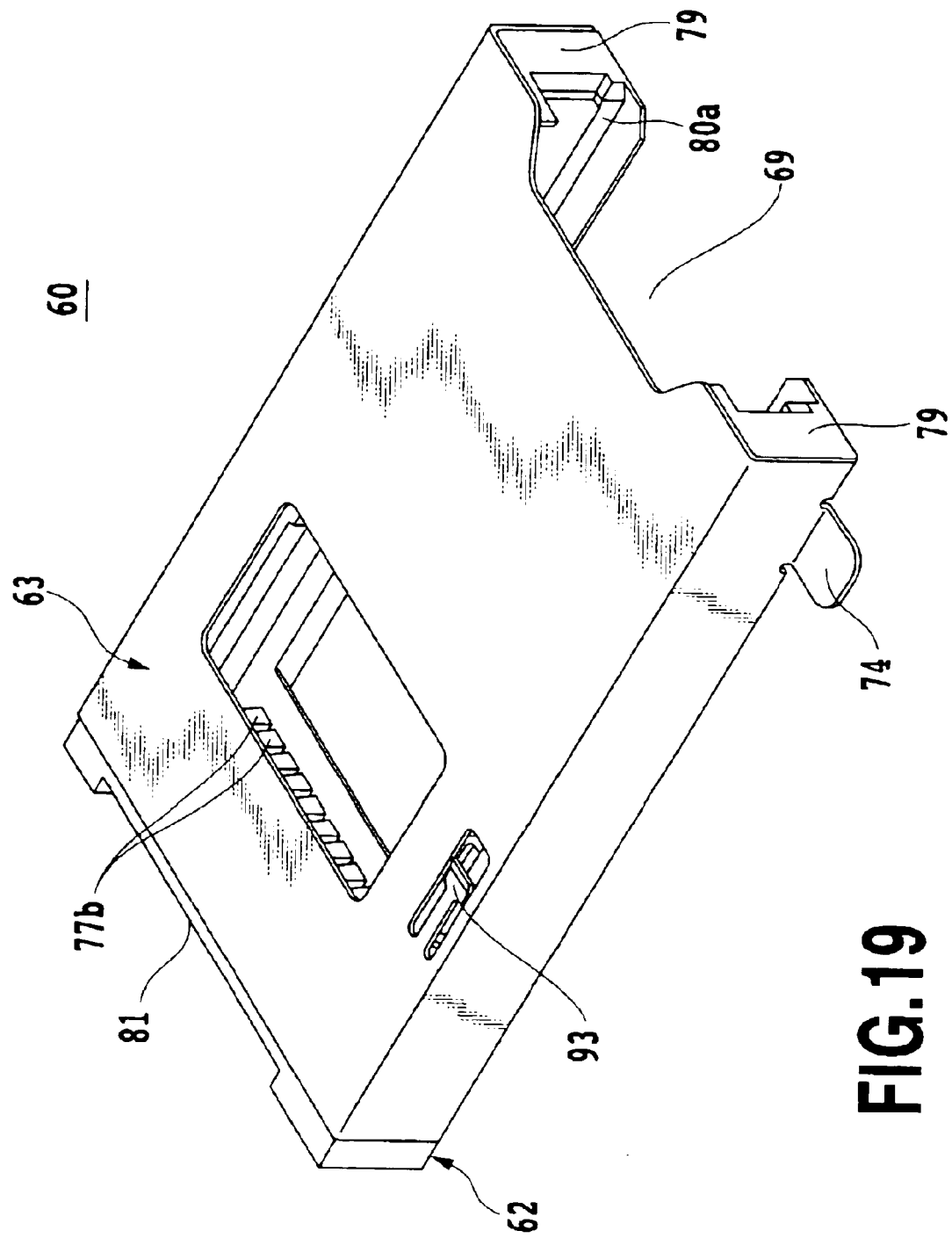
FIG. 19 is an overall perspective view showing a card connector of Embodiment 3 of the present invention as seen from a card insertion opening side.
Figure 20:
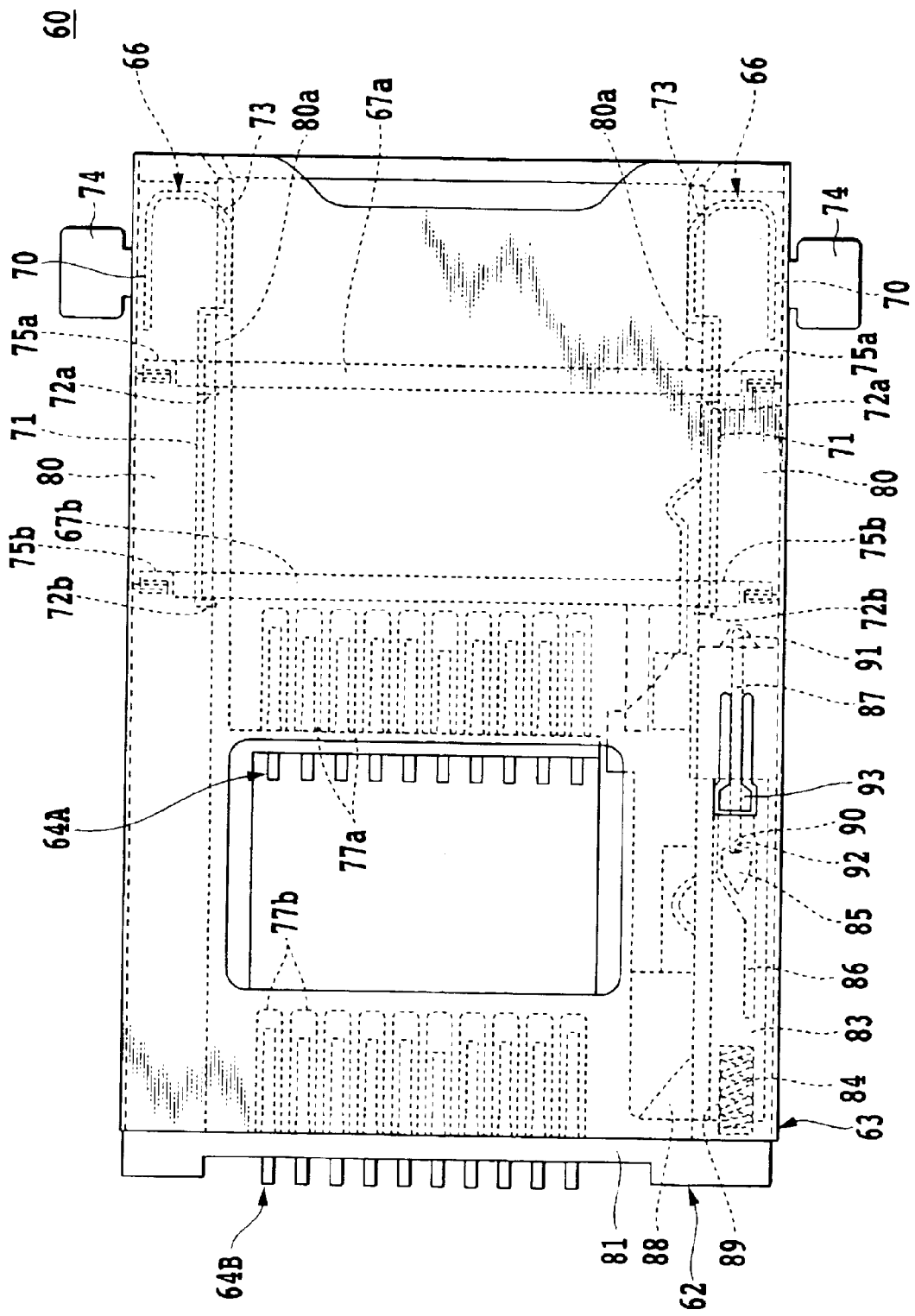
FIG. 20 is a plan view of the card connector of FIG. 19.
Figure 21:
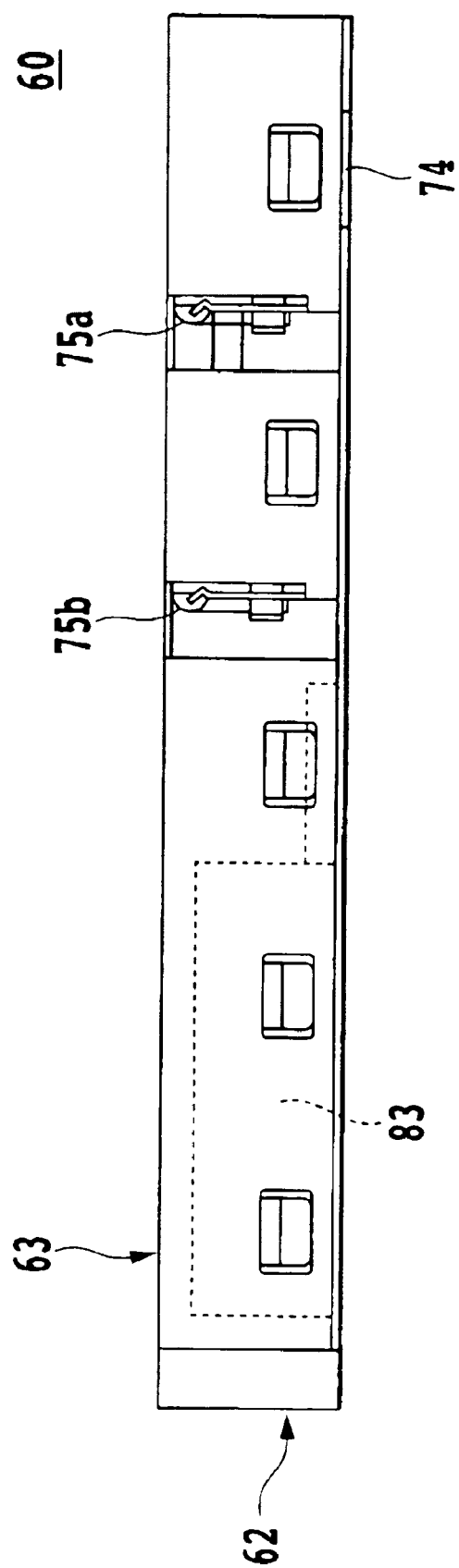
FIG. 21 is a side view of the card connector of FIG. 19.
Figure 22:
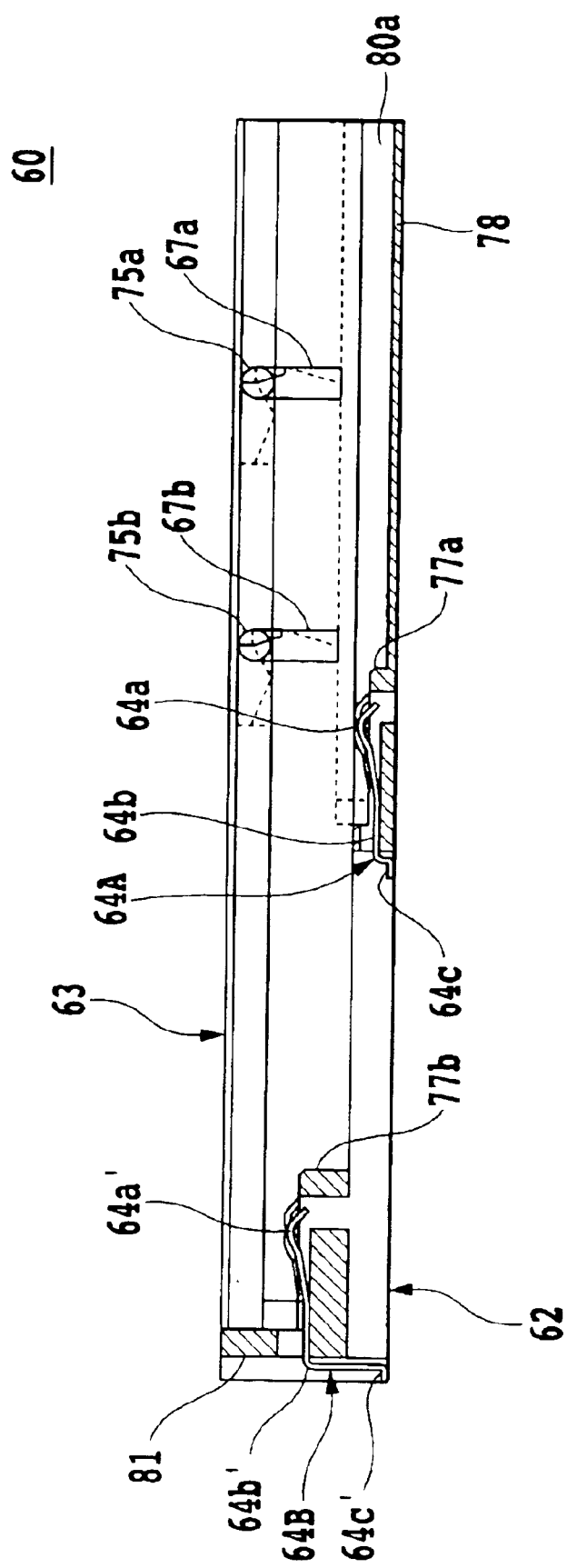
FIG. 22 is a side cross-sectional view of the card connector of FIG. 19.
Figure 23:
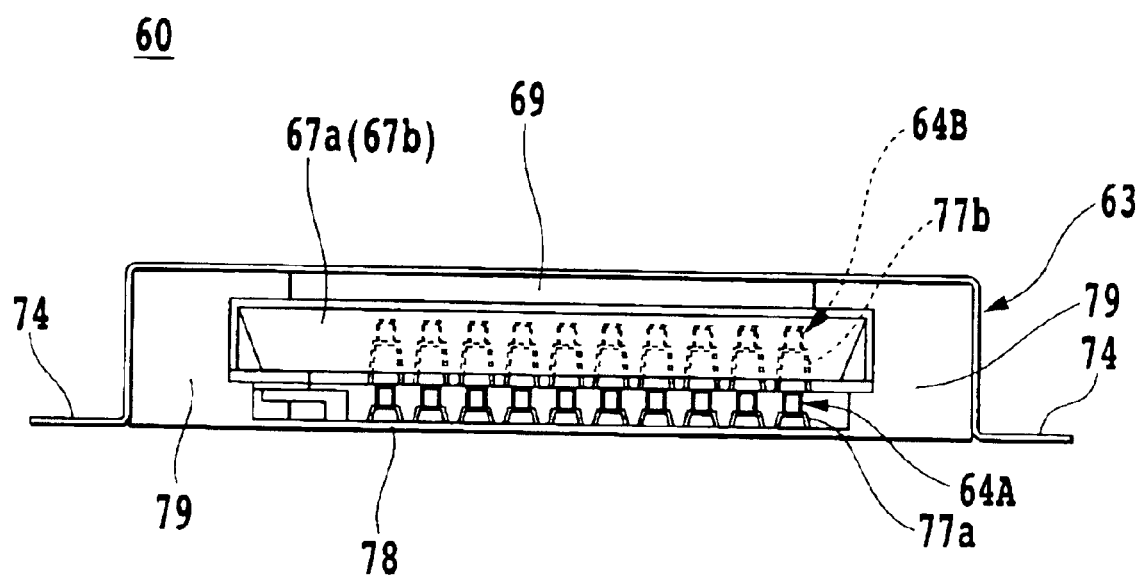
FIG. 23 is an end view of the card connector of FIG. 19 as seen from the card insertion opening.
Figure 24:
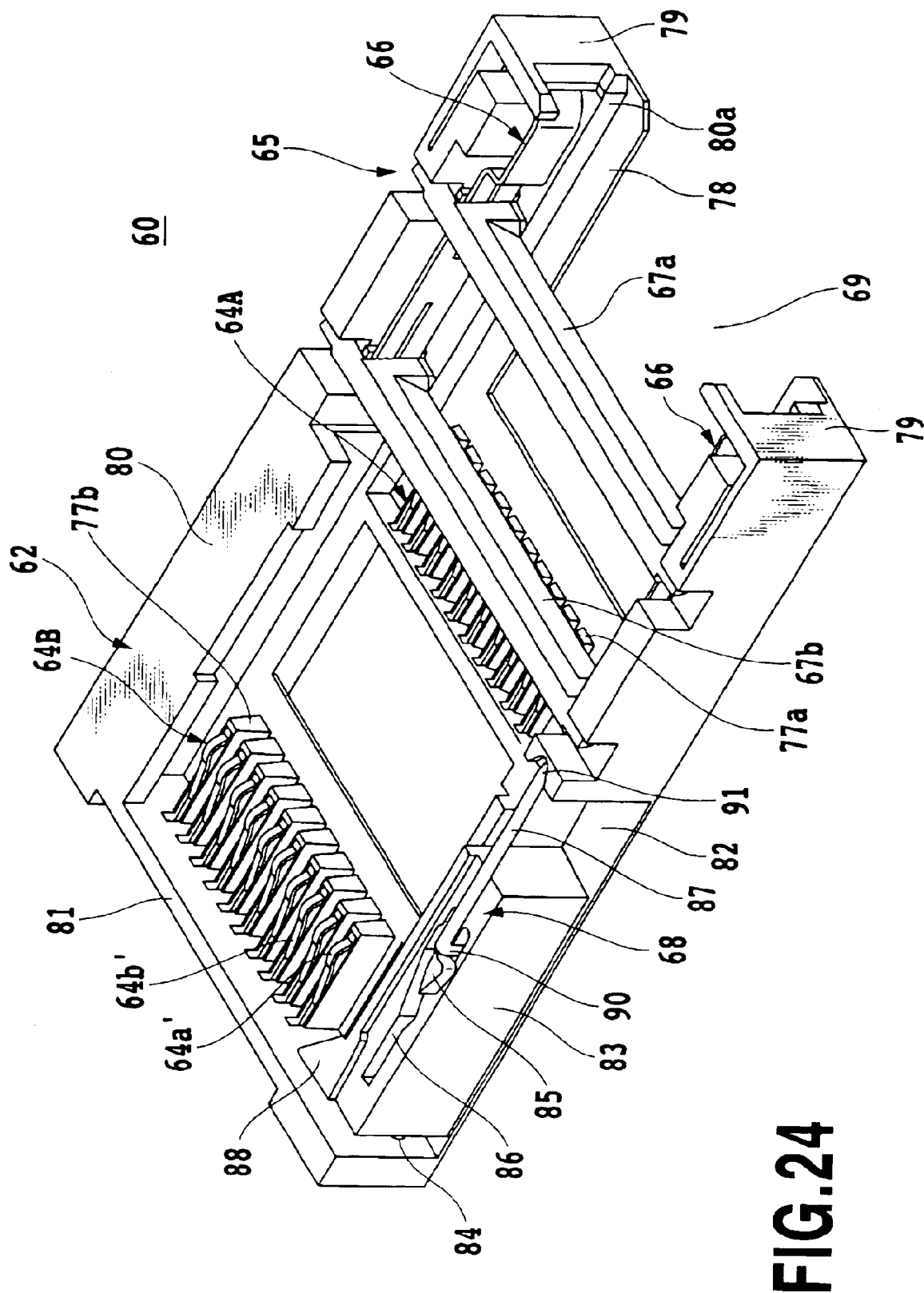
FIG. 24 is a perspective view showing the card connector of FIG. 19 according to the present invention, with a cover member removed.
Figure 25:
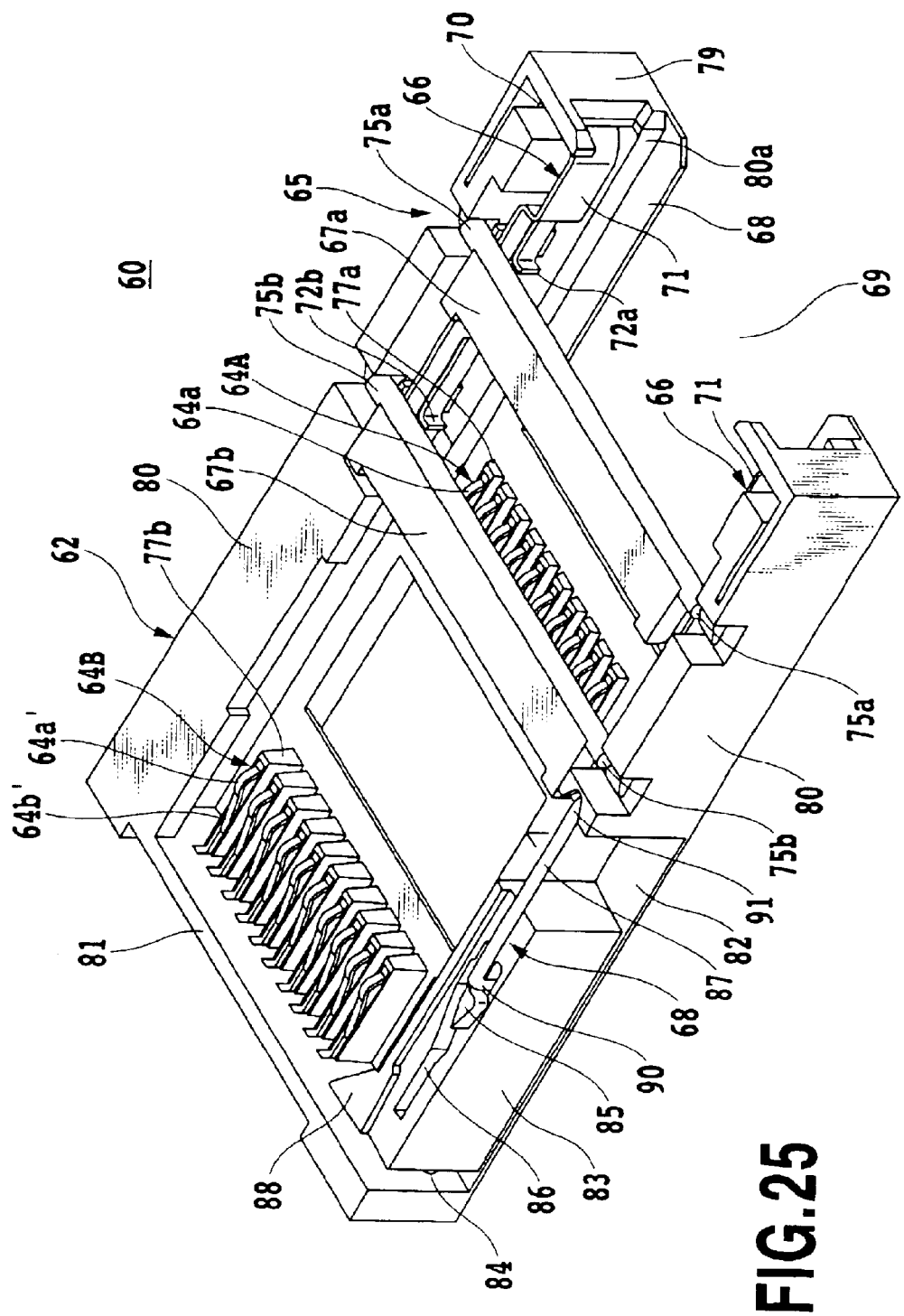
FIG. 25 is a perspective view showing the card connector of FIG. 24, with a shutter member open.
Figure 26:
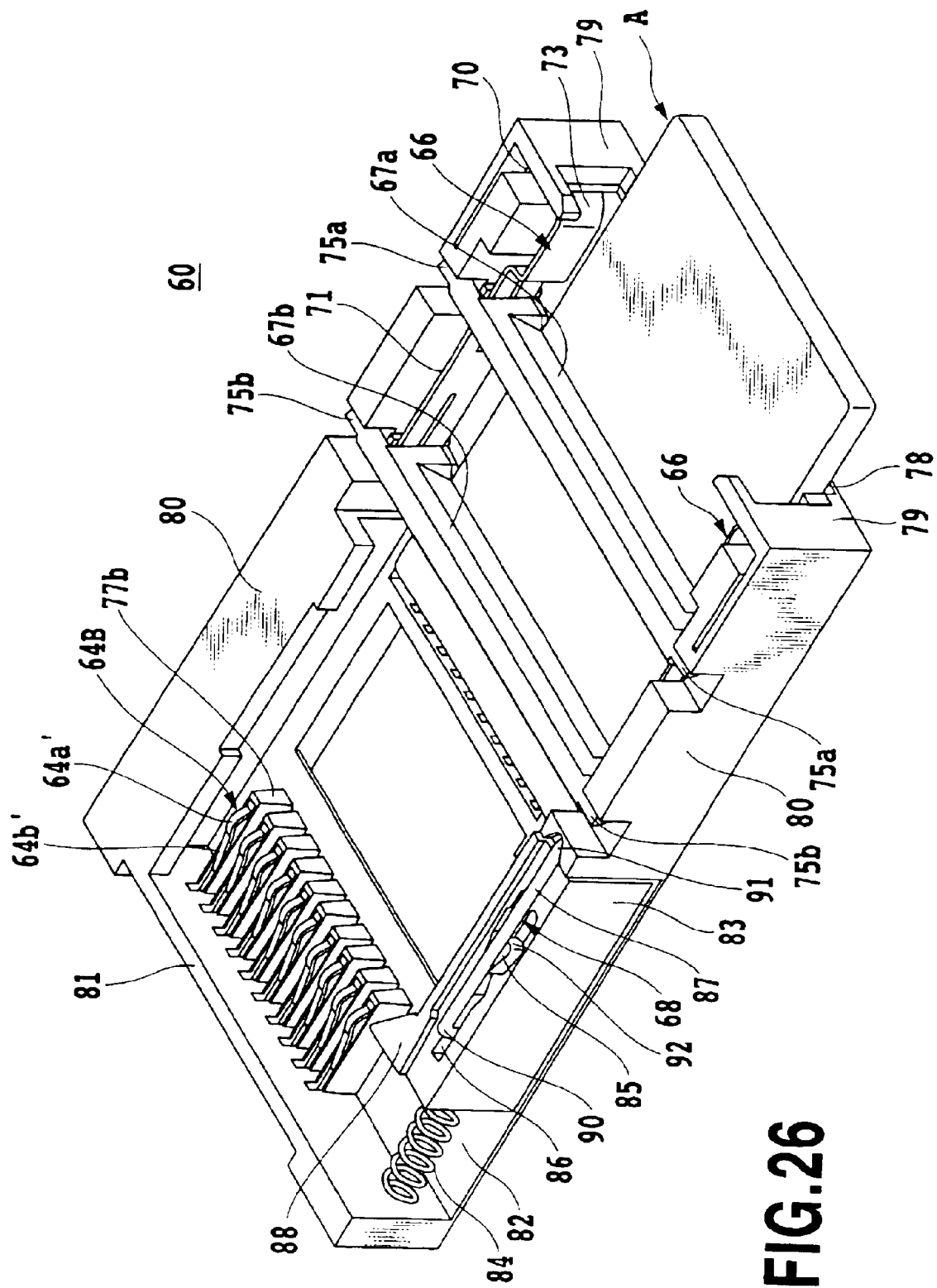
FIG. 26 is a perspective view showing the card connector of FIG. 24 according to the present invention when a small card is inserted.
Figure 27:
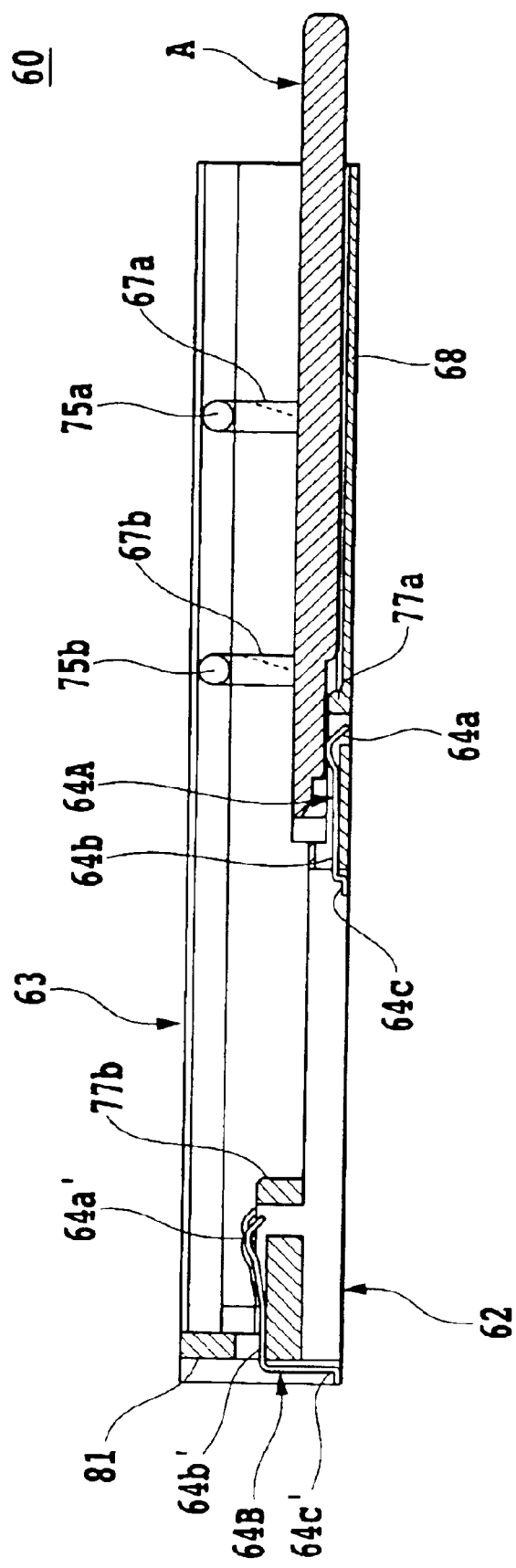
FIG. 27 is a side cross-sectional view of the card connector of FIG. 26.
Figure 28:
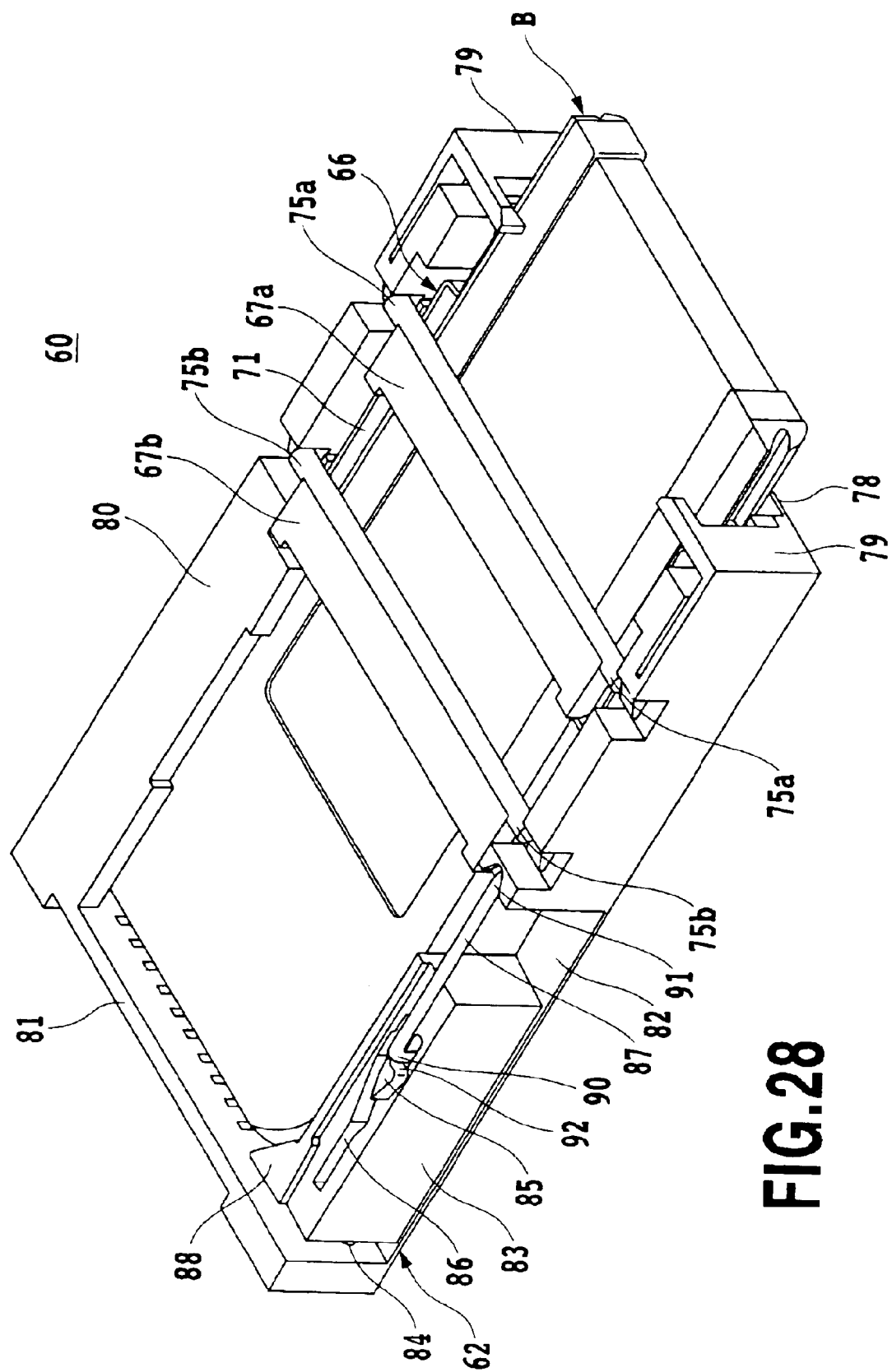
FIG. 28 is a perspective view showing the card connector of FIG. 24 according to the present invention when a large card is inserted.
Figure 29:
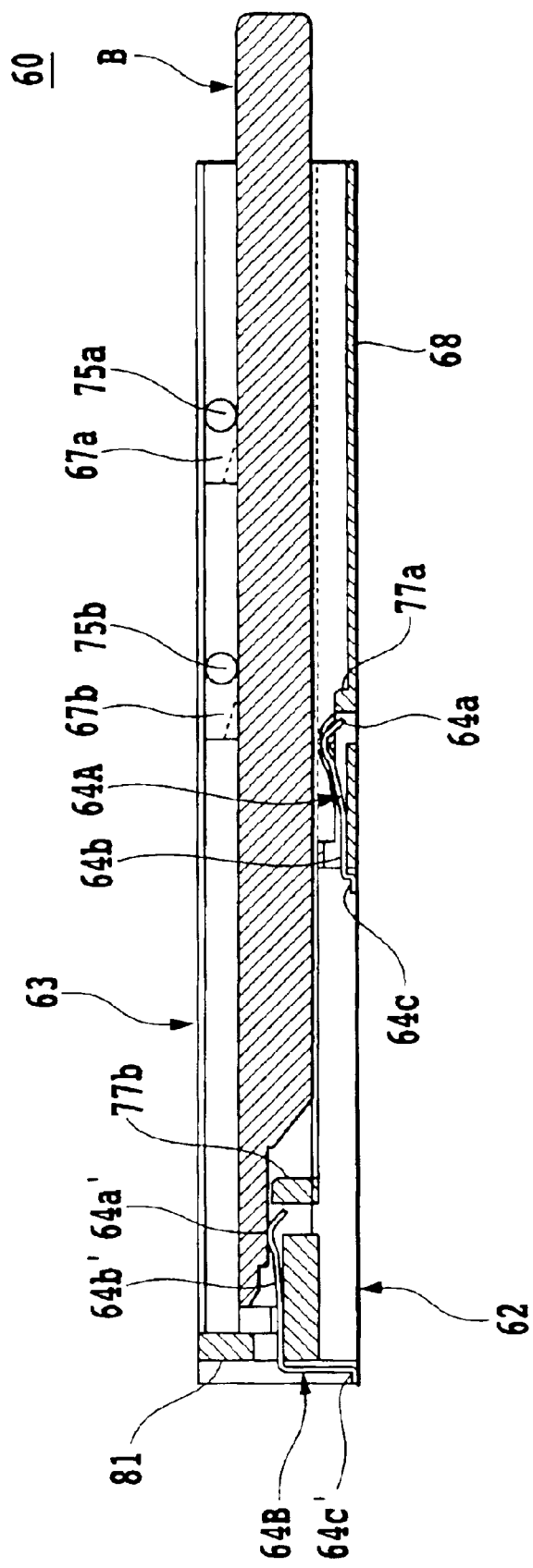
FIG. 29 is a side cross-sectional view of the card connector of FIG. 28.

FIG. 19 to FIG. 29 illustrate a card connector as Embodiment 3 of the present invention, FIG. 19 representing an overall perspective view of the card connector of Embodiment 3 of the present invention as seen from a card insertion opening side, FIG. 20 representing a plan view of the same, FIG. 21 representing a side view of the same, FIG. 22 representing a side cross-sectional view of the same, FIG. 23 representing an end view as seen from the card insertion opening side, FIG. 24 representing a similar perspective view of the card connector of FIG. 19 of the present invention, with a cover member removed, FIG. 25 representing a similar perspective view of the card connector of FIG. 24 when a shutter member is opened, FIG. 26 representing a similar perspective view of the card connector of FIG. 24 of the present invention when a small card A is inserted, FIG. 27 representing a side cross-sectional view of the same, FIG. 28 representing a perspective view of the card connector of FIG. 24 of the present invention when a large card B is inserted, FIG. 29 representing a side cross-sectional view of the same.

As shown in these figures, a card connector 60 of Embodiment 3 of the present invention is essentially the same in construction as the card connectors 1, 30 of Embodiment 1 and Embodiment 2, except that the card connector 60 of this embodiment has two shutter members 67a, 67b in switching mechanisms 65 and also has an eject mechanism 68 for a large card B.

As shown in FIG. 19 to FIG. 24, the card connector 60 of the present invention has a connector body 62, a cover member 63, a plurality of first contacts 64A and a plurality of second contacts 64B, switching mechanisms 65, and an eject mechanism 68. The switching mechanisms 65 of the card connector 60 of the present invention comprise the actuator members 66, the two shutter members 67a, 67b, and the eject mechanism 68 for ejecting a large card B. In use, the card connector 60 of this construction is mounted, for example, on information terminal devices.

The card connector 60 of the present invention has a flat box-shaped housing defined by the connector body 62 and the cover member 63 that is used in combination with the connector body 62. The card connector 60 is open on one-end side to form a card insertion opening 69. The card insertion opening 69 in the connector body 62 is suitably formed with a step so that the card insertion opening 69 can accept both a small card A and a large card B that differ in lateral width and vertical height. Further, such a step in the card insertion opening 69 can be formed either in a base portion 78 or in sidewalls 80 to prevent the small card A and large card B from being inserted upside down or rear end first. In this embodiment, a step 80a is formed in nearly a front half of each sidewall 80 to provide a guide wall for the small card A.

Further, on the other-end side the card connector 60 is closed by an end wall 81, along which a plurality of second contacts 64B are arrayed. These first and second contacts 64A, 64B have terminal portions 64c, 64c' extending rearward for connection with terminals of other external information terminal devices and equipment. Further, the card connector 60 of the present invention is mounted, as by screws, to a target device or equipment such as a printed circuit board of an information terminal device through mounting flange portions 74 on both sides of the cover member 63.

On both sides of the card insertion opening 69 of the card connector 60 of the present invention are provided with a pair of actuator members 66, shaped like a latch arm, of the switching mechanisms 65. Between these actuator members 66 are provided with two shutter members 67a, 67b as closing members, which can be switched between open and closed states according to a difference in external size, such as thickness, width or length, between a small card A and a large card B.

In such a card connector 60 of the present invention, the connector body 62 is formed of an insulating material, such as synthetic resin, and is combined with the cover member 63 formed of a thin metal plate to construct a hollow, flat, box-shaped housing. A small card A or large card B is inserted from the card insertion opening 69 of the card connector 60 of the present invention. A plurality of first contacts 64A and a plurality of second contacts 64B are arranged in the card connector 60 so that they can make contact with pad portions arrayed on an underside of a front end portion of the inserted small card A or large card B.

The first and second contacts 64A, 64B are similarly shaped. Each of the first and second contacts 64A, 64B has formed at a free end thereof a contact portion 64a, 64a' which is curved up in a semicircular shape. These contact portions 64a, 64a' are positioned so as to be able to make elastic contact with the pad portions of the small card A or large card B inserted from the card insertion opening 69.

The first contacts 64A are put on individually separate support blocks 77a that are arranged on a middle of the base portion 78 of the connector body 62. The second contacts 64B are placed on individually separate support blocks 77b that are arranged on a rear part of the connector body 62. The support blocks 77b are situated higher than the support blocks 77a, as shown in FIG. 22 and FIG. 23.

Thus, the second contacts 64B are situated at a position higher than the first contacts 64A. Further, these first and second contacts 64A, 64B have their intermediate leg portions 64b, 64b' mounted and integrally secured to the support blocks 77a, 77b respectively. Terminal portions 64c, 64c' of these contacts to be connected with external devices are positioned flush with a bottom surface of the base portion 78 of the connector body 62.

The card connector 60 of this embodiment may use "Memory Stick Duo" (registered trademark) as a small card A and "Memory stick" (registered trademark) as a large card B. The present invention, however, is not limited to the use of these cards or memory sticks but can also be applied satisfactorily to other memory cards, such as SD cards, IC cards and SIM cards.

In the card connector 60 of the present invention, the actuator members 66 of the switching mechanisms 65 are provided on both sides of the card insertion opening 69, and two shutter members 67a, 67b are pivotally installed between these actuator members 66.

Each of the actuator members 66 is made by bending an elongate metal strip member into roughly a shape of letter U so that it is elastically deformable, with an outer leg portion 70 formed short and removably secured to the sidewall 80. An inner leg portion 71 is formed long and has a first latch claw 72a and a second latch claw 72b. The first and second latch claws 72a, 72b of each actuator member 66 engage the inner surfaces of the first and second shutter members 67a, 67b to hold the first and second shutter members 67a, 67b immovable. The actuator members 66 of such a construction are switching members.

The actuator members 66 have a cam portion 73 formed at an inner bent corner thereof. When corners of the large card B engage and push these cam portions 73, the longer leg portions 71 of the actuator members 66 are elastically deformed to open outwardly, disengaging the first and second latch claws 72a, 72b of the inner leg portions 71 from the first and second shutter members 67a, 67b to release the shutter members from the latch lock.

These first and second shutter members 67a, 67b are made of laterally elongate plate members and have support pins 75a, 75b protruding laterally from both ends of the plate members. These support pins 75a, 75b are partly cut into a semicircular shape and, at circular portions, are pivotally supported on the sidewalls 80 of the connector body 62. The semicircular portions of the support pins 75a, 75b are engaged under pressure by leaf spring-like retainer pins 76a, 76b vertically rising from the sidewalls 80.

Thus, when the front end of the large card B engages the corner cam portions 73 of the actuator members 66, the longer leg portions 71 of the actuator members 66 are elastically deformed to open outwardly. This causes the first and second latch claws 72a, 72b to disengage from the first and second shutter members 67a, 67b, releasing the shutter members from the latch lock. Then, as the large card B is further inserted, the front end of the card pushes up the first and second shutter members 67a, 67b and pivots them about the support pins 75a, 75b until the shutter members are horizontally flat as shown in FIG. 25.

In this state of FIG. 25, the large card B can further be inserted inward, bringing the pad portions of the card into contact with the second contacts 64B. To keep the inserted card B in electric contact with the second contacts 64B and also to eject the card, an eject mechanism 68 is provided.

The eject mechanism 68 for ejecting the large card B has an eject member 83 as a slider which is slidably mounted in a recessed portion 82 formed in one of the sidewalls 80; a spring member 84 such as a coil spring which, when pressed by the eject member 83, elastically deforms; a heart-shaped cam 85 formed on a top surface of the eject member 83; and a cam lever 87 whose one end portion 90 is fitted in a cam groove 86 formed around the heart-shaped cam 85.

The eject member 83 has a card receiving portion 88 at one end on the inner side thereof which is engaged by the corner of the card B. The eject member 83 also has a dented spring accommodation portion 89 to accommodate one end portion of the spring member 84. The card receiving portion 88 of the eject member 83 is formed in such a manner as to be able to receive and snugly engage a cut-off corner portion of the large card B to prevent the card from being inserted upside down. When the large card B is inserted upside down, a corner portion, which is not chopped, of the large card B abuts against the card receiving portion 88, thus preventing an inverted insertion of the card.

Further, the other end portion 91 of the cam lever 87 is pivotally attached to the sidewall 80 of the connector body 62. Thus, when the card B is inserted, the eject member 83 is pushed by the card and moves relative to the cam lever 87, with the one end portion 90 of the cam lever 87 following the cam groove 86. Therefore, when the inserted large card B engages the end wall 81 and the user pulls his or her pushing finger from the card, the card is pushed back slightly by the force of the spring member 84, bringing the end portion 90 of the cam lever 87 into engagement with a dent portion 92 formed in a head of the heart-shaped cam 85.

Since the eject member 83 is pushed by the spring member 84, it is held at roughly a fixed position, with its dent portion 92 pressed against the end portion 90 of the cam lever 87. The large card B is therefore held immovable in the inserted position, keeping the pad portions of the card in contact with the second contacts 64B.

The cover member 63 is formed with a cam lever retainer 93 in the form of a cantilevered leaf spring, which elastically holds down the cam lever 87, preventing the end portion 90 of the cam lever 87 from coming off the cam groove 86.

To eject and withdraw the large card B from the card connector 60 of Embodiment 3 of the present invention, the card needs to be pushed lightly to be released from the latch lock. That is, when the large card B inserted in the card connector 60 is pushed lightly, the dent portion 92 of the heart-shaped cam 85 parts from the end portion 90 of the cam lever 87, allowing the end portion 90 to move laterally out of the dent portion 92.

As a result, the end portion 90 of the cam lever 87 is set free to follow the cam groove 86. In this state the eject member 83 now slides, urged by the spring member 84, to a middle position in the card connector 60, thus ejecting the large card B halfway.

Then the user holds an end portion of the card B, which was ejected halfway, and withdraws it completely from the card connector 60. With the large card B completely withdrawn from the card connector 60, the shutter members 67a, 67b pivot downward to the closed position and the actuator members 66 also return to the original state, engaging the latch claws 72a, 72b with the back surfaces of the shutter members 67a, 67b to lock them.

In the card connector 60 of the present invention of the above construction, operations performed when a small card A and a large card B are inserted will be explained as follows.

First, when a small card A is used, it is inserted from the card insertion opening 69 of the card connector 60 of the present invention, as shown in FIG. 26 and FIG. 27.

The small card A may be one with small external dimensions in thickness, length and width as shown. This small card A has a width almost equal to or slightly smaller than a normal distance between the paired actuator members 66 in the card connector 60 of the present invention. Hence, when the small card A is inserted into the card connector 60 from the card insertion opening 69 as shown, it can be inserted in its place without contacting the actuator members 66 or activating them. Therefore, the actuator members 66, biased inwardly by their own elastic force, remain in engagement with side portions of the shutter members 67a, 67b, with their latch claws 72a, 72b engaging the back surfaces of the shutter members, as shown in FIG. 26 and FIG. 27.

In this state, the small card A is inserted between the end faces of the shutter members 67a, 67b and the base portion 78, with the pad portions of the card A in electrical contact with the first contacts 64A. As described above, the small card A can be inserted freely into the card connector 60. Now, the small card A can be used for an intended purpose.

To withdraw the small card A, the user need only hold an end of the card and pull it forward. With this process, the small card A can be withdrawn appropriately.

Next, when a large card B is used, it is inserted from the card insertion opening 69 of the card connector 60 of the present invention, as shown in FIG. 28 and FIG. 29.

The large card B may be one with large external dimensions in thickness, length and width as shown. This large card B has a width larger than the normal distance between the paired actuator members 66 in the card connector 60 of the present invention. Thus, when the large card B is inserted into the card connector 60 from the card insertion opening 69, front corners of the large card B engage and push the cam portions 73 of the actuator members 66, elastically deforming the actuator members 66 to open outwardly, so that the inner, longer leg portions 71 move outwardly disengaging their latch claws 72a, 72b from the back surfaces of the shutter members 67a, 67b, releasing the shutter members from the latch lock.

Thus, the front end portion of the large card B pushes up the shutter members 67a, 67b successively as the card is advanced into the card connector 60. Then, the chopped front corner portion on one side of the large card B snugly engages the card receiving portion 88 of the eject member 83 and the subsequent insertion of the card B causes the eject member 83 to slide further inwardly. As the eject member 83 slides, the end portion 90 of the cam lever 87 follows the cam groove 86 of the eject member 83.

Then, the end portion 90 of the cam lever 87 is situated at a position in the cam groove 86 corresponding to the dent portion 92 and engages the dent portion 92, thus holding the eject member 83 immovable. This state is shown in FIG. 28 and FIG. 29, in which the large card B is completely inserted, with the pad portions on the underside of the card in electrical contact with the contact portions 64' of the second contacts 64B. Now, the large card B can be used for an intended purpose.

To withdraw the large card B, the user need to push the card lightly to release it from the latch lock through the eject mechanism 68 as described above before the user can withdraw the card. That is, when the large card B inserted in the card connector 60 is lightly pushed, the end portion 90 of the cam lever 87 situated at the dent portion 92 of the heart-shaped cam 85 moves laterally and disengages from the dent portion 92. As a result the end portion 90 of the cam lever 87 becomes free to follow the cam groove 86. So, in this state the eject member 83 now slides, urged by the spring member 84, to a middle position in the card connector 60, thus ejecting the large card B halfway. Then the user holds an end portion of the card B, which was ejected halfway, and withdraws it completely from the card connector 60. With the large card B completely withdrawn from the card connector 60, the shutter members 67a, 67b pivot downward to the closed position and the actuator members 66 also return to the original state, engaging the latch claws 72a, 72b with the back surfaces of the shutter members 67a, 67b to lock them.

The card connector 60 of the present invention, as described above, can accept two kinds of cards A, B, large and small, without requiring the cards to have any additional means and without any trouble. Further, with the present invention, the card connector 60 can be manufactured to have a flat, thin, box-shaped housing and therefore can be suitably applied to information terminal devices, such as mobile phones and karaoke microphones, and a variety of electronic devices. Further, the card connector 60 of the present invention has a small number of moving parts, which include only the actuator members 66 and the shutter members 67a, 67b of the switching mechanisms 65 and the eject member 83 of the eject mechanism 68. Not only can this card connector be made in a simple construction but it can also be reduced in size and facilitate replacement of a variety of members.

(Embodiment 4)

Figure 30:
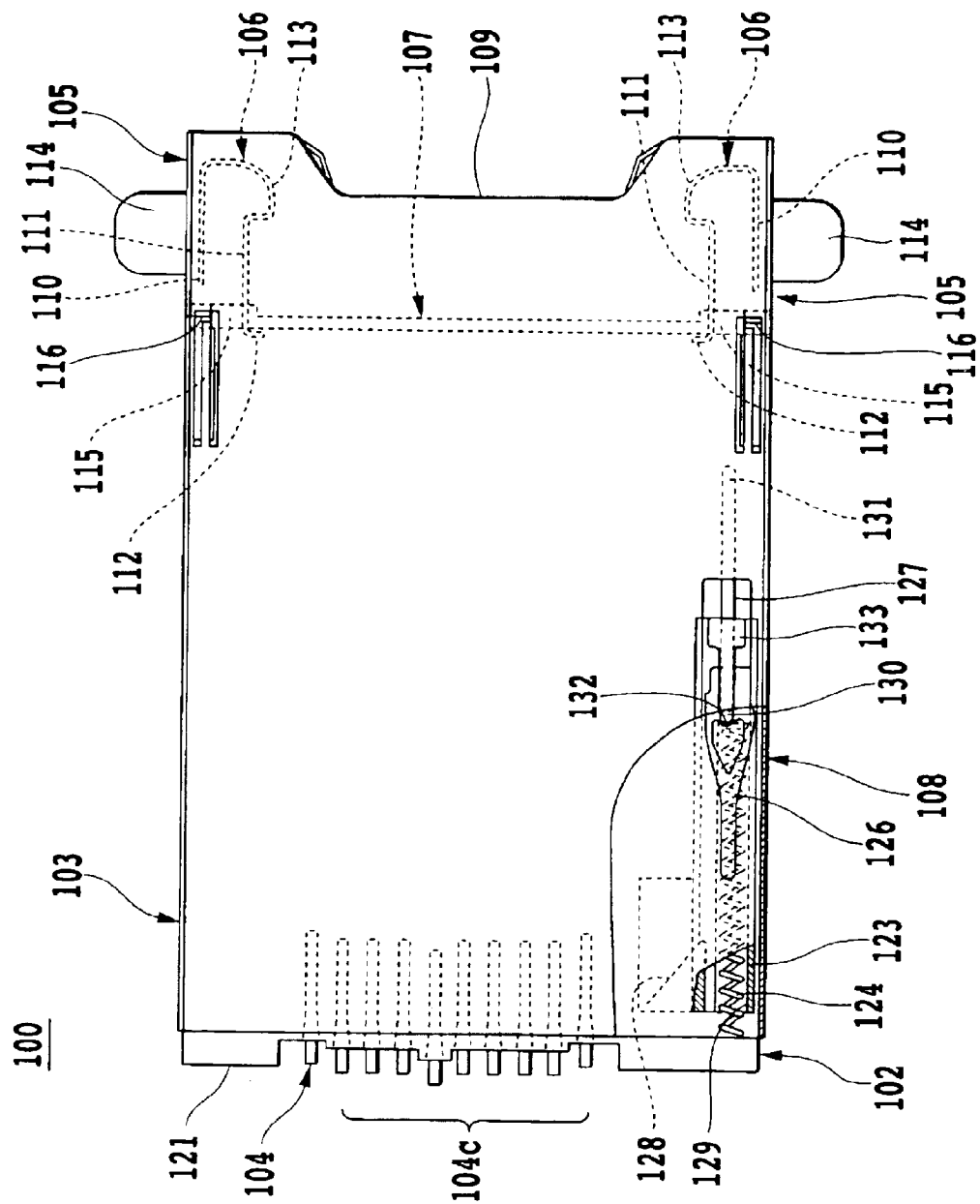
FIG. 30 is a plan view of a card connector of Embodiment 4 according to the present invention.
Figure 31:
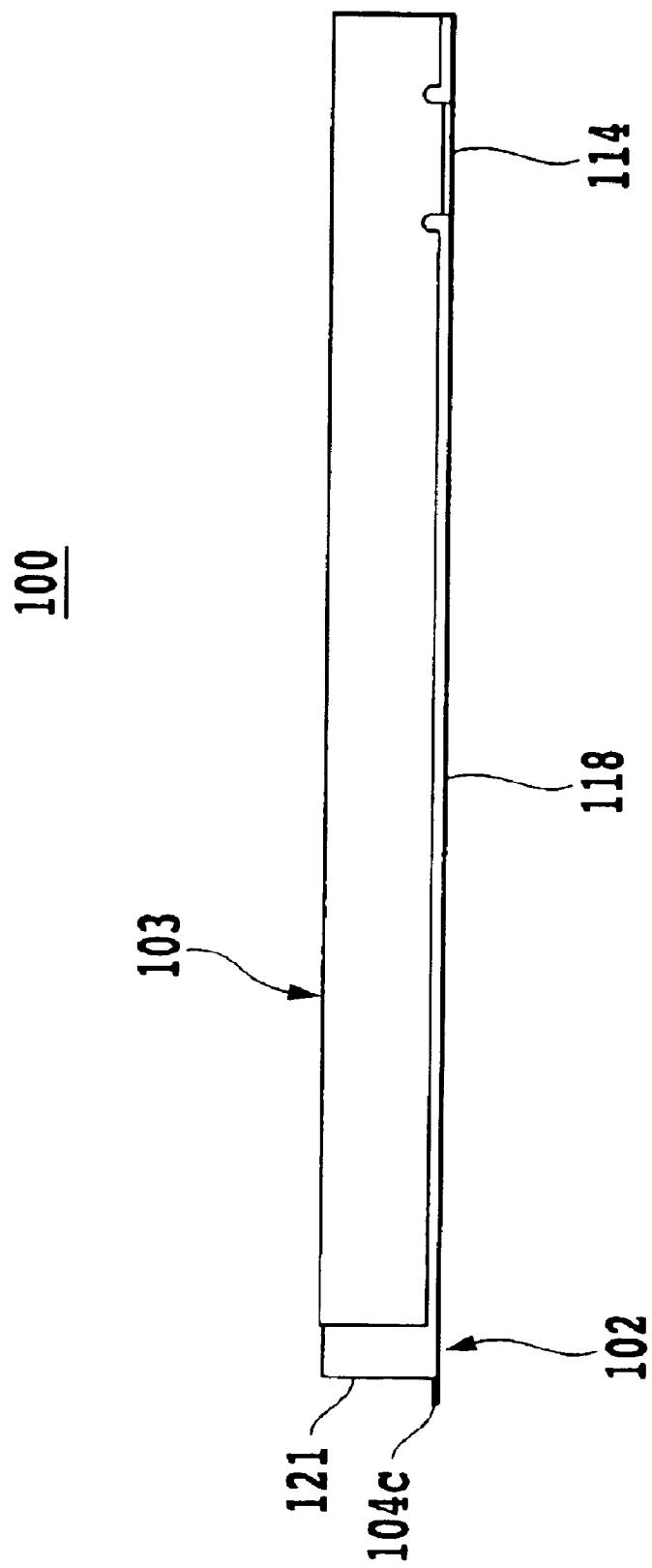
FIG. 31 is a side view of the card connector of FIG. 30.
Figure 32:
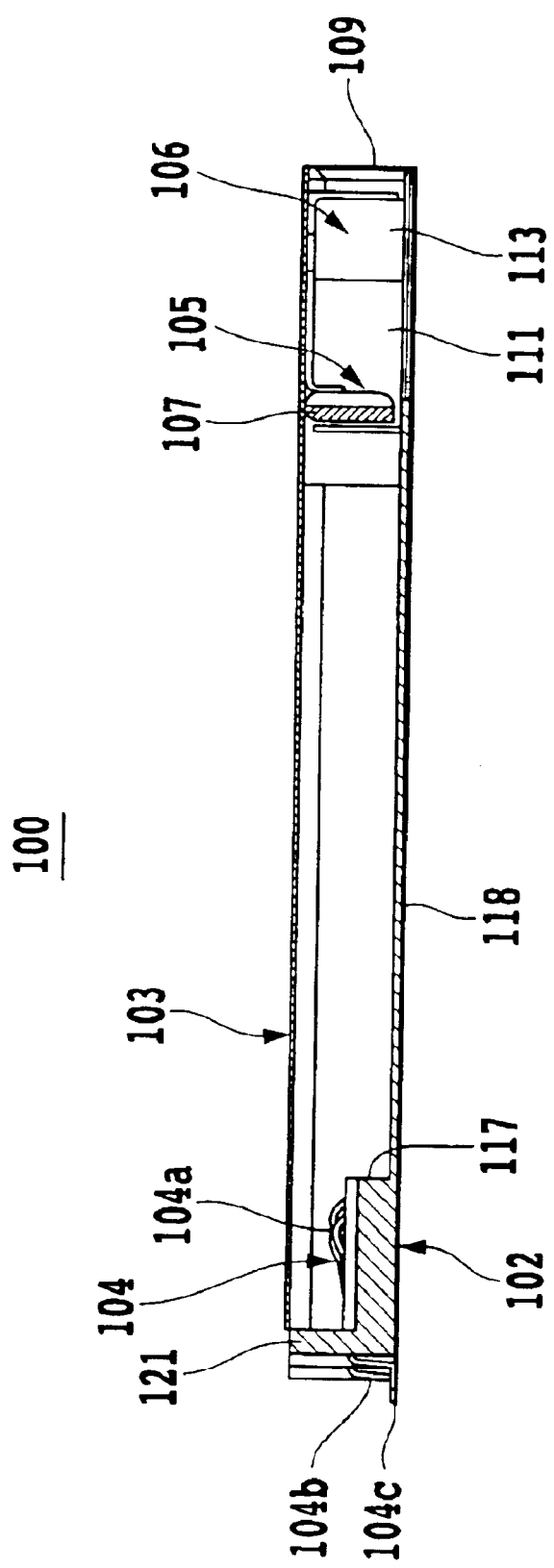
FIG. 32 is a side cross-sectional view of the card connector of FIG. 30.
Figure 33:
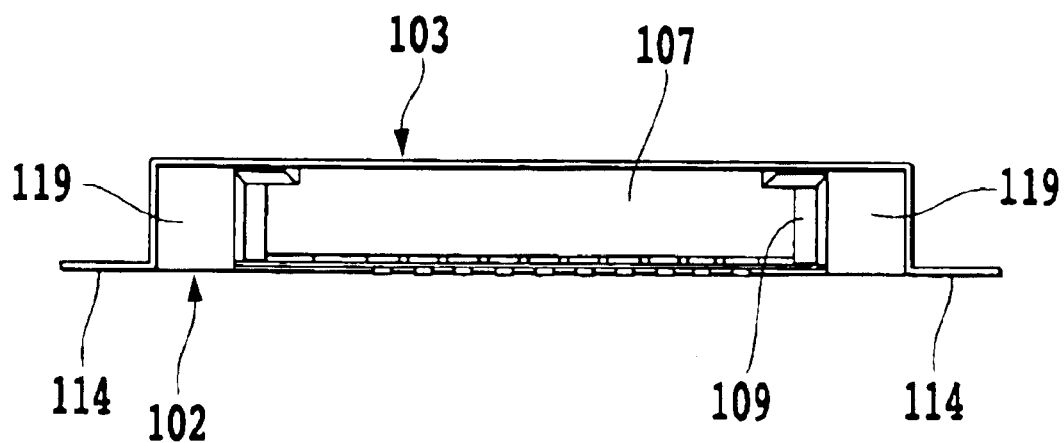
FIG. 33 is an end view of the card connector of FIG. 30 as seen from the card insertion opening.
Figure 34:
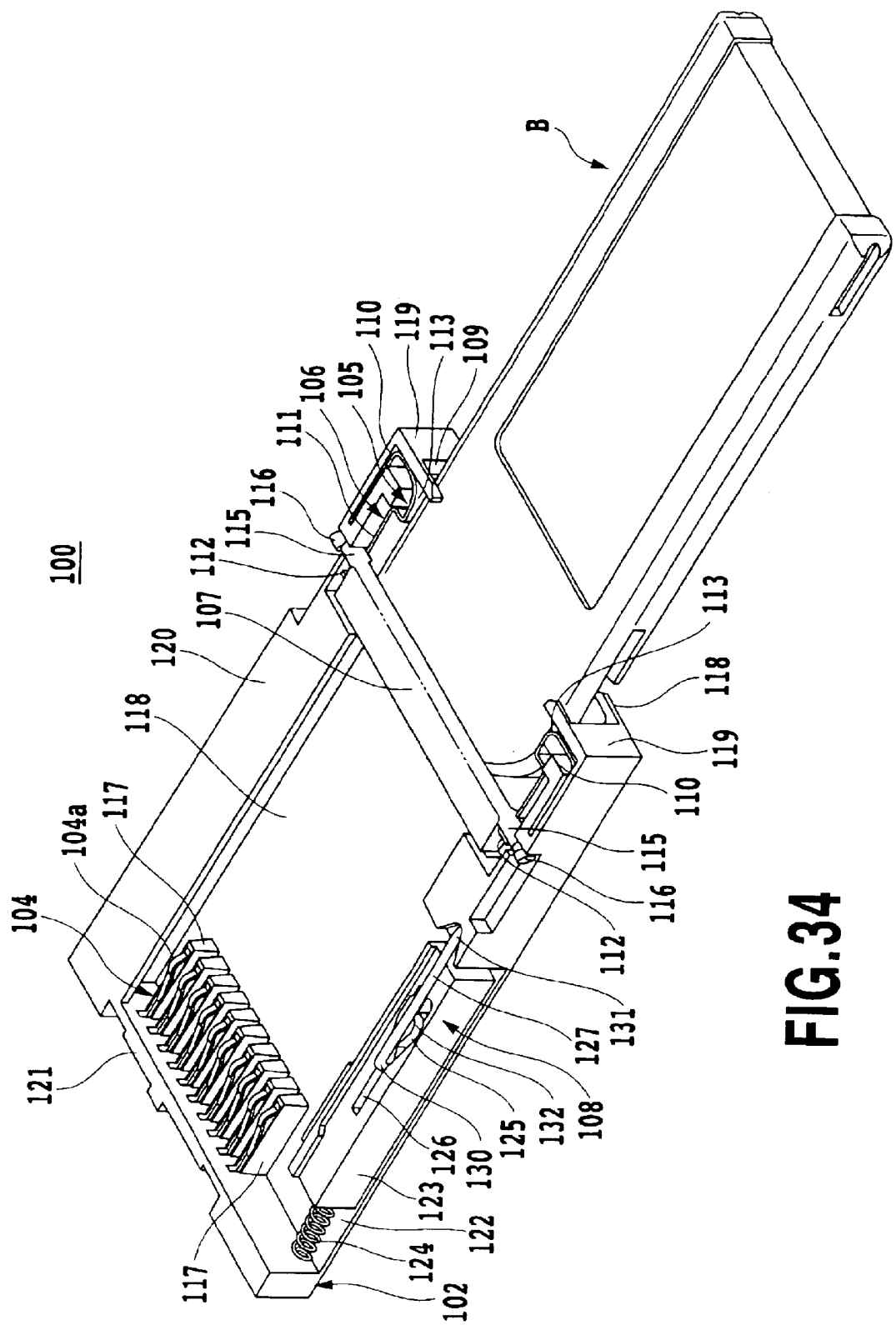
FIG. 34 is a perspective view showing the card connector of FIG. 30 according to the present invention, with a cover member removed, when a large card is inserted.
Figure 35:
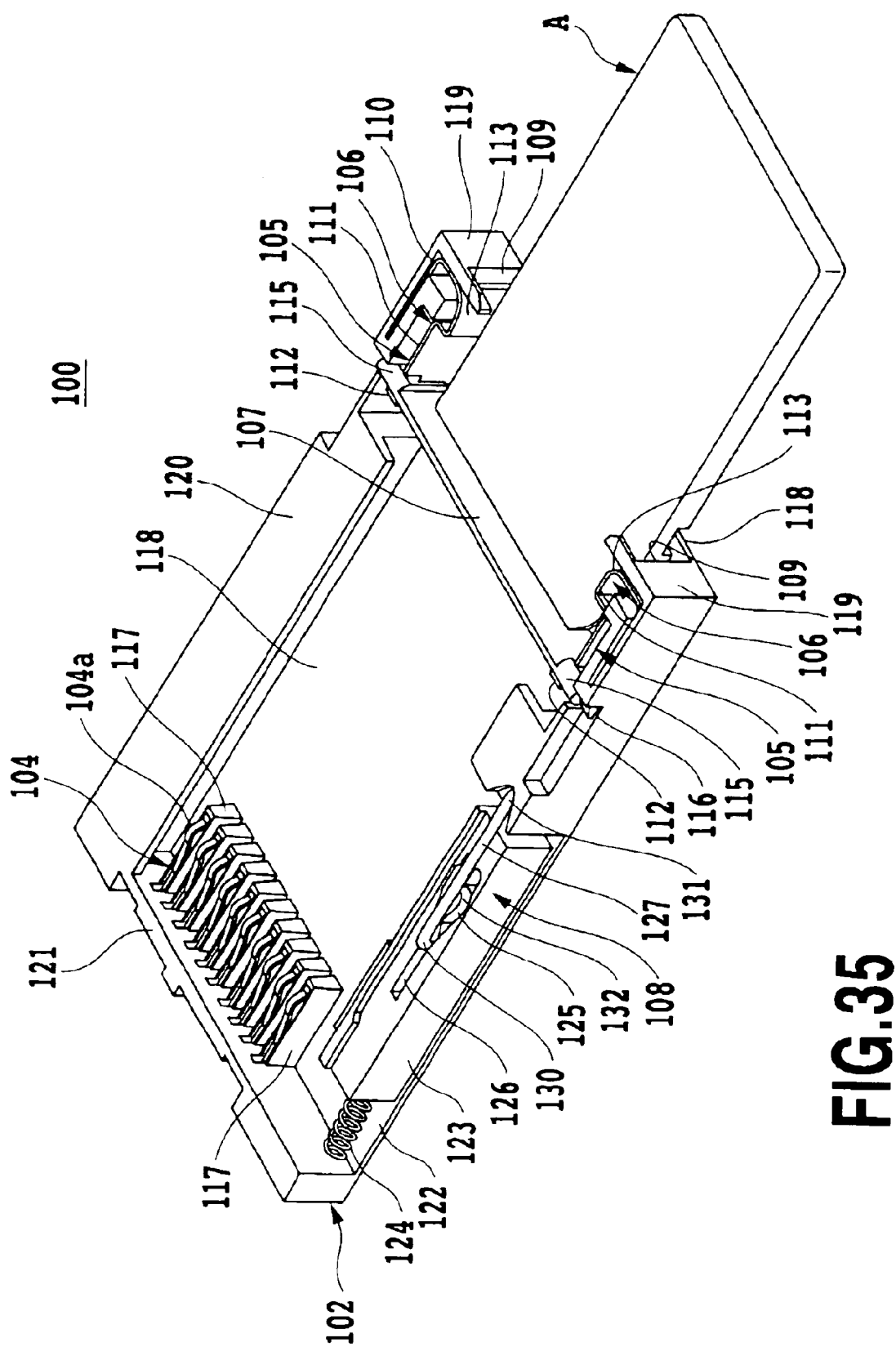
FIG. 35 is a perspective view showing the card connector of FIG. 30 according to the present invention, with the cover member removed, when a small card is inserted but blocked by a shutter member being closed.

FIG. 30 to FIG. 35 illustrate a card connector as Embodiment 4 of the present invention, FIG. 30 representing a plan view of the card connector of Embodiment 4 of the present invention, FIG. 31 representing a side view of the card connector of FIG. 30, FIG. 32 representing a side cross-sectional view of the same, FIG. 33 representing an end view of the card connector as seen from the card insertion opening side, FIG. 34 representing a perspective view of the card connector of FIG. 30 of the present invention, with a cover member removed, when a large card is inserted, FIG. 35 representing a similar perspective view of the card connector of FIG. 30 of the present invention, with the cover member removed, when a small card is inserted but blocked by a shutter member being closed.

As shown in FIG. 31 to FIG. 34, a card connector 100 of Embodiment 4 of the present invention has a shutter member 107 of switching mechanisms 105 and an eject mechanism 108 for a large card B. This card connector 100 is essentially similar in other parts to the card connectors 1, 30, 60 of the previous Embodiment 1 to Embodiment 3, except that the card connector of this embodiment permits only an insertion of the large card B and blocks an insertion of the small card A thereby distinguishing between an eligible large card B and a non-eligible small card A for use on the card connector.

As shown in FIG. 30 to FIG. 34, the card connector 100 of the present invention has a connector body 102, a cover member 103, a plurality of contacts 104, switching mechanisms 105 and an eject mechanism 108. The switching mechanisms 105 of the card connector 100 of the present invention comprise actuator members 106, a single shutter member 107, and an eject mechanism 108 for ejecting a large card B. In use, the card connector 100 of this construction may be mounted, for example, on information terminal devices.

The card connector 100 of the present invention has a flat box-like housing defined by the connector body 102 and the cover member 103 that is used in combination with the connector body 102. The card connector 100 is open on one-end side to form a card insertion opening 109.

The card connector 100 of the present invention is closed on the other-end side by an end wall 121, along which are arrayed a plurality of contacts 104. These contacts 104 each have a terminal portion 104c extending rearward for electrical connection with terminals of external information terminal devices and equipment. The contacts 104 are placed on individually separate support portions 117. In this embodiment the contacts 104 are arranged so as to make electrical contact with contact pads of a large card B. Further, these support portions 117 for the contacts 104 prevent an inverted card insertion.

Further, the card connector 100 of the present invention is mounted, as by screws, to a target device or equipment such as a printed circuit board of an information terminal device through mounting flange portions 114 on both sides of the cover member 103.

On both sides of the card insertion opening 109 of the card connector 100 of the present invention, a pair of actuator members 106, shaped like a latch arm, of the switching mechanisms 105 are installed. Between these actuator members 106 is installed a shutter member 107 as a closing member. The switching mechanisms 105 switch the shutter member 107 between an open and a closed state according to a difference in external dimensions, such as thickness, between a small card A and a large card B to distinguish between the two kinds of cards, as by opening the shutter member 107 to allow the large card B to be inserted and by keeping the shutter member 107 closed to block an insertion of the small card A. The actuator members 106 and the shutter member 107 of the switching mechanisms 5 form movable members in this embodiment.

In such a card connector 100 of Embodiment 4 of the present invention, the connector body 102 is formed of an insulating material, such as synthetic resin, and is combined with the cover member 103 formed of a thin metal plate to construct a hollow, flat, box-shaped housing. A small card A or large card B is inserted from the card insertion opening 109 of the card connector 100 of the present invention. A plurality of contacts 104 are arrayed in the card connector 100 along the rear end wall 121 so that they can make contact with pad portions arrayed on an underside of a front end portion of the accepted large card B.

These contacts 104 are of almost the same shape and are each formed with a contact portion 104a, which is curved up in a semicircular shape, at a free front end thereof. The contact portions 104a are so positioned as to be able to make elastic contact with pad portions of the large card B inserted from the card insertion opening 109.

That is, the contacts 104 are mounted on individually separate support portions 117 arranged at a rear part of a base portion 118 of the connector body 102.

These contacts 104 have their intermediate leg portions 104b integrally secured to the support portions 117, with their terminal portions 104c, that are connected to external devices, formed flush with a bottom surface of the base portion 118 of the connector body 102.

As for the small card A and the large card B which are described in this embodiment to be applied to the card connector 100 of the present invention, "Memory Stick Duo" (registered trademark) is used as a small card A and "Memory stick" (registered trademark) as a large card B. The present invention, however, is not limited to the use of these cards or memory sticks but can also be applied satisfactorily to other memory cards, such as SD cards, IC cards and SIM cards.

In the card connector 100 of the present invention, as shown in the figures, the actuator members 106 of the switching mechanisms 105 are provided on both sides of the card insertion opening 109 as switching members. Further, the shutter member 107 is pivotally installed between these actuator members 106.

Each of the actuator members 66 is made by bending an elongate metal strip member into roughly a shape of letter U so that it is elastically deformable, with an outer leg portion 110 formed short and removably secured to the sidewall 120. An inner leg portion 111 is formed long and has a latch claw 112. The latch claws 112 of the actuator members 106 engage the inner surface on both sides of the shutter member 107 to hold the shutter member 107 immovable.

The actuator members 106 have a cam portion 113 formed at an inner bent corner thereof. When corners of the large card B engage and push these cam portions 113, the longer leg portions 111 of the actuator members 106 are elastically deformed to open outwardly, disengaging the latch claws 112 of the inner leg portions 111 from the shutter member 107 to release the shutter member from the latch lock.

This shutter member 107 is made of a laterally elongate plate member and has support pins 115 protruding horizontally laterally from both ends of the plate member. These support pins 115 are partly cut into a semicircular shape and, at circular portions, are pivotally supported on the sidewalls 120 of the connector body 62. The semicircular portions of the support pins 115 are engaged under pressure by leaf spring-like retainer pins 116 vertically rising from the sidewalls 120. Therefore, the shutter member 107 normally assumes a vertically hanging position to close the card accommodation portion in the card connector 100 and is held immovable in this state by the latch claws 112.

In the card connector 100 of this embodiment with the shutter member 107 closed, when a large card B is inserted, the front end portion of the card engages the corner cam portions 113 of the actuator members 106. When the corners of the large card B engage the cam portions 113, the longer leg portions 111 of the actuator members 106 are elastically deformed to open outwardly, disengaging the latch claws 112 from the shutter member 107. As a result, the shutter member 107 is released from the latch lock. Then, when the large card B is further inserted, the front end portion of the card pushes up the shutter member 107 to pivot about the support pins 115 to assume a horizontally flat state, as shown in FIG. 34.

In the state of FIG. 34, the large card B can be inserted further inward bringing the pad portions of the card into electrical contact with the contacts 104. To keep the inserted card B in electric contact with the contacts 104 and also to eject the card, an eject mechanism 108 is provided.

The eject mechanism 108 for ejecting the large card B has an eject member 123 as a slider which is slidably mounted in a recessed portion 122 formed in one of the sidewalls 120; a spring member 124 such as a coil spring which, when pressed by the eject member 123, elastically deforms; a heart-shaped cam 125 formed on a top surface of the eject member 123; and a cam lever 127 whose one end portion 130 is fitted in a cam groove 126 formed around the heart-shaped cam 125.

The eject member 123 has a card receiving portion 128 at one end on the inner side thereof which is engaged by the corner of the card B. The eject member 123 also has a dented spring accommodation portion to accommodate one end portion of the spring member 124. The card receiving portion 128 of the eject member 123 is formed in such a manner as to be able to receive and snugly engage a cut-off corner portion of the large card B to prevent the card from being inserted upside down. When the large card B is inserted upside down, a corner portion, which is not chopped, of the large card B abuts against the card receiving portion 128, thus preventing an inverted insertion of the card.

Further, the other end portion 131 of the cam lever 127 is pivotally attached to the sidewall 120. Thus, when the card B is inserted, the eject member 123 is pushed by the card and moves relative to the cam lever 127, with the one end portion 130 of the cam lever 127 following the cam groove 126. Therefore, when the inserted large card B engages the end wall 121 and the user pulls his or her pushing finger from the card, the card is pushed back slightly by the force of the spring member 124, bringing the end portion 130 of the cam lever 127 into engagement with a dent portion 132 formed in a head of the heart-shaped cam 125.

Since the eject member 123 is pushed by the spring member 124, it is held at roughly a fixed position, with its dent portion 132 pressed against the end portion 130 of the cam lever 127. The large card B is therefore held immovable in the inserted position, keeping the pad portions of the card in contact with the contacts 104.

The cover member 103 is formed with a cam lever retainer 133 in the form of a cantilevered leaf spring, which elastically holds down the cam lever 127, preventing the end portion 130 of the cam lever 127 from coming off the cam groove 126.

To eject and withdraw the large card B from the card connector 100 of Embodiment 4 of the present invention, the card needs to be pushed lightly to be released from the latch lock. That is, when the large card B inserted in the card connector 100 is pushed lightly, the dent portion 132 of the heart-shaped cam 125 parts from the end portion 130 of the cam lever 127, allowing the end portion 130 to move laterally out of the dent portion 132.

As a result, the end portion 130 of the cam lever 127 is set free to follow the cam groove 126. In this state-the eject member 123 now slides, urged by the spring member 124, to a middle position in the card connector 100, thus ejecting the large card B halfway.

Then the user holds an end portion of the card B, which was ejected halfway, and withdraws it completely from the card connector 100. With the large card B completely withdrawn from the card connector 100, the shutter member 107 pivots downward to the closed position and the actuator members 106 also return to the original state, engaging the latch claws 112 with the back surface of the shutter member 107 to lock it.

In the card connector 100 of the present invention of the above construction, operations performed when a small card A and a large card B are inserted will be explained as follows.

First, when a small card A is used, it is inserted from the card insertion opening 109 of the card connector 100 of the present invention, as shown in FIG. 35.

The small card A may be one with small external dimensions in thickness, length and width as shown. This small card A has a width almost equal to a predetermined distance between the paired actuator members 106 in the card connector 100 of the present invention. Hence, when the small card A is inserted into the card connector 100 from the card insertion opening 109 as shown, it can be inserted in its place without contacting the actuator members 106 or activating them. Therefore, the actuator members 106, biased inwardly by their own elastic force, remain in engagement with side portions of the shutter member 107, with their latch claws 112 engaging the back surface of the shutter member, as shown. In this state, the shutter member 107 remains closed and locked by the latch claws 112 of the actuator members 106.

Therefore, the small card A abuts against the front surface of the closed shutter member 107 and its insertion is blocked even if the shutter member 107 is pushed. As a result, the small card A cannot be used. The card connector 100 of Embodiment 4 of the present invention which permits only the use of the large card B blocks the insertion of the small card A, thus achieving the intended function.

As described above, the card connector 100 of Embodiment 4 of the present invention permits the insertion of only the eligible large card B and blocks other non-eligible cards such as small card A, thus realizing an intended function of distinguishing an eligible card for use on the card connector from others.

In the card connector 100 of Embodiment 4 of the present invention of the above construction, when an eligible large card B is used, it is inserted from the card insertion opening 109, as shown in FIG. 34.

The large card B is one with large external dimensions in thickness, length and width as shown. This large card B has a width larger than the predetermined distance between the paired actuator members 106 in the card connector 100 of the present invention. Thus, when the large card B is inserted into the card connector 100 from the card insertion opening 109, front corners of the large card B engage and push the cam portions 113 of the actuator members 106, elastically deforming the actuator members 106 to cause the inner, longer leg portions 111 to open outwardly. As a result, the latch claws 112 of the actuator members 106 disengage from the back surface of the shutter member 107, releasing the shutter members from the latch lock.

As the large card B is further pushed in, the front end portion of the card pushes up the shutter member 107 and the card advances further inward. Then, the chopped front corner portion on one side of the large card B snugly engages the card receiving portion 128 of the eject member 123 and the subsequent insertion of the card B causes the eject member 123 to slide further inwardly. As the eject member 123 slides, the end portion 130 of the cam lever 127 follows the cam groove 126 of the eject member 123.

Then, the end portion 130 of the cam lever 127 is situated at a position in the cam groove 126 corresponding to the dent portion 132 and then engages the dent portion 132, thus holding the eject member 123 immovable. This state is indicated by dashed line in FIG. 30, in which the large card B is completely inserted, with the pad portions on the underside of the card in electrical contact with the contact portions 104a of the contacts 104. Now, the large card B can be used for an intended purpose.

To withdraw the large card B, the user need to push the card lightly to release it from the latch lock through the eject mechanism 108 as described above before the user can withdraw the card. That is, when the large card B inserted in the card connector 100 is lightly pushed, the end portion 130 of the cam lever 127 situated at the dent portion 132 of the heart-shaped cam 125 moves laterally and disengages from the dent portion 132. As a result the end portion 130 of the cam lever 127 becomes free to follow the cam groove 126. So, in this state, when the card is set free by the user releasing his or her finger from it, the eject member 123 now slides, urged by the spring member 124, to a middle position in the card connector 100, thus ejecting the large card B halfway. Then the user holds an end portion of the card B, which was ejected halfway, and withdraws it completely from the card connector 100. With the large card B completely withdrawn from the card connector 100, the shutter member 107 pivots downward to the closed position and the actuator members 106 also return to the original state, engaging the latch claws 112 with the back surface of the shutter member 107 to lock it.

The card connector 100 of the present invention, as described above, can distinguish eligible cards of one size from non-eligible cards of different sizes by permitting the use of the eligible cards and blocking the use of the non-eligible cards without requiring the cards to have any additional means and without any trouble. Further, with the present invention, the card connector 100 can be manufactured to have a flat, thin, box-shaped housing and therefore can be suitably applied to information terminal devices, such as mobile phones and karaoke microphones, and a variety of electronic devices. Further, the card connector 100 of the present invention has a small number of moving parts, which include only the actuator members 106 and the shutter member 107 of the switching mechanisms 105 and the eject member 123 of the eject mechanism 108. Not only can this card connector be made in a simple construction but it can also be reduced in size and facilitate replacement of a variety of members.

(Variation 1)

Figure 36:
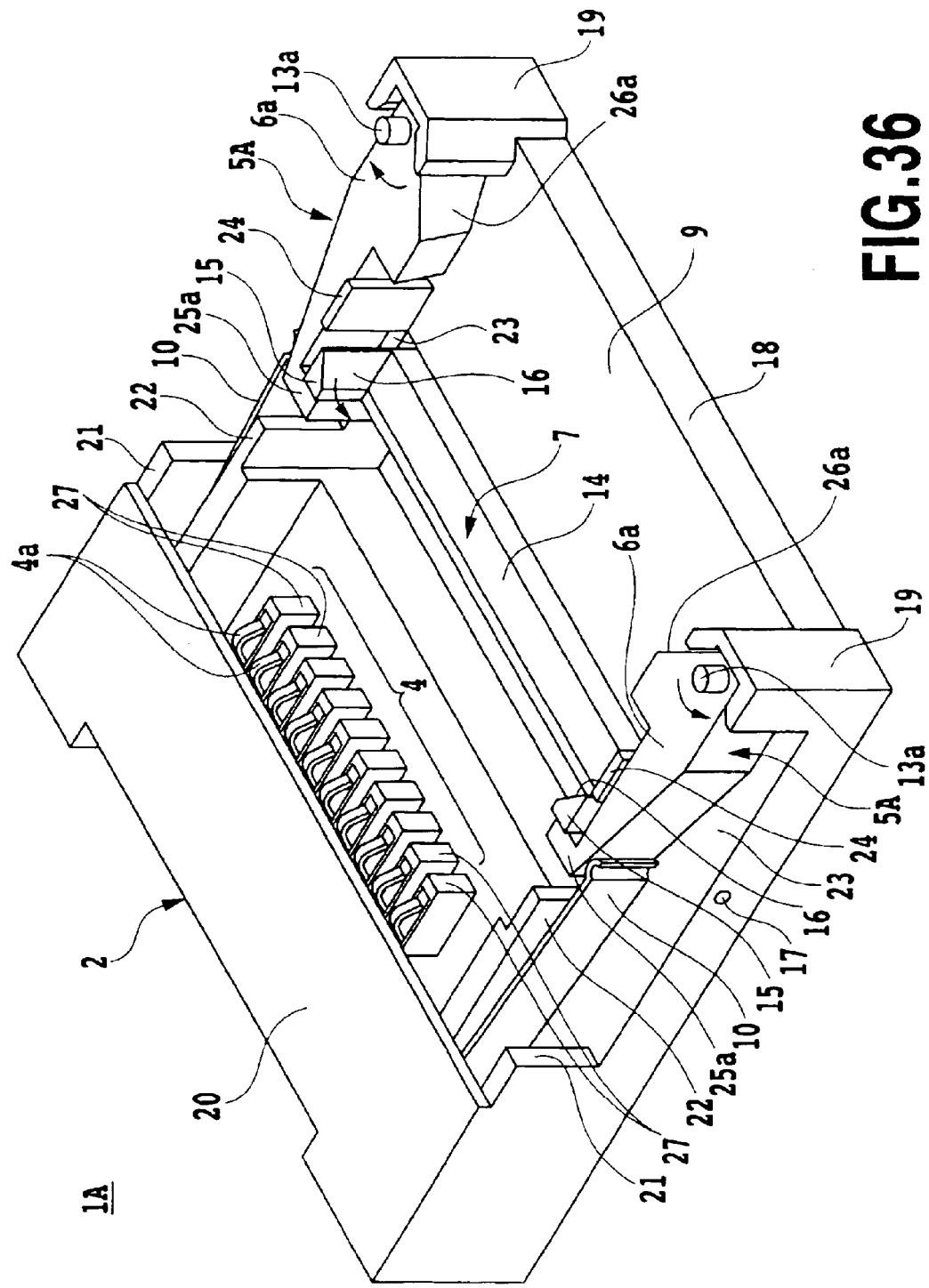
FIG. 36 is a perspective view showing Variation 1 of the card connector of Embodiment 1 according to the present invention, with the cover member removed, as seen from the card insertion opening.
Figure 37:
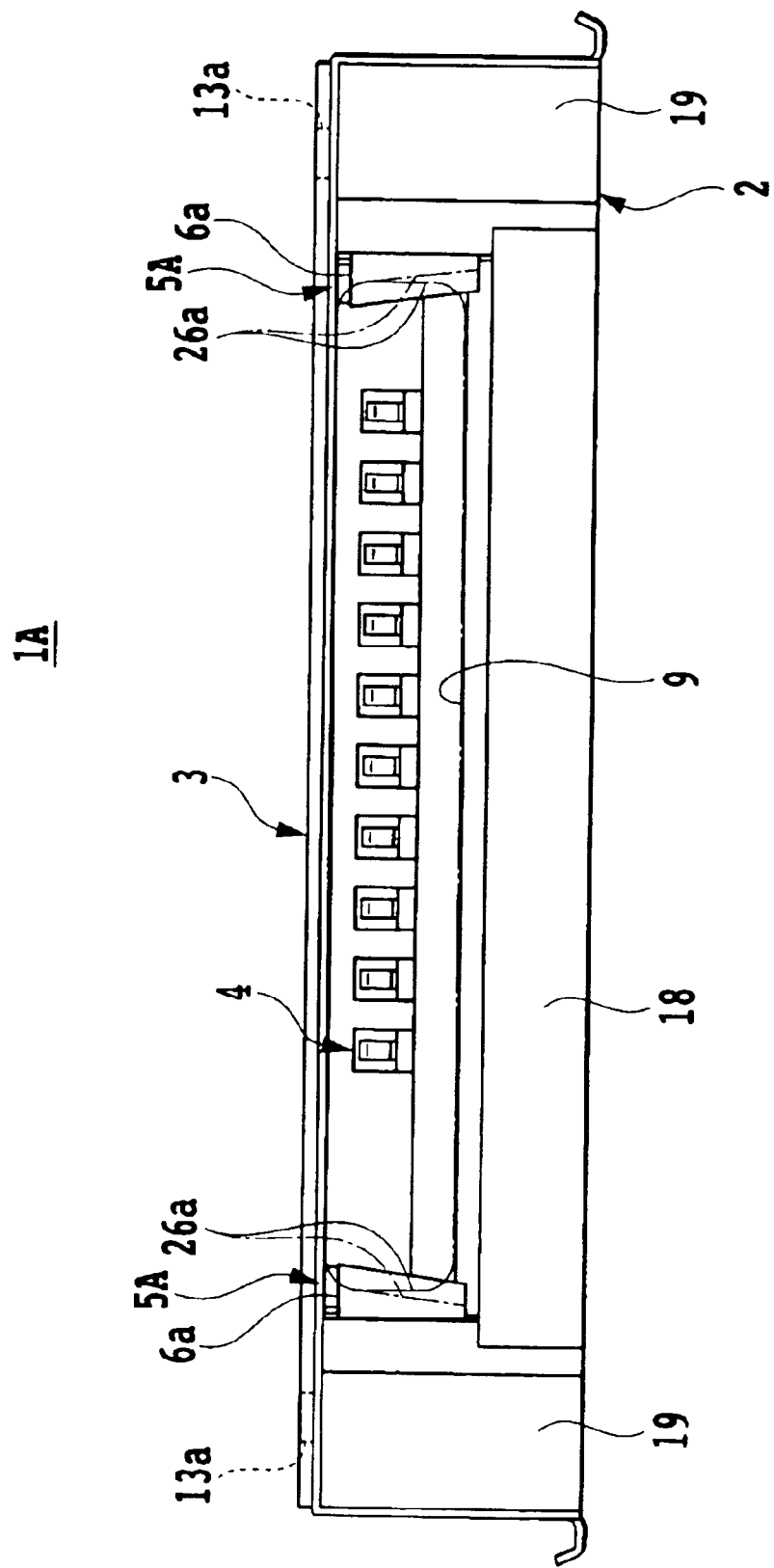
FIG. 37 is an end view of the card connector of FIG. 36 as seen from the card insertion opening.

FIG. 36 and FIG. 37 illustrate a card connector as a variation of Embodiment 1 of the present invention, FIG. 36 representing a perspective view of the card connector as seen from a card insertion opening side, with a cover member removed, FIG. 37 representing an end view of the card connector of FIG. 36 as seen from the card insertion opening side.

As shown in these figures, the card connector of Variation 1 is essentially the same in construction as Embodiment 1, except that cam surfaces 26a of actuator members 6a of switching mechanisms 5A are inclined so that a distance between the cam surfaces 26a increases downwardly.

That is, as shown in the figures, the card connector 1A of Variation 1 of the present invention has a box-shaped connector housing defined by a combination of the connector body 2 and the cover member 3. The card connector 1A also has a plurality of contacts 4 arrayed therein and switching mechanisms 5A installed on both sides of the card insertion opening 9.

The switching mechanisms 5A on both sides of the card insertion opening 9 have block-like actuator members 6a pivotally mounted on the connector body 2 by pins 13a. The actuator members 6a have their corner portions on the card insertion opening 9 side cut off to form the cam surfaces 26a that are inclined to expand downwardly. Each of the actuator members 6a also has a latch portion 25a at its free end.

As described above, the card connector 1A of Variation 1 of the present invention differs from the card connectors 1, 30, 60, 100 of Embodiment 1 to Embodiment 4 in that the actuator members 6a of the switching mechanisms 5A are provided on their inner side with the cam surfaces 26a that are inclined so that their distance increases downwardly.

Because the cam surfaces 26a on the actuator members 6a are formed as the downwardly expanding, inclined cam surfaces, when a card is inserted, the front end corners and the side portions of the card engage the actuator members 6a through a reduced friction surface. Therefore, a friction area between the actuator members 6a and the card is reduced, improving the sliding performance of the card during its insertion and withdrawal operations. This in turn reduces a frictional force between these members and therefore wear. The spring force of the eject members of the eject mechanisms can therefore be designed at a small value.

(Variation 2)

Figure 38:
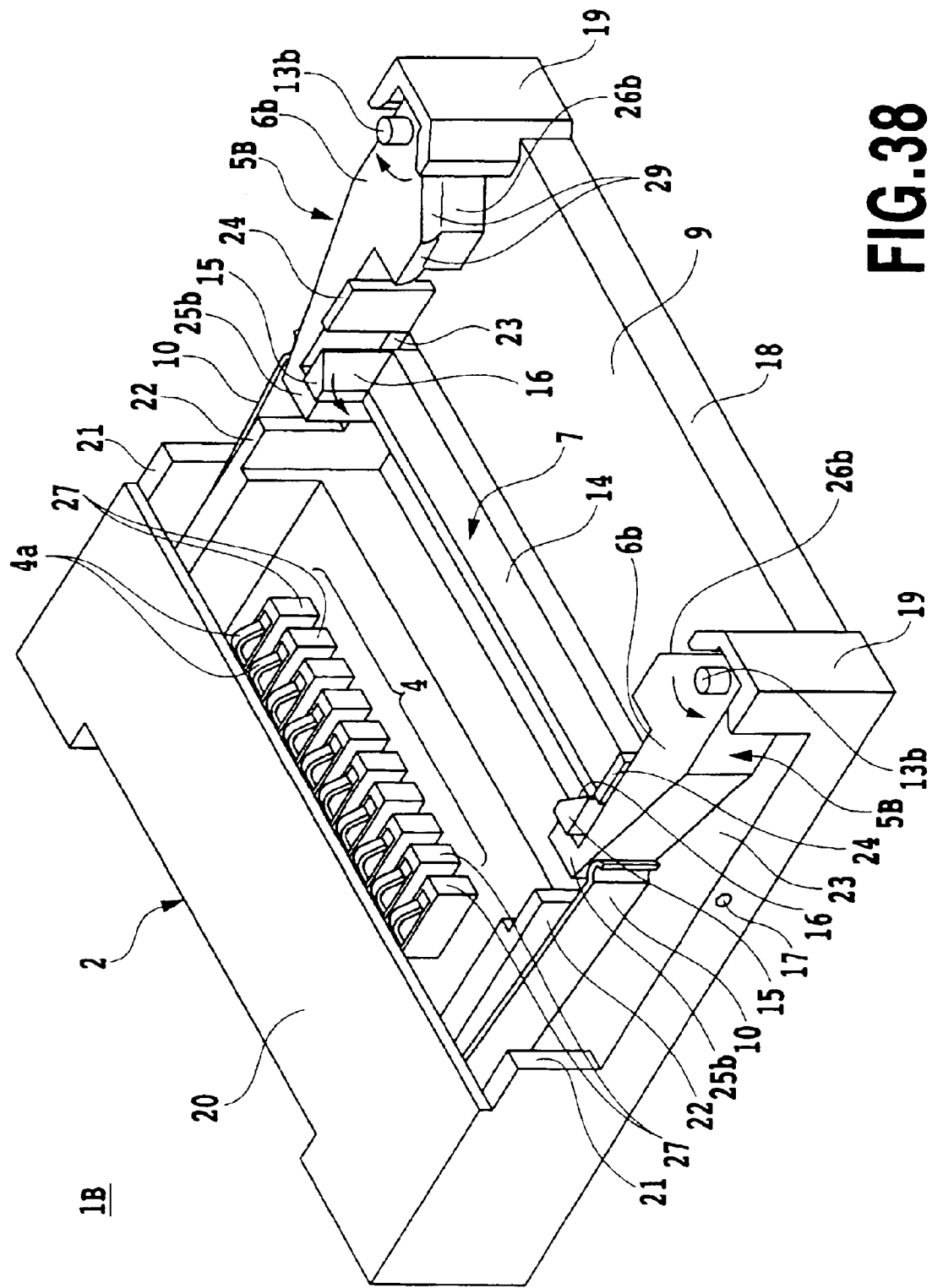
FIG. 38 is a perspective view showing Variation 2 of the card connector of Embodiment 1 according to the present invention, with the cover member removed, as seen from the card insertion opening.
Figure 39:
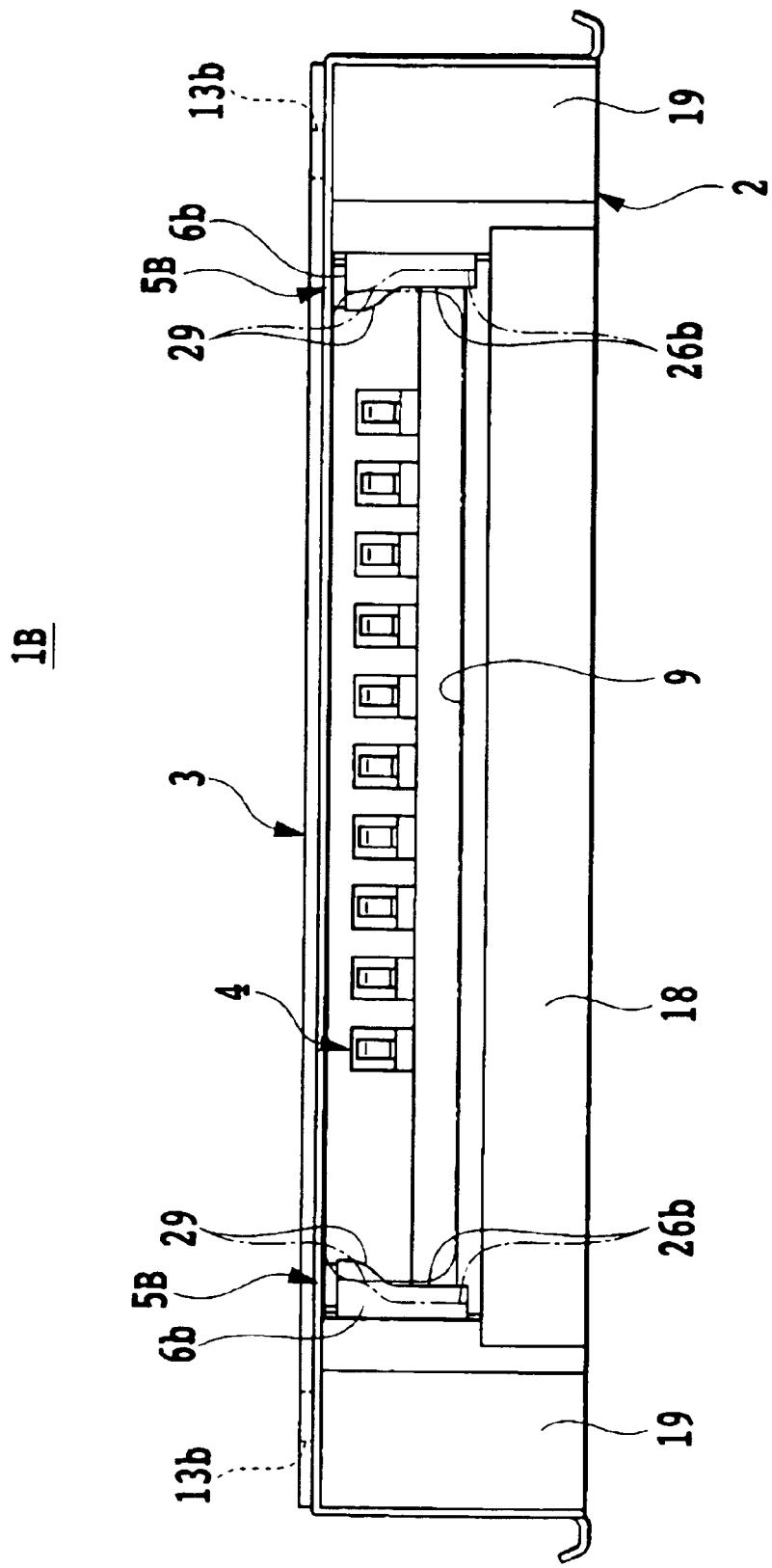
FIG. 39 is an end view of the card connector of FIG. 38 as seen from the card insertion opening.

FIG. 38 and FIG. 39 illustrate another variation of Embodiment 1 of the present invention, FIG. 38 representing a perspective view of the card connector as seen from a card insertion opening side, with a cover member removed, FIG. 39 representing an end view of the card connector of FIG. 38 as seen from the card insertion opening side.

As shown in these figures, Variation 2 differs from Embodiment 1 and Variation 1 in that bump-like, inwardly bulged portions 29 are provided at an upper part of the cam surfaces 26b of the actuator members 6b in the switching mechanisms 5B. In other respects, their constructions are essentially similar.

That is, the card connector 1B of Variation 2 of the present invention has a box-shaped connector housing defined by a combination of the connector body 2 and the cover member 3. The card connector also has a plurality of contacts 4 arrayed therein and the switching mechanisms 5B arranged on both sides of the card insertion opening 9.

The switching mechanisms 5B on both sides of the card insertion opening 9 have block-like actuator members 6b pivotally mounted on the connector body 2 by pins 13b. The actuator members 6b have their corner portions on the card insertion opening 9 side cut off to form the cam surfaces 26b that have inwardly bulged portions 29 at an upper part thereof. Each of the actuator members 6b also has a latch portion 25b at its free end.

As described above, the card connector 1B of Variation 2 of the present invention differs from the card connectors 1, 1A, 30, 60, 100 of Embodiment 1 to Embodiment 4 and Variation 1 in that the actuator members 6b of the switching mechanisms 5B have the bump-like, inwardly bulged portions 29 at an upper part on the inner side thereof.

Because the inwardly bulged portions 29 at an upper part of the cam surfaces 26b on the actuator members 6b are formed as cam portions, when a card is inserted, the front end corners and the side portions of the card engage the bulged portions 29 on the actuator members 6b through a reduced friction surface. Therefore, a friction area between the actuator members 6b and the card is reduced, improving the sliding performance of the card during its insertion and withdrawal operations. This in turn reduces a frictional force between these members and therefore wear. The spring force of the eject members of the eject mechanisms can therefore be designed at a small value.

(Variation 3)

Figure 40:
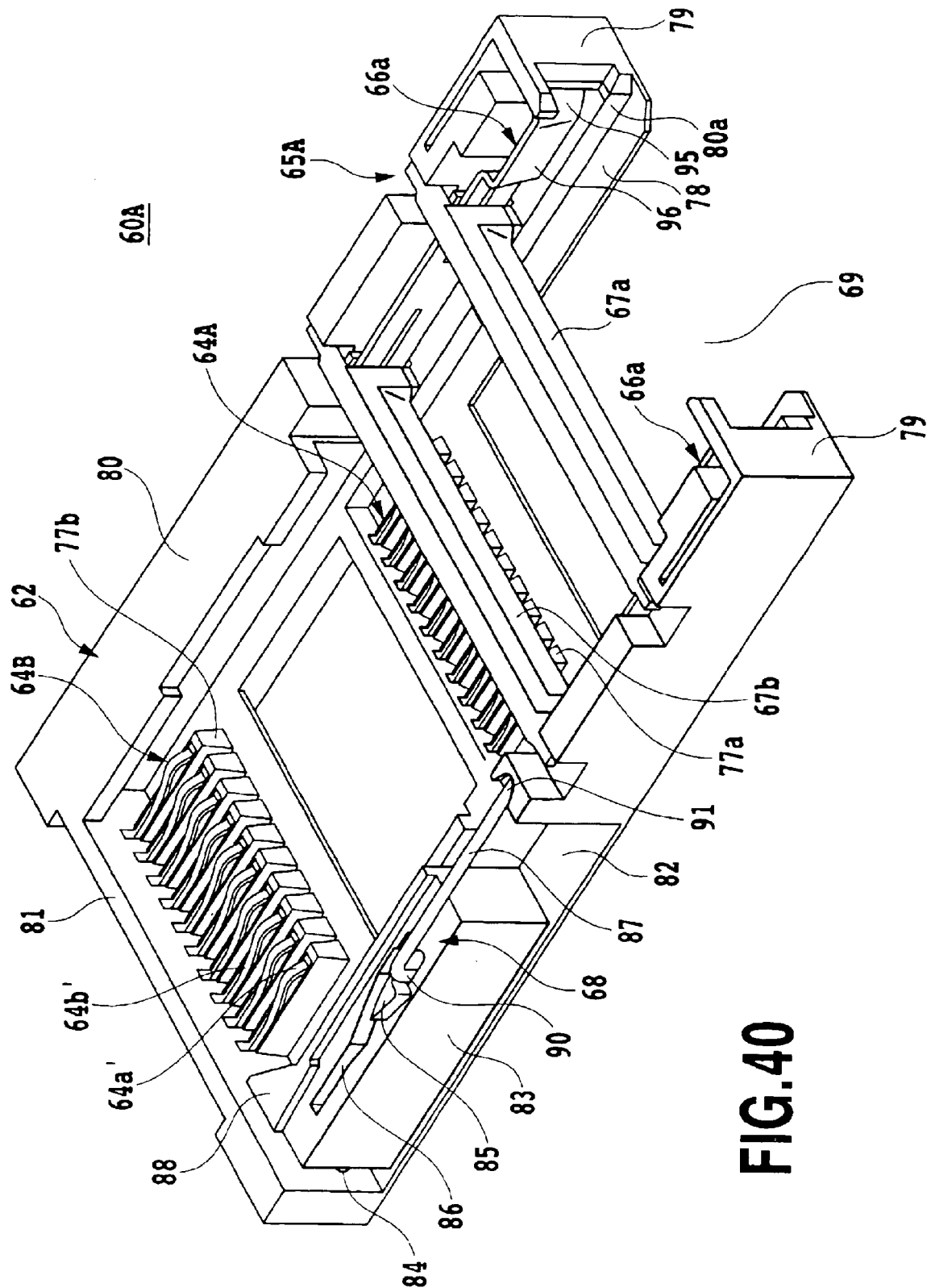
FIG. 40 is a perspective view showing Variation 3 of the card connector of Embodiment 3 according to the present invention, with the cover member removed, as seen from the card insertion opening.
Figure 41:
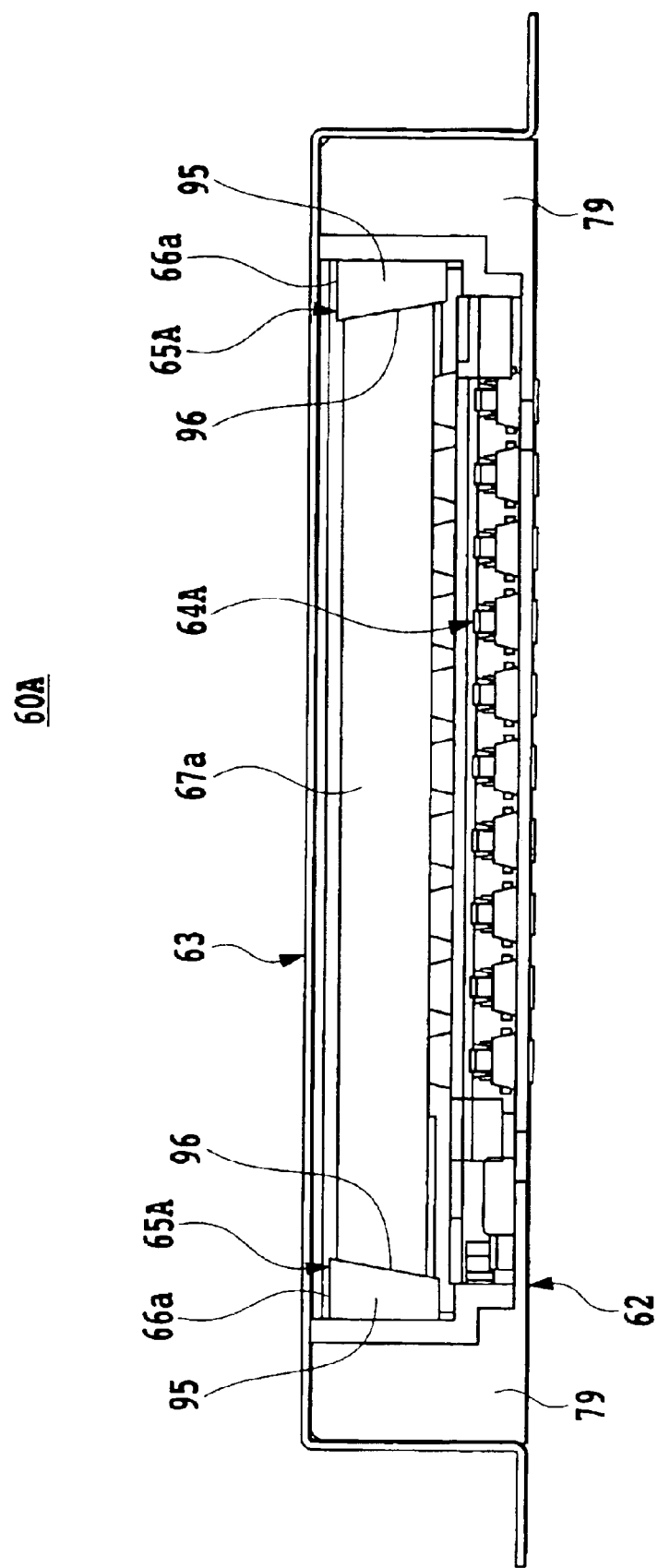
FIG. 41 is an end view of the card connector of FIG. 40 as seen from the card insertion opening.

FIG. 40 and FIG. 41 illustrate a card connector as a variation of Embodiment 3 of the present invention, FIG. 40 representing a perspective view of the card connector as seen from a card insertion opening side, with a cover member removed, FIG. 41 representing an end view of the card connector of FIG. 40 as seen from the card insertion opening side.

As shown in these figures, Variation 3 differs from Embodiment 1–4 and Variation 1, 2 in that the cam portions 95 of the actuator members 66a in the switching mechanisms 65A are formed with downwardly expanding, inclined cam surfaces 96. In other respects, their constructions are essentially similar.

That is, as shown in the figures, the card connector 60A of Variation 3 of the present invention has a box-shaped connector housing defined by a combination of the connector body 62 and the cover member 63. The card connector 60A also has a plurality of first contacts 64A and a plurality of second contacts 64B arrayed therein and switching mechanisms 65A installed on both sides of the card insertion opening 69.

The switching mechanisms 65A on both sides of the card insertion opening 69 have actuator members 66a, each of which is rigidly secured at one end on the outer side to the connector body 62 and, at the other end on the inner side, is an elastically deformable free end portion. The actuator members 66a are made by bending an elongate metal strip member into roughly a shape of letter U. The almost U-shaped actuator members 66a have one leg at an outer end portion secured to the connector body 62 and another leg at an inner end portion formed as an elastically deformable, free end portion. The actuator members 66a also have a cam portion 95 formed at an inner bent corner on the card insertion opening 69 side and over an inner side surface contiguous with the corner, the cam portion 95 having a cam surface 95 inclined so that a distance between the cam surfaces 95 increases downwardly.

That is, the cam surfaces 96 of the cam portions 95 are formed as downwardly expanding, inclined surfaces. The actuator members 66a each have a first latch portion and a second latch portion which engage a first shutter member 67a and a second shutter member 67b, respectively.

As described above, the card connector 60A of Variation 3 of the present invention differs from the card connectors 1, 1A, 1B, 30, 60, 100 of Embodiment 1–4 and Variation 1, 2 in that the actuator members 66a of the switching mechanisms 65A are each provided on the inner side thereof with the cam portion 95 that has the cam surface 95 inclined so that the distance between the cam surfaces 95 increases downwardly.

Because the cam portions 95 of the actuator members 66a are formed with the downwardly expanding, inclined cam surfaces 96, when a card is inserted, the front end corners and the side portions of the card engage the actuator members 66a through a reduced friction surface. Therefore, a friction area between the actuator members 66a and the card is reduced, improving the sliding performance of the card during its insertion and withdrawal operations. This in turn reduces a frictional force between these members and therefore wear. The spring force of the eject members of the eject mechanisms can therefore be designed at a small value.

(Variation 4)

Figure 42:
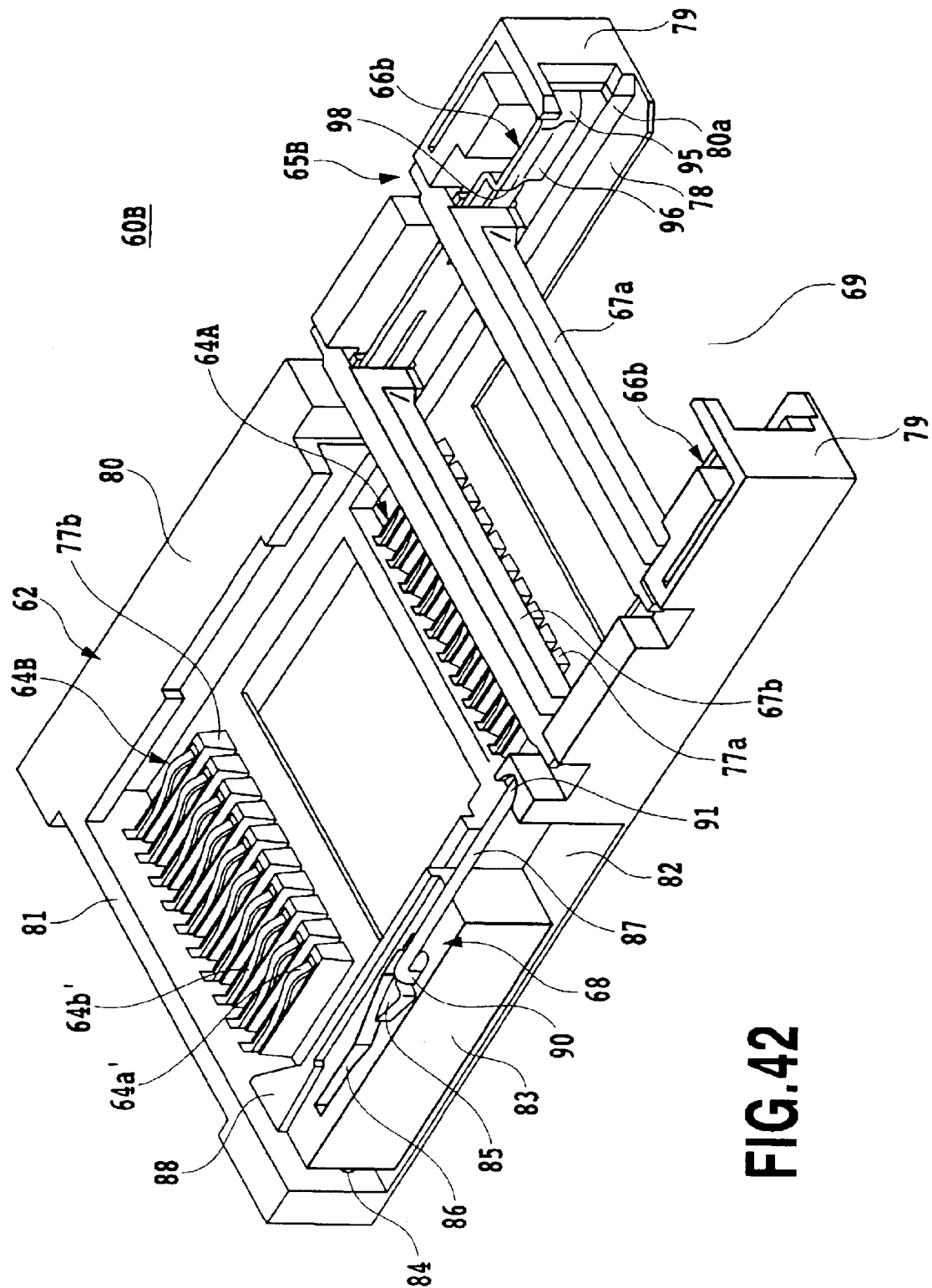
FIG. 42 is a perspective view showing Variation 4 of the card connector of Embodiment 3 according to the present invention, with the cover member removed, as seen from the card insertion opening.
Figure 43:
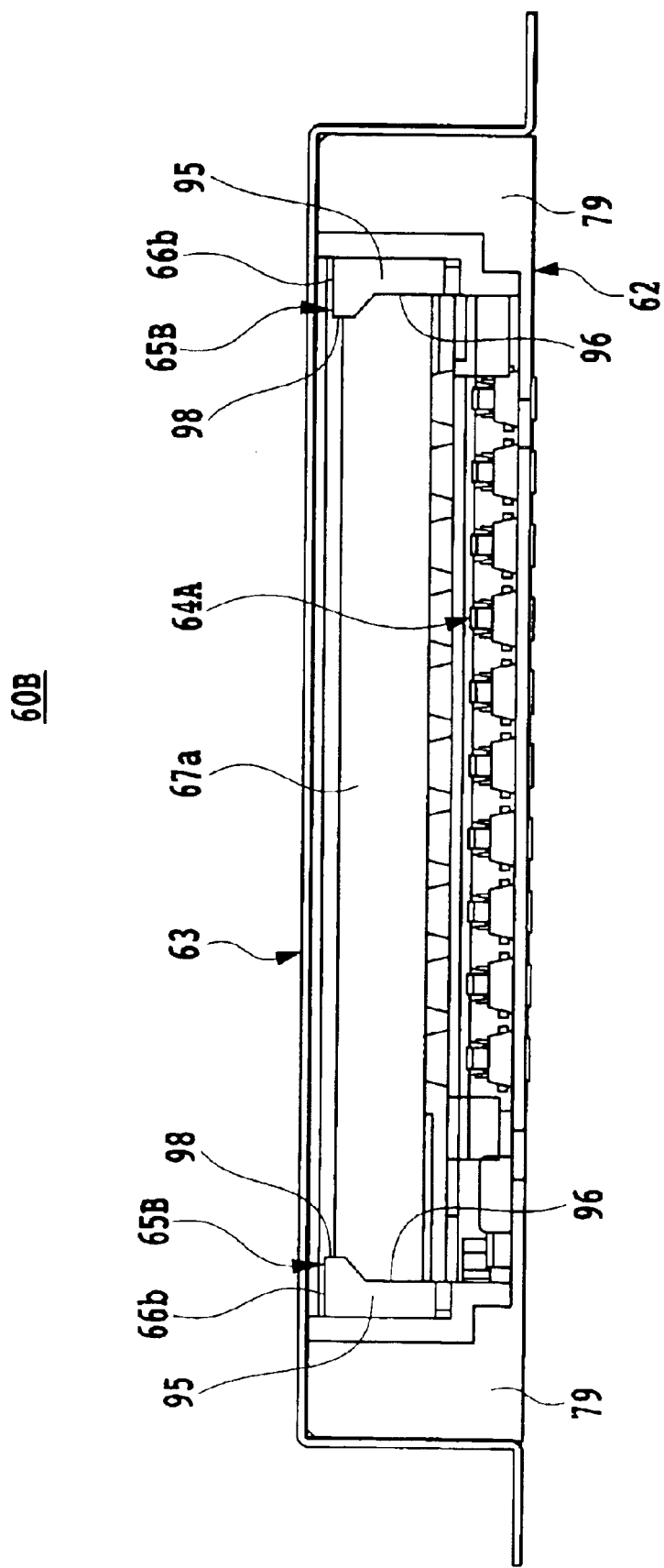
FIG. 43 is an end view of the card connector of FIG. 42 as seen from the card insertion opening.

FIG. 42 and FIG. 43 illustrate another variation of Embodiment 3 of the present invention, FIG. 42 representing a perspective view of the card connector as seen from a card insertion opening side, with a cover member removed, FIG. 43 representing an end view of the card connector of FIG. 42 as seen from the card insertion opening side.

As shown in these figures, Variation 4 differs from Embodiment 1–4 and Variation 1–3 in that bump-like, inwardly bulged portions 98 are provided at an upper part of the cam surfaces 96 of the cam portions 95 of the actuator members 66b in the switching mechanisms 5B. In other respects, their constructions are essentially similar.

That is, the card connector 60B of Variation 4 of the present invention has a box-shaped connector housing defined by a combination of the connector body 62 and the cover member 63. The card connector also has a plurality of first contacts 64A and a plurality of second contacts 64B arrayed therein and the switching mechanisms 65B arranged on both sides of the card insertion opening 69.

The switching mechanisms 65B on both sides of the card insertion opening 69 have actuator members 66b, each of which is rigidly secured at one end on the outer side to the connector body 62 and, at the other end on the inner side, is an elastically deformable free end portion. The actuator members 66b are made by bending an elongate metal strip member into roughly a shape of letter U.

The almost U-shaped actuator members 66b have one leg at an outer end portion secured to the connector body 62 and another leg at an inner end portion formed as an elastically deformable, free end portion. The actuator members 66b also have a cam portion 95 formed at an inner bent corner on the card insertion opening 69 side and over an inner side surface contiguous with the corner, the cam portion 95 having a cam surface 95. The actuator members 66b also have a bump-like, inwardly bulged portion 98 at an upper part of the cam surface 96 of the cam portion 95.

That is, the bulged portions 98 protrude inwardly like bumps from inner bent corners and inner side surfaces contiguous with the corners. Further, the actuator members 66b each have a first latch portion and a second latch portion which engage the first shutter member 67a and the second shutter member 67b, respectively.

As described above, the card connector 60B of Variation 4 of the present invention differs from the card connectors 1, 1A, 1B, 30, 60, 60A, 100 of Embodiment 1–4 and Variation 1–3 in that the actuator members 66b of the switching mechanisms 65B are each provided with a bump-like, inwardly bulged portion 98.

Because the inwardly bulged portions 98 are formed at an upper part of the cam surfaces 96 of the cam portions 95 of the actuator members 66b, when a card is inserted, the front end corners and the side portions of the card engage the actuator members 66b through a reduced friction surface. Therefore, a friction area between the actuator members 66b and the card is reduced, improving the sliding performance of the card during its insertion and withdrawal operations. This in turn reduces a frictional force between these members and therefore wear. The spring force of the eject members of the eject mechanisms can therefore be designed at a small value.

Variations 1–4 are not limited to Embodiment 1 and 3 but can also be applied to Embodiment 2 and 4 and to Embodiment 5 described later.

(Embodiment 5)

Figure 44:
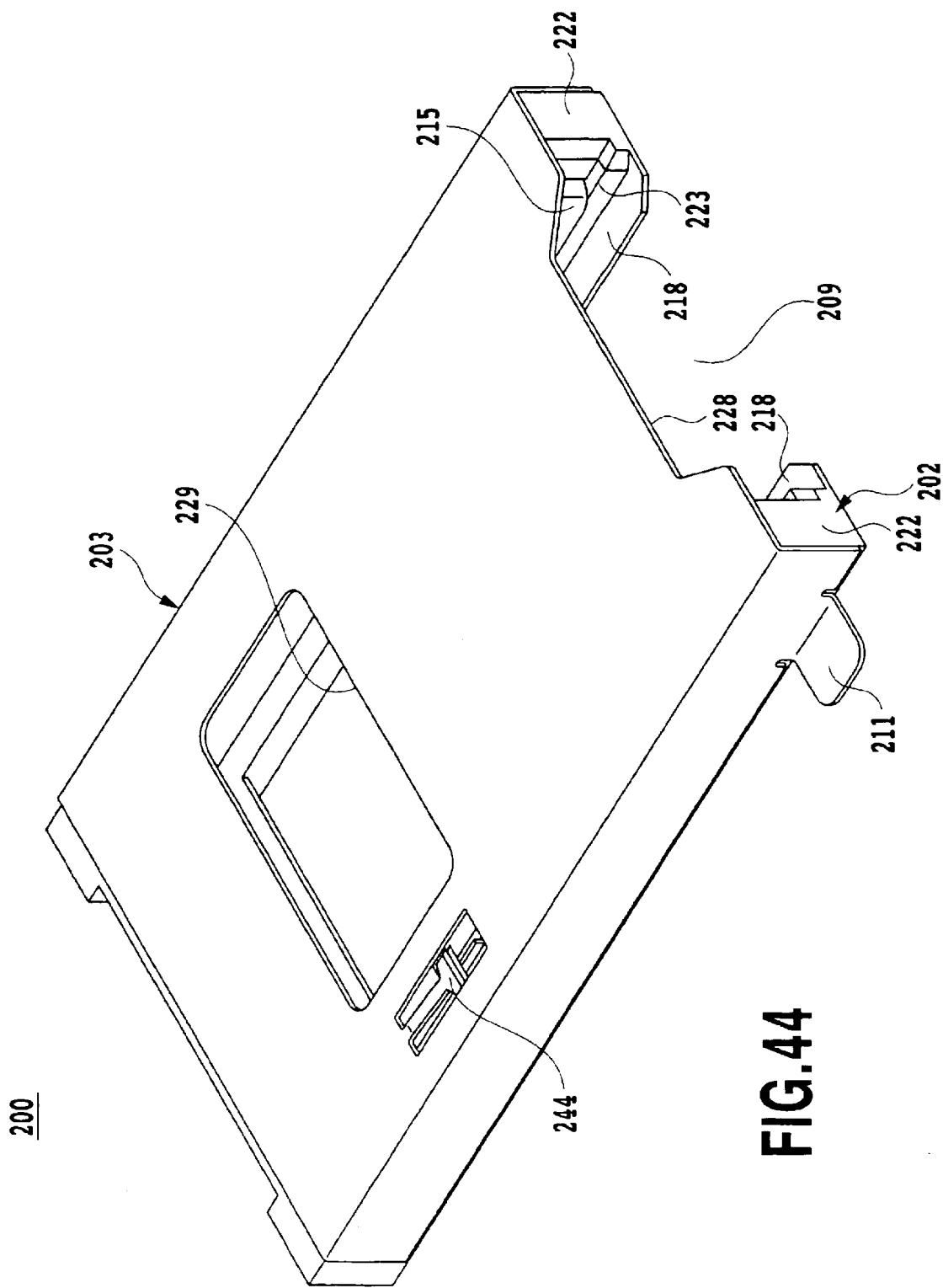
FIG. 44 is an overall perspective view showing a card connector of Embodiment 5 of the present invention as seen from a card insertion opening side.
Figure 45:
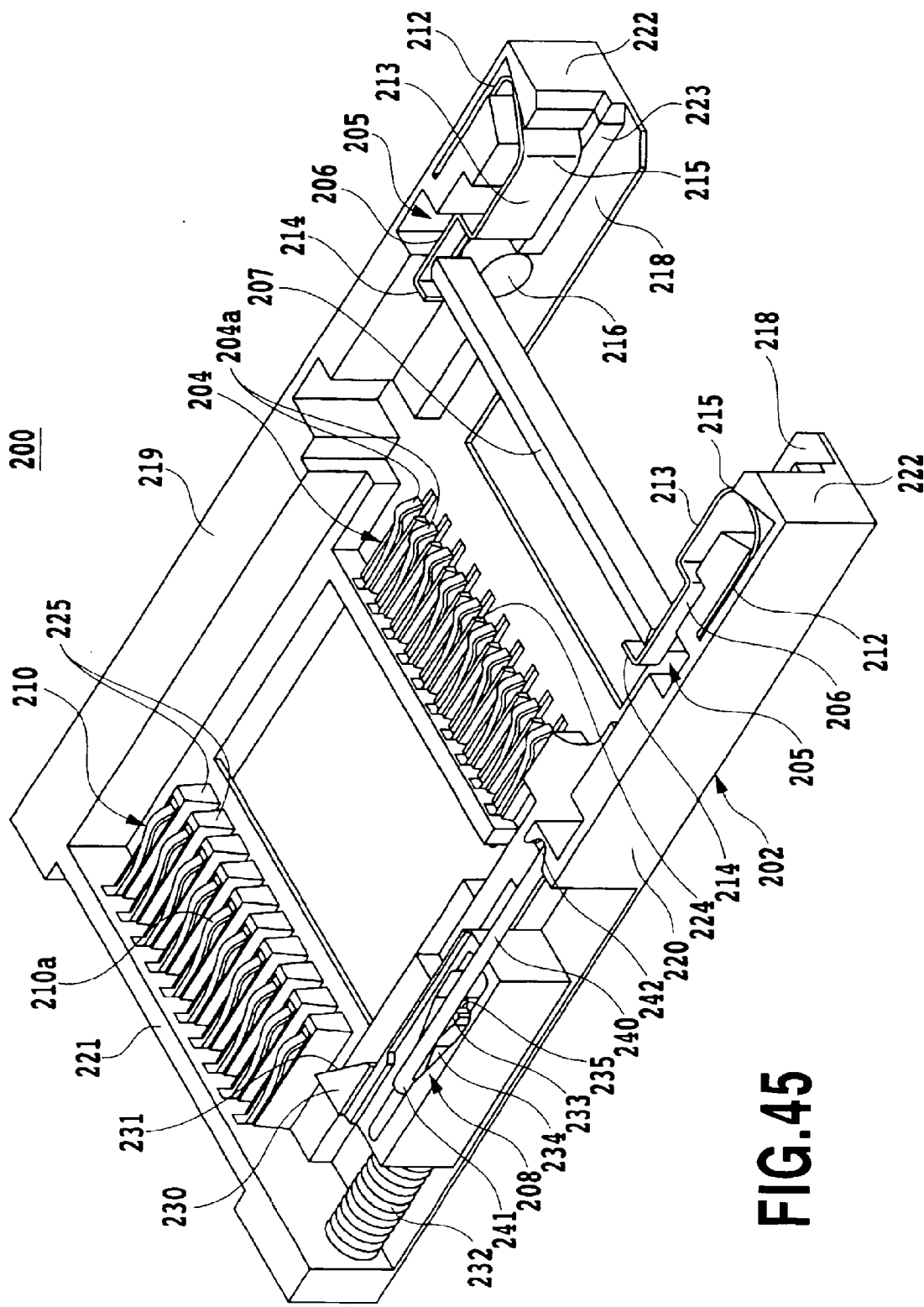
FIG. 45 is a perspective view showing the card connector of FIG. 44 according to the present invention, with the cover member removed.
Figure 46:
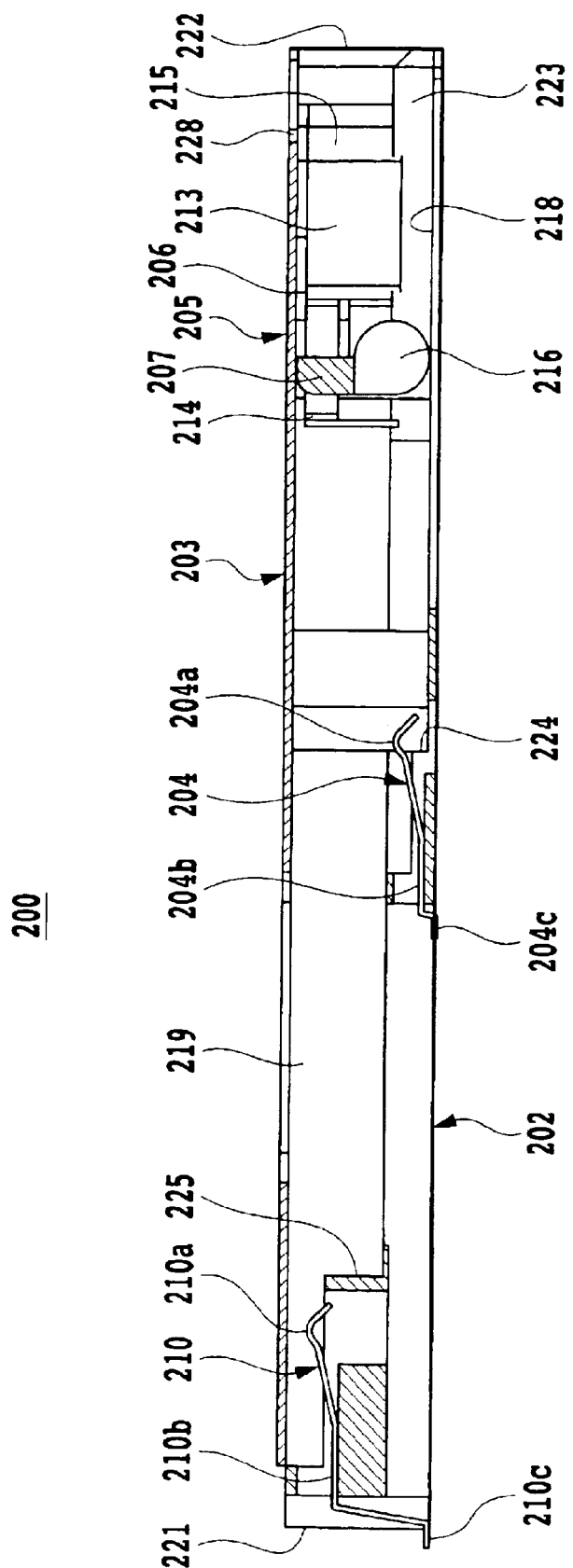
FIG. 46 is a side cross-sectional view showing the card connector of FIG. 44 according to the present invention.
Figure 47:
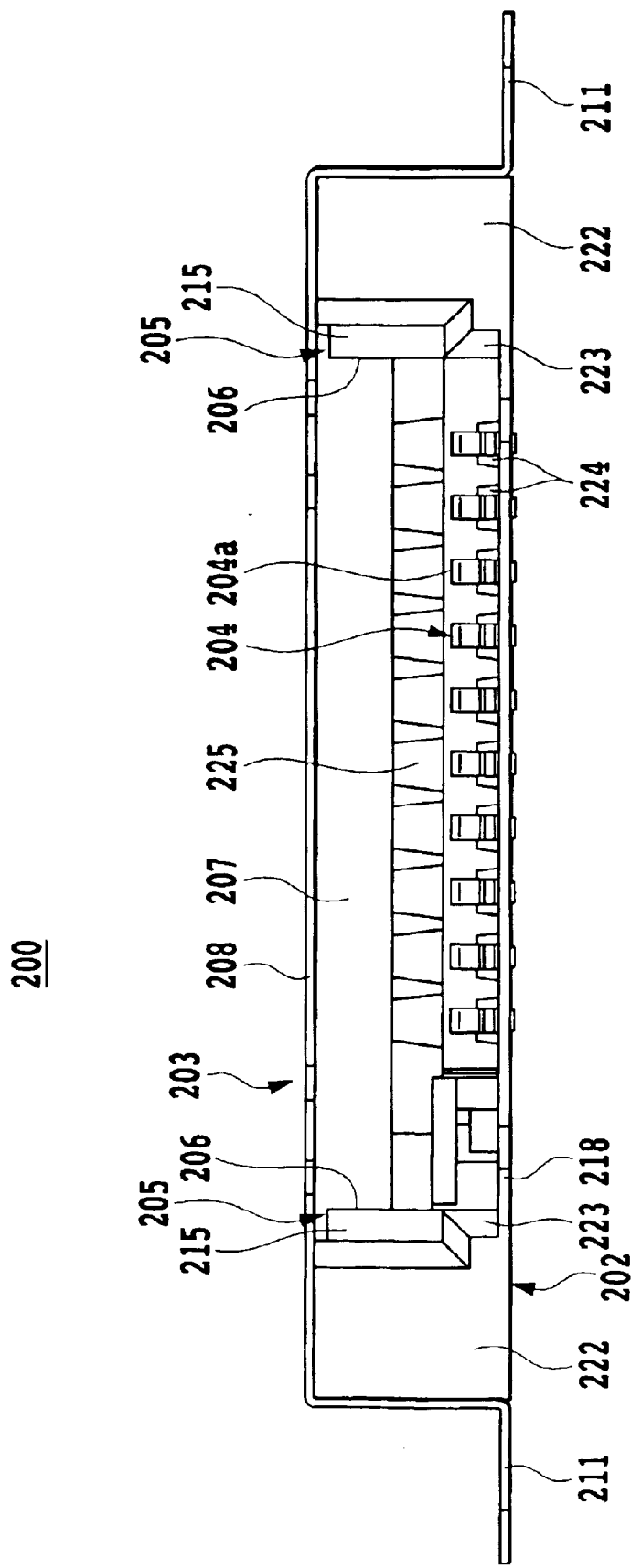
FIG. 47 is an end view of the card connector of FIG. 44 according to the present invention, as seen from the card insertion opening.

FIG. 44 to FIG. 47 illustrate a card connector as Embodiment 5 of the present invention, FIG. 44 representing an overall perspective view of the card connector of Embodiment 5 of the present invention as seen from a card insertion opening side, FIG. 45 representing a similar perspective view of the card connector of FIG. 44 of the present invention, with a cover member removed, FIG. 46 representing a side cross-sectional view of the card connector of FIG. 44 of the present invention, FIG. 47 representing an end view of the card connector of FIG. 44 of the present invention as seen from the card insertion opening.

As shown in FIG. 44 to FIG. 47, a card connector 200 of Embodiment 5 of the present invention is essentially similar in construction to the card connectors 60, 100 of Embodiment 3 and 4, except that actuator members 206 and a shutter member 207 of switching mechanisms 205 partly differ from the those of Embodiment 3 and 4.

The card connector 200 of Embodiment 5 of the present invention has a connector body 202, a cover member 203, a plurality of first contacts 204 arrayed in a front row for a small card, such as Memory Stick Duo (registered trademark), switching mechanisms 205, an eject mechanism 208, and a plurality of second contacts 210 arrayed in a rear row for a large card, such as Memory Stick (registered trademark).

The switching mechanisms 205 of the card connector 200 in Embodiment 5 of the present invention comprise actuator members 206 and a shutter member 207. The shutter member 207 can pivot rearward and lie flat on its back on a bottom base portion 218.

As described above, the Embodiment 5 of the present invention is characterized in that the shutter member 207 of the switching mechanisms 205 pivots rearward and lies flat on the base portion 218. In use, the card connector 200 of the present invention is mounted, for example, on an information terminal device.

The card connector 200 of the present invention has a flat box-shaped housing defined by a combination of the connector body 202 and the cover member 203. The card connector 200 is open on one-end side to form a card insertion opening 209. The card insertion opening 209 in the connector body 202 is suitably formed with step portions 223 to form guide paths to accept both a small card and a large card that differ in lateral width and vertical height.

Such step portions in the card insertion opening 209 can be formed either in the base portion 218 or in sidewalls 219, 220 on the card insertion opening 209 side to prevent the small card and large card from being inserted upside down or rear end first. Further, on the other-end side the card connector 200 is closed by an end wall 221, along which a plurality of second contacts 210 are arrayed laterally in a rear row.

In the card connector 200 of the present invention, the first contacts 204 and the second contacts 210 have bent terminal portions 204c, 210c, respectively, for connection with terminals of other external information terminal devices and equipment and for connection with printed circuits of printed circuit boards. Further, the card connector 200 of the present invention is mounted, as by screws or solder, to a target device or equipment such as a printed circuit board of an information terminal device through mounting flange portions 211 on both sides of the cover member 203. The cover member 203 has openings 228, 229 in its top surface so that the user can watch the small card or large card come into contact with the first contacts 204 or second contacts 210 as it is inserted.

On both sides of the card insertion opening 209 of the card connector 200 of the present invention are arranged a pair of actuator members 206 of the switching mechanisms 35. Between these actuator members 206 is installed a shutter member 207 as a closing member, which can be switched between open and closed states according to a difference in external size, such as thickness and width, between a small card and a large card.

In such a card connector 200 of the present invention, the connector body 202 is formed of an insulating material, such as synthetic resin, and is combined with the cover member 203 formed of a thin metal plate or fiber-reinforced synthetic resin to construct a hollow, flat, box-shaped housing. A small card or large card is inserted from the card insertion opening 209 of the card connector 200. A plurality of first contacts 204 and a plurality of second contacts 210 are arranged in a first and a second row, respectively, in the card connector 200 so that they can make contact with pad portions arrayed on an underside of a front end portion of the inserted small card or large card.

The first and second contacts 204, 210 are arranged to face each other, as shown, and are similarly shaped. Each of the first and second contacts 204, 210 has formed at a free end thereof a contact portion 204a, 210a which is curved up in a semicircular shape. These contact portions 204a, 210a are positioned so as to be able to make elastic contact with the pad portions of the small card or large card inserted from the card insertion opening 209. Further, the first contacts 204 and the second contacts 210 are supported on support blocks 224 and 225, respectively, that are positioned at different heights, the support blocks 224 being arranged independent of each other on an intermediate part of the base portion 218 of the connector body 202, the support blocks 225 being arranged independent of each other on the inner side of the end wall 221.

That is, the first contacts 204 in the front row mounted on the front support blocks 224 on the base portion 218 of the connector body 202 are situated slightly above the base portion 218, while the second contacts 34B in the rear row mounted on the rear support blocks 225 on the inner side of the end wall 221 are situated at a higher position. Therefore, the first contacts 204 and the second contacts 210 have different vertical lengths of leg portions 204b, 210b that are bent almost at right angles and secured to the separately formed individual support blocks 58a, 58b.

The first and second contacts 204, 210 are rigidly secured at their intermediate fixing portions 204b, 210b to the connector body 202 along the rear edge of the support blocks 224 and the front edge of the support blocks 225. Further, in the first and second contacts 204, 210, the terminal portions 204c, 210c extending from the intermediate fixing portions 204b, 210b are bent almost at right angles at their terminal end and situated flush with a bottom surface of the base portion 218 of the connector body 202.

Further, the first contacts 204 and the second contacts 210 are individually mounted and secured at the intermediate fixing portions 204b, 210b to the connector body 202 so that the terminal portions 204c, 210c can be connected to terminals of external devices and to circuits of printed circuit boards.

In this embodiment, too, Memory Stick Duo (registered trademark) is used as a small card and Memory Stick (registered trademark) as a large card, as in Embodiment 1–4. It should be noted, however, that the present invention is not limited to these cards but can also be applied suitably to other similar memory cards.

In the card connector 200 of the present invention, the actuator members 206 of the switching mechanisms 205 are provided, as switching means, on both sides of the card insertion opening 209. The shutter member 207 is pivotally arranged between the actuator members 206.

The actuator members 206 are formed into a generally flat configuration by slightly bending an elongate metal strip member, with their outer leg portions 212 fixedly fitted into slits in front support walls 222 of the side walls 219, 220. Further, the actuator members 206 have their inner leg portions 213 formed as free end portions that are elastically deformable. The inner leg portions 213 have a latch portion 214 at their free end. The latch portions 214 of the actuator members 206 engage upright leg portions 216 at both ends of the shutter member 207 to hold the shutter member 207 immovable in a vertically standing position.

Near the fixed outer leg portion 212, each actuator member 206 has a cam portion 215. When corners of a large card engage and push the cam portions 215, the inner leg portions 213 of the actuator members 206 are elastically deformed to open outwardly, disengaging the latch portions 214 from the shutter member 207 and releasing the shutter member from the latch lock.

The shutter member 207 has a shutter plate formed of a laterally elongate plate member. On both sides of the shutter plate are provided shaft-like support portions 216 that protrude horizontally laterally outward from the side portions 216. The shaft-like support portions 216 are pivotally supported on bearing portions formed by recessed portions in the base portion 218 of the connector body 202. The support portions 216 are elastically pressed and held in the sidewalls 219, 220 of the connector body 202 as by leaf springs (not shown) so that the shutter member 207 is vertically upright. Therefore, the shutter member 207 is normally vertically standing to close the card accommodation portion in the card connector 200 and is locked in this closed state by the latch portions 214 of the actuator members 206.

In the card connector 200 of this embodiment with the shutter member 207 in the closed state, when a large card is inserted, front end portion of the card engages the cam portions 215 at the inner corner of the actuator members 206. When the corners of the large card engage the cam portions 215, the inner leg portions 213 on the free-end side of the actuator members 206 are elastically deformed to open outward. As a result, the latch portions 214 disengage from the shutter member 207, releasing it from the latch lock. Then, as the large card is further pushed in, the front end portion of the card pushes and pivots the shutter member 207 about the support portions 217 until the shutter member 207 lies flat on the base portion 218 of the connector body 202.

In this state, the large card can be inserted further inward bringing the pad portions of the card into electrical contact with the second contacts 210. To keep the inserted large card in electric contact with the second contacts 210 and also to eject the card, an eject mechanism 208 is provided.

The eject mechanism 208 for ejecting a large card has an eject member 230 as a slider which is slidably mounted in one sidewall 220 of the connector body 202; a spring member 232 such as a coil spring which, when pressed by the eject member 230, elastically deforms; a heart-shaped cam 233 formed on a top surface of the sidewall 220; and a cam lever 240 whose one end portion 241 is fitted in a cam groove 234 formed around the heart-shaped cam 233.

The eject member 230 has a card receiving portion 231 at one end on the inner side thereof which is engaged by the corner of the card. The eject member 230 also receives one end portion of the spring member 232 and is biased by it. The card receiving portion 231 of the eject member 230 is formed in such a manner as to be able to receive and snugly engage a cut-off corner portion of the large card to prevent the card from being inserted upside down. When the large card is inserted upside down, a corner portion, which is not chopped, of the large card abuts against the card receiving portion 231, thus preventing an inverted insertion of the card.

Further, the other end portion 242 of the cam lever 240 is formed integral with the eject member 230. Thus, when the card is inserted to push the eject member 230, the one end portion 241 of the cam lever 240 moves relative to the cam groove 234. Therefore, when the inserted large card engages the end wall 221 and the user pulls his or her pushing finger from the card, the card is pushed back slightly by the force of the spring member 232, with the result that the end portion 241 of the cam lever 240 engages a dent portion 235 formed in a head of the heart-shaped cam 233.

Since the eject member 230 is pushed by the spring member 232, it is held at roughly a fixed position, with the end portion 241 of the cam lever 240 pressed against the dent portion 235. The large card is therefore held immovable in the inserted position, keeping the pad portions of the card in contact with the second contacts 210.

The cover member 203 is formed with a cam lever retainer 244 in the form of a cantilevered leaf spring, which elastically holds down the cam lever 240, preventing the end portion 241 of the cam lever 240 from coming off the cam groove 234.

To eject and withdraw the large card from the card connector 200 of Embodiment 5 of the present invention, the card needs to be pushed lightly to be released from the latch lock. That is, when the large card inserted in the card connector 200 is pushed lightly, the end portion 241 of the cam lever 240 parts from the dent portion 235 of the heart-shaped cam 233 and moves laterally out of the dent portion 235.

As a result, the end portion 241 of the cam lever 240 is set free to follow the cam groove 234. In this state the eject member 230 now slides, pushed by the spring member 232, to a middle position in the card connector 200, thus ejecting the large card halfway.

Then the user holds an end portion of the card, which was ejected halfway, and withdraws it completely from the card connector 200. With the large card completely withdrawn from the card connector 200, the shutter member 207 pivots and rises to the closed position and the actuator members 206 also return to the original state, engaging the latch claws 214 with leg portions 216 on both sides of the shutter member 207 to lock it.

In the card connector 200 of the above construction, operations performed when a small card and a large card are inserted will be explained as follows.

First, when a small card is used, a front end portion of the card is inserted from the card insertion opening 209 of the card connector 200 of the present invention.

The small card has small external dimensions in thickness, length and width. This small card has a width almost equal to a predetermined distance between the paired actuator members 206 in the card connector 200. Hence, when the small card is inserted into the card connector 200 from the card insertion opening 209, it does not contact the actuator members 206 nor activates them. Therefore, the actuator members 206, biased inwardly by their own elastic force, keep their free ends in engagement with side portions of the shutter member 207, with their latch portions 214 engaging the side surfaces of the shutter member, as shown in FIG. 45.

In this state, the shutter member 107 remains vertically standing and locked by the latch portions 214 of the actuator members 206.

Thus, the small card passes through a gate-like space below the upright shutter member 207 between step portions 223 of the connector body 202 until the pad portions on the underside of the card come into contact with the first contacts 204.

In the case of a large card, its width is larger than the predetermined distance between the paired actuator members 206 of the card connector 200 of the present invention. Therefore, when the large card is inserted into the card connector 200 from the card insertion opening 209, the front corners of the card engage and push the cam portions 215 of the actuator members 206, thus elastically deforming the actuator members 206. As a result, the latch portions 214 of the actuator members 206 disengage from the shutter member 207, releasing it from the latch lock.

As the large card is inserted further, the front end of the card pushes the shutter member 207 to pivot and fall back. Then, the card's front end corner on one side which is cut off snugly engages the card receiving portion 231 of the eject member 230. The subsequent card insertion action pushes the eject member 230 further inward. At this time the end portion 241 of the cam lever 240 follows the cam groove 234 in the sidewall 220.

Then, the end portion 241 of the cam lever 240 is situated at a position in the cam groove 234 corresponding to the dent portion 235 of the heart-shaped cam 233 and engages the dent portion 235, thus holding the eject member 230 immovable. In this state the large card is completely inserted, with the pad portions on the underside of the card in electrical contact with the contact portions 210a of the second contacts 210. Now, the large card can be used for an intended purpose.

To withdraw the large card, the user need to push the card lightly to release it from the latch lock through the eject mechanism 208 as described above before the user can withdraw the card. That is, when the large card inserted in the card connector 200 is lightly pushed, the end portion 241 of the cam lever 240 situated at the dent portion 235 of the heart-shaped cam 233 moves laterally and disengages from the dent portion 235. As a result the end portion 241 of the cam lever 240 becomes free to follow the cam groove 234.

In this state when the user pulls his or her pushing finger from the large card, the eject member 230 now slides, urged by the spring member 232, to a middle position in the card connector 200, thus ejecting the large card halfway.

Then the user holds an end portion of the card, which was ejected halfway, and withdraws it completely from the card connector 200. With the large card completely withdrawn from the card connector 200, the shutter member 207 pivots and rises up to the upright closed position and the actuator members 206 also return to the original state, engaging the latch portions 214 with the side surfaces of the shutter member 207 to lock it.

With the card connector 200 of Embodiment 5 of the present invention, when a large card is inserted, the shutter member 207 of the switching mechanisms 205 is pushed and pivoted down by the card so that the card can advance inward over the shutter member until the pad portions of the card come into contact with the second contacts 210 on the rear side. When a small card is inserted, the shutter member 207 remains upright, with the card inserted through a gate-like space below the shutter member 207 to bring the pad portions of the card into contact with the first contacts 204. In this way a distinction can be made between different types of cards, enabling them to be processed appropriately.

As described above, the card connector 200 of the present invention can accept two kinds of cards, large and small, and can permit the use of appropriate cards but block the use of inappropriate cards without requiring the cards to have any additional means and without any trouble. Further, with the present invention, the card connector 200 itself can be manufactured to have a flat, thin, box-shaped housing. The friction surface areas on the actuator members can be reduced to improve the sliding performance of the card and reduce friction force and wear. This allows the spring force of the eject mechanisms to be designed at smaller values, making the card connector of the present invention suitably applicable to information terminal devices, such as mobile phones and karaoke microphones, and various electronic devices.

Further, the card connector 200 of the present invention has a small number of moving parts, which include only the actuator members 206 and the shutter member 207 of the switching mechanisms 205 and the eject member 230 of the eject mechanism 208. Since the shutter member 207 can be accommodated on the base portion 218, a space can be saved, reducing an overall thickness of the connector, which in turn leads to a simple construction, a reduced size and easier replacement of component members. This construction can be applied to any of the above Embodiment 1–5.

As described above, since the card connector of the present invention changes an inlet area of the card insertion opening by the switching mechanisms installed in the housing, cards of different cross-sectional sizes can be used on a single card connector. That is, one and the same card connector can be used commonly for two or more kinds of cards, large and small, without requiring the cards to have any additional means and without any trouble. Further, the card connector of the present invention can distinguish an appropriate type of card for use on the card connector from wrong ones. Since the card connector can be fabricated to have a flat, thin, box-shaped housing, it can be suitably applied to information terminal devices, such as mobile phones and karaoke microphones, and a variety of electronic devices.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A card connector comprising:
   a housing;
   a card insertion opening formed by opening at least one end of the housing; and
   a plurality of contacts arranged in the housing; and
   a switching mechanism comprising an actuator member and a shutter member,
   wherein said shutter member is selectively movable between a first position and a second position, the card connector receiving a first card having a first size when the shutter member moves to the first position, and the card connector receiving a second card having a second size when the shutter member moves to the second position.

2. A card connector according to claim 1, wherein the actuator member is movably arranged near the card insertion opening and removably interlocked with the shutter member.

3. A card connector according to claim 1, wherein
   the actuator member is a first actuator member, and is pivotally arranged on a first side of the card insertion opening, the card connector further comprising:
   a second actuator member pivotally arranged on a second side of the card insertion opening,
   wherein the first and second actuator members are configured to removably interlock with the shutter member.

4. A card connector according to claim 1, wherein the actuator member is a switching member at the card insertion opening.

5. A card connector according to claim 1, wherein the shutter member has a shutter plate and is latched by the actuator member through latch engagement on a side of the shutter plate.

6. A card connector according to claim 1, wherein the shutter member is pivotally arranged to open and close the card insertion opening.

7. A card connector according to claim 1, wherein the actuator member is formed by bending an elongate metal strip, the elongate metal strip being elastically deformable, and the actuator member being mounted at the card insertion opening.

8. A card connector according to claim 7, wherein the elongate metal strip is provided with a cam portion at a bent inner corner, which engages a card.

9. A card connector according to claim 1, wherein the actuator member has a cam surface that changes an inlet area of the card insertion opening.

10. A card connector according to claim 9, wherein the cam surface of the actuator member is a vertical surface.

11. A card connector
    comprising:
    a housing;
    a card insertion opening formed by opening at least one end of the housing; and
    a plurality of contacts arranged in the housing, wherein
    a switching mechanism comprising an actuator member and a shutter member is provided in the housing,
    the actuator member has a cam surface that changes an inlet area of the card insertion opening, and
    the cam surface of the actuator member is downwardly and divergently inclined to situate inwardly at its upper portion.

12. A card connector
    comprising:
    a housing:
    a card insertion opening formed by opening at least one end of the housing; and
    a plurality of contacts arranged in the housing, wherein
    a switching mechanism comprising an actuator member and a shutter member is provided in the housing,
    the actuator member has a cam surface that changes an inlet area of the card insertion opening, and
    the cam surface of the actuator member has an inwardly bulged portion formed at a top part thereof.

13. A card connector according to claim 1, wherein the shutter member is rearwardly pivotally arranged to open and close the card insertion opening.

14. A card connector comprising:
    a housing including a card insertion opening formed by opening at least one end of the housing;
    a plurality of contacts arranged in the housing; and
    a switching mechanism comprising an actuator member and a shutter member, wherein
    said shutter member is pivotally mounted to open and close the card insertion opening between a first position and a second position, the card connector receiving a first card having a first size when the shutter member turns to the first position, and the card connector receiving a second card having a second size when the shutter member turns to the second position.

* * * * *

UNITED STATES PATENT AND TRADEMARK OFFICE
CERTIFICATE OF CORRECTION

| | |
|---|---|
| PATENT NO. | : 6,976,879 B2 |
| APPLICATION NO. | : 10/721424 |
| DATED | : December 20, 2005 |
| INVENTOR(S) | : Seiji Shishikura et al. |

It is certified that error appears in the above-identified patent and that said Letters Patent is hereby corrected as shown below:

Claim 12, column 32, line 24, "a housing:" should read --a housing;--.

Signed and Sealed this

Twenty-second Day of August, 2006

JON W. DUDAS
*Director of the United States Patent and Trademark Office*